(12) United States Patent
Vega et al.

(10) Patent No.: US 11,656,097 B2
(45) Date of Patent: *May 23, 2023

(54) METHODS, SYSTEMS, APPARATUSES AND DEVICES FOR OPTIMIZING UTILITY CONSUMPTION ASSOCIATED WITH AT LEAST ONE PREMISES

(71) Applicants: Martha Patricia Vega, Houston, TX (US); Paul Solano, The Woodlands, TX (US); Ed Marotta, Houston, TX (US); Alberto Rivas, Spring, TX (US); Yavuz Kadioglu, The Woodlands, TX (US); Vishwas Bongirwar, Alpharetta, GA (US)

(72) Inventors: Martha Patricia Vega, Houston, TX (US); Paul Solano, The Woodlands, TX (US); Ed Marotta, Houston, TX (US); Alberto Rivas, Spring, TX (US); Yavuz Kadioglu, The Woodlands, TX (US); Vishwas Bongirwar, Alpharetta, GA (US)

(*) Notice: Subject to any disclaimer, the term of this patent is extended or adjusted under 35 U.S.C. 154(b) by 64 days.

This patent is subject to a terminal disclaimer.

(21) Appl. No.: 17/084,594

(22) Filed: Oct. 29, 2020

(65) Prior Publication Data

US 2021/0123771 A1     Apr. 29, 2021

Related U.S. Application Data

(60) Provisional application No. 62/927,395, filed on Oct. 29, 2019.

(51) Int. Cl.
| | |
|---|---|
| *G01D 4/00* | (2006.01) |
| *G06Q 50/06* | (2012.01) |
| *H04Q 9/02* | (2006.01) |

(52) U.S. Cl.
CPC ............. *G01D 4/004* (2013.01); *G06Q 50/06* (2013.01); *H04Q 9/02* (2013.01); *H04Q 2209/60* (2013.01)

(58) Field of Classification Search
None
See application file for complete search history.

(56) References Cited

U.S. PATENT DOCUMENTS

| | | | |
|---|---|---|---|
| 7,541,941 B2 | 6/2009 | Bogolea | |
| 7,778,734 B2 * | 8/2010 | Oswald | G05B 15/02 700/277 |

(Continued)

OTHER PUBLICATIONS

Laura Cozzi, Timothy Goodson, Empowering electricity consumers to lower their carbon footprint, IEA, Jan. 15, 2020 <URL: https://www.iea.org/commentaries/empowering-electricity-consumers-to-lower-their-carbon-footprint>.

*Primary Examiner* — Curtis A Kuntz
*Assistant Examiner* — Jerold B Murphy

(57) ABSTRACT

A system for optimizing utility consumption associated with a premises is provided. The system may include a communication device, a processing device and a storage device. Further, the communication device may be configured for receiving utility consumption information, receiving premises information, receiving lifestyle information, and performing at least one of transmitting a utility recommendation associated with the premises to an electronic device and transmitting an actuation data to an appliance associated with the premises. Further, the processing device may be configured for analyzing each of the utility consumption information, the premises information and the lifestyle information and generating at least one of a utility recommendation and the actuation data based on the analyzing. Further, the storage device may be configured for storing each of the utility consumption information, the premises (Continued)

information, the lifestyle information and at least one of the utility recommendation and the actuation data.

18 Claims, 46 Drawing Sheets

(56) References Cited

U.S. PATENT DOCUMENTS

| | | | |
|---|---|---|---|
| 8,918,221 B2 | 12/2014 | Roux | |
| 9,876,357 B2 | 1/2018 | Paul | |
| 10,108,217 B2 | 10/2018 | Weaver | |
| 10,740,691 B2 * | 8/2020 | Choueiter | G01R 22/10 |
| 2011/0184574 A1 * | 7/2011 | Le Roux | G06Q 50/06 |
| | | | 700/291 |
| 2021/0125129 A1 * | 4/2021 | Vega | H02J 13/00001 |
| 2021/0125253 A1 * | 4/2021 | Vega | G06Q 50/06 |

* cited by examiner

Logo     Welcome ABC | Logout | English▼

YOUR LIFESTYLE & PREFERENCES

Unleash Your Data — View Your Trends — See Your Impact — Know Your Efficiency — Find Your Match Your lifestyle and preferences influence your electricity usage – tell us about them.

3310 — Do you normally work days or nights? [00:00 AM ▼]

3320 — your weekday Schedule

Wake Up [08:00 AM ▼] | Leave Home [01:00 AM ▼]

Go to Sleep [10:00 PM ▼] | Return Home [04:00 PM ▼]

your weekend Schedule — 3330

Wake Up [08:00 AM ▼] | Leave Home [11:00 AM ▼]

Go to Sleep [10:00 PM ▼] | Return Home [05:00 PM ▼]

your Household Information

3340 — Thermostat Cooling (F') [F2 ▼] | Thermostat Heating (F') [F5 ▼] — 3350

3360 — Number of Occupants [0 ▼] | Current Energy Plan ⓘ [Select an option ▼] — 3370

[ SHOW ME MY LEAK & IMPACT ]

FIG. 9

ABOUT YOUR HOME

- ✓ Unleash Your Data
- ✓ View Your Trends
- ✓ See Your Impact
- ○ Know Your Efficiency
- ○ Find Your Match

Your energy is as unique as your home. Tell us a little bit about it and we will find more efficiency and saving opportunities enter your home features

3410 — Age — Age in years: [10-25 ▾]  |  Size in Sqft: [ ◊ ] — 3480

3420 — Heating System: [Electric ▾]  |  Water Heating: [Electric ▾] — 3490

3430 — Air Conditioning Age: [10-25 ▾]  |  Water Heater Age: [ ◊ ] — 3510

3440 — Primary Type of Lighting: [Electric ▾]  |  Smart Thermostat: [Electric ▾] — 3520

3450 — Pool: [10-25 ▾]  |  Number of Refrigerators: [ ◊ ] — 3530

3470 — Solar Panel: [Electric ▾]  |  Electrical Vehicle: [Electric ▾] — 3540

[SHOW ME MY EFFICIENCY]

FIG. 10

METHODS, SYSTEMS, APPARATUSES AND DEVICES FOR OPTIMIZING UTILITY CONSUMPTION ASSOCIATED WITH AT LEAST ONE PREMISES

The current application claims a priority to the U.S. provisional patent application Ser. No. 62/927,395 filed on Oct. 29, 2019.

FIELD OF THE INVENTION

Generally, the present disclosure relates to the field of data processing. More specifically, the present disclosure relates to methods, systems, apparatuses and devices for optimizing utility consumption associated with at least one premises.

BACKGROUND OF THE INVENTION

Monitoring, minimizing and managing energy consumption are needed in order to provide for a sustainable, eco-friendly energy infrastructure currently and in the future. Energy security and independence depends not only on finding and securing new sources of energy but also on finding more efficient ways to utilize existing resources, and providing the tools for the civil society, including end-users of energy, to understand and optimize their usage and its impact on the environment.

The energy landscape is undergoing a complete transformation. Over the next few years, consumers will have access to more energy choices than ever before. Innovations in technology combined with the emergence of a truly distributed, renewably-powered grid and the electrification of vehicles will put increasingly more choices, power and challenges into consumers' hands.

However, advances in cognitive computing and predictive intelligence are giving systems the ability to learn using data to adapt from experience without being explicitly programmed. This is leading to endless possibilities to extract knowledge and actionable insights from previously underutilized data, helping improve productivity, reliability and longevity. However, conventional utilities often find themselves ill-equipped to harvest the full potential that Artificial Intelligence (AI) systems present, including the opportunity to deepen and evolve relationships with consumers, optimize integration of distributed resources, and be responsive business model transformations.

Therefore, there is a need for improved methods, systems, apparatuses and devices for optimizing utility consumption associated with at least one premises that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed is a system for optimizing utility consumption associated with at least one premises. The system may include a communication device, a processing device and a storage device. Further, the communication device may be configured for receiving at least one utility consumption information from at least one utility consumption information source. Further, the at least one utility consumption information may be associated with consumption of at least one utility corresponding to the at least one premises. Further, the communication device may be configured for receiving at least one premises information from at least one premises information source. Further, the at least one premises information may be associated with the at least one premises. Further, the communication device may be configured for receiving at least one lifestyle information from at least one lifestyle information source. Further, the at least one lifestyle information may be associated with at least one occupant of the at least one premises. Further, the communication device may be configured for performing at least one of transmitting at least one utility recommendation associated with the at least one premises to at least one electronic device and transmitting at least one actuation data to at least one appliance associated with the at least one premises. Further, at least one configuration of the at least one appliance may be based on the at least one actuation data. Further, the processing device may be configured for analyzing each of the at least one utility consumption information, the at least one premises information and the at least one lifestyle information. Further, the processing device may be configured for generating at least one of the at least one utility recommendation and the at least one actuation data based on the analyzing. Further, the storage device may be configured for storing each of the at least one utility consumption information, the at least one premises information, the at least one lifestyle information and at least one of the at least one utility recommendation and the at least one actuation data.

According to some embodiments, a method of optimizing utility consumption associated with at least one premises is disclosed. The method may include receiving, using a communication device, at least one utility consumption information from at least one utility consumption information source. Further, the at least one utility consumption information may be associated with consumption of at least one utility corresponding to the at least one premises. Further, the method may include receiving, using the communication device, at least one premises information from at least one premises information source. Further, the at least one premises information may be associated with the at least one premises. Further, the method may include receiving, using the communication device, at least one lifestyle information from at least one lifestyle information source. Further, the at least one lifestyle information may be associated with at least one occupant of the at least one premises. Further, the method may include analyzing, using a processing device, each of the at least one utility consumption information, the at least one premises information and the at least one lifestyle information. Further, the method may include generating at least one of at least one utility recommendation and at least one actuation data based on the analyzing. Further, the method may include performing at least one of transmitting the at least one utility recommendation associated with the at least one premises to at least one electronic device and transmitting the at least one actuation data to at least one appliance associated with the at least one premises. Further, at least one configuration of the at least one appliance may be based on the at least one actuation data. Further, the method may include storing, using a storage device, each of the at least one utility consumption information, the at least one premises information, the at least one lifestyle information and at least one of the at least one utility recommendation and the at least one actuation data.

Both the foregoing summary and the following detailed description provide examples and are explanatory only.

Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 9 depicts a representative GUI for user communications with the system, in accordance with some embodiments.

FIG. 10 depicts a representative GUI for user communications with the system, in accordance with some embodiments.

DETAIL DESCRIPTIONS OF THE INVENTION

Figure 1:
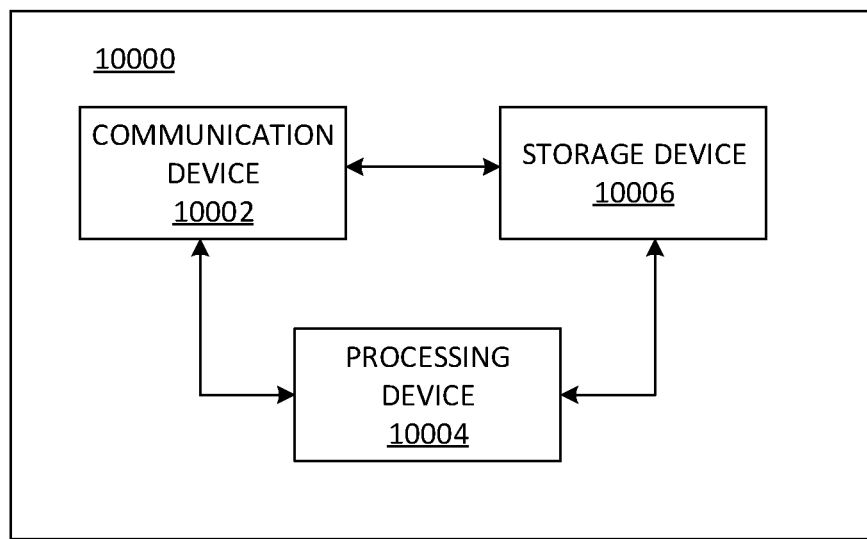
FIG. 1 is a block diagram of a system for optimizing utility consumption associated with at least one premises, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of optimizing utility consumption associated with at least one premises, embodiments of the present disclosure are not limited to use only in this context.

Overview

According to some embodiments, close-loop personalized optimization and automation of end-use energy consumption with IoT inclusion is disclosed.

The advances in cognitive computing and predictive intelligence are giving systems the ability to learn using data to adapt from experience without being explicitly programmed. This is leading to endless possibilities to extract knowledge and actionable insights from previously under-utilized data, helping improve productivity, reliability and longevity. However, conventional utilities often find themselves ill-equipped to harvest the full potential that Artificial Intelligence (AI) systems present, including the opportunity to deepen and evolve relationships with consumers, optimize integration of distributed resources, and be responsive business model transformations. Accordingly, the present disclosure provides a system and platform that enables an easy to use, interactive, user friendly system for analyzing and optimizing end-use energy consumption.

According to some embodiments, the present disclosure provides control systems and computer implemented methods for statistically analyzing and optimizing power consumption by a customer or user (e.g., both consumers and businesses) by obtaining and analyzing power consumption, and also relates to using the results of that analysis for reducing and optimizing energy use and its associated carbon footprint and to obtaining and analyzing power consumption to establish a baseline for energy consumption and monitoring actual consumption for variances from the baseline and the determination of the cause for and correction of a variance.

Aspects of the present disclosure relate to methods and a system for statistically analyzing and optimizing power consumption by a customer or user (e.g., both consumers and businesses) and relates to obtaining and analyzing power consumption, and to using the results of that analysis for reducing and optimizing energy use and its associated carbon footprint and for controlling smart devices in a residence. This disclosure also relates to obtaining and analyzing power consumption to establish a baseline for energy consumption and monitoring actual consumption for variances from the baseline and the determination of the cause for and correction of a variance.

Further, the present disclosure directly links customer historical usage, lifestyle schedules, preferences, and settings through advanced data science and simplified pragmatic methods to identify non-intrusive ways to save energy without requiring efforts on the part of the consumer to change regular activities in which electricity is consumed in a residence, household, or premises.

While most people want to save energy and money, no two consumers are the same. Personal preferences, lifestyles and energy aspirations are unique. Individual energy consumption depends on multiple factors that change constantly over time.

To account for these dynamics, the present disclosure provides a system using technology to integrate personalized, historical energy consumption data with locational information, building characteristics, lifestyle behaviors, and preferences to create a unique baseline consumption (energy fingerprint) for each customer. This system allows consumers to truly understand their energy habits for the first time ever and provides a more accurate digital representation (Building Digital Twin) for energy providers to utilize in analytics, energy optimization, systems planning and energy arbitrage.

Demand for energy is driven by consumption. Individuals have the capacity to change, if they have the knowledge and impetus to act. Providing actionable knowledge and working with every stakeholder in the energy ecosystem to create a future of sustainable energy abundance should be a long-term goal. Energy is integral to modern life and economic development. Everything in our daily lives, from lighting to transportation to accessing the Internet, depends on the availability of a secure and resilient energy grid. Providing robust personalized insight and actuation mechanisms for end-use energy consumers to optimize usage and environmental footprint based on their specific objectives is a priority and a main objective of the present disclosure ("energy advisor").

The present disclosure encompasses the identification, quantification and actuation on multiple savings opportunities related to electricity consumption in a given premises correlated in terms of money savings and reduction in energy consumption and environmental impact.

The present disclosure provides a method and system (energy advisor) that is a consumer-focused technology platform connecting energy consumers with product and services providers, utilities, social networks and technology companies. Energy advisor helps customers implement energy optimization recommendations, making it easier to make smarter more informed energy decisions that save money, improve efficiency, and advance sustainability with minimized intrusion in energy-consumer's lifestyle.

The analytics and optimization engine of the present disclosure integrates each consumer's unique energy fingerprint with a comprehensive database of agnostically characterized smart devices (e.g., connected to the internet, wireless network, etc.) to identify the energy consumption and associated environmental footprint optimization for each customer based on their behavior and usage patterns, lifestyle, preferences and energy aspirations. Energy optimization opportunity, actuation, and service or product provider selection is based on statistical usage patterns, machine learning descriptive and prescriptive analytics, behavior on premises, occupant lifestyle, consumer conscious and unconscious preferences (e.g., quantifiable and non-quantifiable). The present disclosure provides people and businesses access to actionable insight about their own energy habits—something not available in a consumable form today, with easy to activate or implement optimization recommendations, alerts and reports that highlight unusual consumption, deviation from customer set targets, and visibility when options better aligned with consumer preferences and objectives become available.

An actionable energy optimization system with minimized disruption of customer's lifestyle is provided for energy consumption, cost and environmental footprint analysis and optimization using a processor, a communication interface coupled to the processor, and a memory coupled to the processor. The memory may contain programming for analysis and logic for optimization of energy, environmental footprint, and cost, that is executed by the processor to create an energy analysis system that communicates to obtain energy usage data for a consumer, other dynamic data related to energy usage, and dynamic user information related to the user's consumption of energy. The results of the optimization implementation may be ranked for further review and action by a user. The results of the optimization advisory implementation may also be ranked to provide customer an energy optimization score (e.g., Energy IQ).

The method described in this disclosure addresses these issues with a distinctive, holistic approach. The method uses cross-pollinating lessons learned across energy sectors and integrating digital and energy technology with behavioral science. The present disclosure also addresses these issues to help energy providers and consumers alike to realize the full potential of the transition towards more decentralized, decarbonized and increasingly digital energy systems.

The energy analysis control system of the present disclosure provides direct integration and linkage of customer historical energy usage data, lifestyle schedules, preferences, and settings through advanced data science and simplified pragmatic methods to identify non-intrusive ways to save energy without requiring efforts by the customer to change the regular activities in which electricity is actively consumed in a household. This integration of a plurality of customer inputs, data and behavioral science brings visibility to previously unknown wasted electricity, quantify its associated cost and environmental impact, and equally importantly provides a non-intrusive way to save energy.

The computer implemented energy analysis system of the present disclosure uses at least one processor, a communication interface coupled to the processor, and a memory coupled to the processor. The memory may contain programming for energy analysis logic that is executed by the processor to create an energy analysis system that communicates to obtain and analyze energy usage data, other dynamic data related to energy usage, and dynamic user information related to the user's consumption of energy that can be obtained by multiple methods including smart devices, monitoring systems, the customer interactive interfaces. The results of the analysis may be ranked for further review and action by a user.

The computer implemented energy analysis system of the present disclosure provides direct integration and linkage of customer historical energy usage data, lifestyle schedules, preferences, and settings through advanced data science and simplified pragmatic methods to identify non-intrusive ways to save energy without requiring efforts by the customer to change the regular activities in which electricity is actively consumed in a household. This integration of a plurality of customer inputs, data and behavioral science brings visibility to previously unknown wasted electricity, quantify its associated cost and environmental impact, and equally importantly provides a non-intrusive way to save energy.

The energy analysis system of the present disclosure creates and uses a multidimensional model comprised of the integration of a plurality of different functions that varying over time, that include electricity consumptions variation over time, lifestyle behavior variations over time (e.g., schedules, occupants), preferences variations over time (e.g., space cooling and heating set points, water heater temperature, cost reduction, environmental footprint reduction, etc.), building feature efficiency variations over time (e.g., new A/C, new led lights, aging appliance, broken air sealing barriers, maintenance, etc.), and outdoor temperature variations over time that are location specific.

Demand for inexpensive, clean and readily available energy is an ever-growing reality, which is necessary if mankind is to prosper while minimally impacting and harming the environment. Actionable knowledge and collaboration with all stakeholders in the energy ecosystem, to create a future of sustainable energy abundance, should be a long-term and consistent goal. Energy is an integral currency for sustainable economic development that affects everyone's daily lives—from transportation to online ecommerce. Providing robust, intelligent, and cost-efficient options with a systematized capability to make informed recommendations for consumers must be a priority, and thus, is a main objective of the Energy Advisor innovation of the present disclosure.

The present disclosure provides a system for end-user energy analytics and optimization that is useful for obtaining and analyzing power consumption to establish a baseline for energy consumption and monitoring actual consumption for variances from the baseline and the determination of the cause for and correction of a variance, having at least one processor and an associated instruction memory; at least one memory storage device configured to store: (i) historical energy usage data for a premises (facility), (ii) historical weather data for the zone associated with the premises (facility), (iii) data for unique and variable premises energy characteristics, (iv) electricity utility or supplier plan data, (v) end-user provided data regarding optimization criteria, and (vi) products and services from a local product and services database; an analytics and computation engine executed by said at least one processor using a first portion of instructions stored in said associated instruction memory for performing: (i) conversion of and storing of historical energy usage data for a premises, (ii) statistical analysis of, aggregation of and disaggregation of said historical energy usage data, (iii) statistical analysis of historical weather data associated with historical energy usage data, (iv) machine learning and employing artificial intelligence models to identify data clustering, outliers and other data driven insights and incorporating ongoing feedback to selected portions of the analysis, (v) time slice synchronization of selected portions of said data stored in said at least one memory storage device, (vi) analyzing said data for energy consumption by one or more energy devices associated with said premises, (vii) computation of energy costs using said converted and stored historical energy usage data, (viii) providing alternative representations of energy usage data associated with a source of energy for said premises, (ix) determining/providing recommendations for available energy reduction choices, (x) providing a baseline for energy consumption, (xi) monitoring actual consumption for variances from the baseline, and (xii) determining the cause for and correction of any variance; a display engine executed by said at least one processor using a second portion of instructions stored in said associated instruction memory for: (i) receiving end-user goals, lifestyle behaviors, and premises information and occupation data, (ii) displaying synchronized time slice data in one or more pre-selected formats, (iii) displaying alternative representations of energy usage data associated with a source of energy for said premises, (iv) displaying recommendations for available energy reduction choices, (v) displaying energy consumption for said energy devices associated with said premises, (vi) displaying and alerting an end-user of variances in energy use based on one or more of selected set points, excessive usage, variances from baseline, and unintentional usage, and (vii) recommending possible remediation(s) to eliminate or mitigate usage increases.

The present disclosure provides an energy analytics and optimization control system for use by an end-user for monitoring and controlling energy consumption, consisting of a processor; a first memory for storing programming instructions for the processor, wherein a first set of programming instructions when executed by the processor cause the processor to receive, convert and store in a single common interoperable data format preselected data from multiple sources regarding a plurality of customer premises, and wherein a second set of programming instructions when executed by the processor cause the processor to partition historical data, aggregate, compare and analyze said data using at least common time period and time slice information for each premises of the plurality of premises; a second memory for separately storing the preselected data from multiple sources that comprises historical energy usage data for preselected locations for the premises, historical weather data for preselected locations, descriptive information and characteristics data for a plurality of customer premises at the preselected locations, user preference, behavioral and schedule data for respective premises in the plurality of customer premises, consumer products and repair and service providers, and user criteria preferences regarding optimizing consumption, and a user interface for interacting with a user to allow user inputs to the system and at least displaying results in a plurality of preselected formats from said processor processing said preselected data and analysis of the preselected data stored in said memories and from comparisons and combinations of those sets of data in common time periods, wherein the results comprise at least one of the following: comparisons of actual and historical energy usage in the same time period during different times, comparisons of energy usage in adjacent time periods, alternative representations of energy consumption for a preselected time period, energy consumption for preselected energy consumption devices for a preselected time period, determination of unintended energy consumption, efficiency of energy consumption calculated energy optimization score (e.g., Energy IQ), comparisons of energy usage for similar reference premises at the preselected locations for preselected time periods, baseline energy consumption including breakdowns for devices, periodic comparisons of baseline to actual consumption, listing of variances between baseline and actual usage, recommendations for correcting variances, recommendations for corrections of variances to reduce energy consumption to correct variances and reduce consumption, recommendations for adjustment in preference and schedule data for a user to control and reduce energy consumption and environmental impact to correct variances and reduce consumption.

The present disclosure provides an energy analytics and optimization control system for monitoring and controlling energy consumption by a user, consisting of at least one processor and an associated instruction memory, for using and analyzing data from a database configured to store historical weather and temperatures, a database configured to store historical energy usage, a database configured to store location data, a database configured to store end-user preferences, a database configured to store end-user lifestyle information and schedules, a database configured to store end-user premises information, and a database configured to store consumer products and repair and service providers, and to perform analysis of said data from said databases resulting in a multidimensional energy model representative of said analysis of said data in said databases, wherein the model includes comparisons of actual consumption to baseline consumption from the model, including any variances between them, and analysis for the cause of the variances, and determining, providing recommendations for available energy reduction choices, providing operation for smart devices, and providing products and repair and services when needed to eliminate a variance.

Further, the disclosed system is configured for analyzing power consumption to establish a baseline for energy consumption and monitoring actual consumption for variances from the baseline and the determination of the cause for and correction of a variance.

Referring now to figures, FIG. 1 is a block diagram of a system 10000 for optimizing utility consumption associated with at least one premises, in accordance with some embodiments. The system 10000 may include a communication device 10002, a processing device 10004 and a storage device 10006.

The communication device 10002 may be configured for receiving at least one utility consumption information from at least one utility consumption information source. Further, the at least one utility consumption information may be associated with consumption of at least one utility corresponding to the at least one premises.

Further, the communication device 10002 may be configured for receiving at least one premises information from at least one premises information source. Further, the at least one premises information may be associated with the at least one premises.

In some embodiments, the at least one premises information source may include a premises management system configured to manage the at least one premises. In an instance, the premises management system may be operated by one or more of a resident of the at least one premises, a manager of the at least one premises and an owner of the at least one premises. In some embodiments, the at least one premises information source may include a maintenance management system configured to facilitate maintenance of the at least one premises. In some embodiments, the at least one premises information source may include a user device (e.g. a desktop computer, a tablet computer, a smartphone, a mobile phone, a wearable computer, etc.) configured to receive the at least one at least one premises information manually entered by a user (e.g. by way of touch inputs, voice commands, gestures etc.) and transmit the at least one premises information over a network (e.g. the Internet). In some embodiments, the at least one premises information source may be a utility consuming appliance capable of capturing and transmitting the at least one premises information. For instance, the at least the at least one premises information source may be an IoT appliance (e.g. CCTV cameras) configured to provide a corresponding functionality (e.g. surveillance), while also configured to capture and transmit the at least one premises information. In some embodiments, the at least one premises information source may be a database server configured to collect and provision the at least one at least one premises information.

Further, the communication device 10002 may be configured for receiving at least one lifestyle information from at least one lifestyle information source. Further, the at least one lifestyle information may be associated with at least one occupant of the at least one premises.

In some embodiments, the at least one lifestyle information source may include a user device (e.g. a desktop computer, a tablet computer, a smartphone, a mobile phone, a wearable computer, etc.) configured to receive the at least one at least one lifestyle information manually entered by a user (e.g. by way of touch inputs, voice commands, gestures etc.) and transmit the at least one lifestyle information over a network (e.g. the Internet). In some embodiments, the at least one lifestyle information source may be an appliance capable of capturing and transmitting the at least one lifestyle information. For instance, the at least the at least one lifestyle information source may be an IoT appliance (e.g. IoT appliance, IoT sensor, IoT camera, microphone etc.) configured to capture and transmit the at least one lifestyle information. In some embodiments, the at least one lifestyle information source may be a database server configured to collect and provision the at least one at least one lifestyle information.

Further, the communication device 10002 may be configured for performing at least one of transmitting at least one utility recommendation associated with the at least one premises to at least one electronic device and transmitting at least one actuation data to at least one appliance associated with the at least one premises. Further, at least one configuration of the at least one appliance may be based on the at least one actuation data. Further, the at least one configuration may include, for example, an operational state (e.g. ON, OFF, STANDBY, etc.) of the at least one appliance. Further, the at least one configuration may include one or more operational settings associated with the at least one appliance. Further, the at least one appliance may include an integration hub and a plurality of smart devices communicatively coupled to the integration hub.

In general, the at least one electronic device may be any electronic device configured to communicate with the system 10000. In some embodiments, the at least lone electronic device may include a personal user device (E.g. smartphone, desktop computer, tablet computer, wearable computer etc.) associated with one or more users such as, for example, an occupant of the at least one premises, an administrative user corresponding to the at least one premises, a manager of the at least one premises, an owner of the at least one premises and a utility administrator/manager associated with the at least one utility provider.

In some embodiments, the communication device 10002 may be configured to receive at least one building mode from the at least one electronic device. Further, the at least one building mode may include indication of the at least one appliance corresponding to the at least one actuation data.

Further, the processing device 10004 may be analyzing each of the at least one utility consumption information, the at least one premises information and the at least one lifestyle information.

Further, the processing device 10004 may be generating at least one of the at least one utility recommendation and the at least one actuation data based on the analyzing.

Further, the storage device 10006 may be configured for storing each of the at least one utility consumption information, the at least one premises information, the at least one lifestyle information and at least one of the at least one utility recommendation and the at least one actuation data.

In further embodiments, the processing device 10004 may be configured for generating at least one utility fingerprint associated with the at least one premises based on the analyzing. Further, the generating of at least one of the at least one utility recommendation and the at least one actuation data may be further based on analyzing the at least one utility fingerprint.

The at least one utility fingerprint may be associated with consumption of at least one utility at the at least one premises. Further, in some embodiments, the at least one utility fingerprint be associated with an actual consumption of the at least one utility. In some embodiments, the at least one utility fingerprint be associated with a projected consumption of the at least one utility.

In general, the at least one utility may include any consumable that is distributable by at least one utility provider to a plurality of consumers. Examples of the at least one utility may include, but are not limited to, energy utility, such as, for example, electricity, gas, heating and cooling etc. Other such examples of the at least one utility, include, without limitation, pressurizing, de-pressurizing, humidifying, de-humidifying, sanitizing and so on.

Further, in some embodiments, the at least one utility may include a non-energy utility such as, for example, water, air, oxygen and so on. Additionally, and/or alternatively, in some embodiments, the at least one utility may include a non-energy utility including a consumable substance, such as for example, water, a biological nutrient and so on. Further, in some embodiments, the at least one utility may include a communication service, such as for example, network connectivity (e.g. Internet connectivity).

In some embodiments, the utility fingerprint may include an energy fingerprint. Further, the at least one utility may include an energy utility. In general, the energy utility may include any utility facilitating an exchange of energy between a utility provider and a consumer.

In further embodiments, the communication device 10002 may be configured for receiving at least one optimization criteria from the at least one electronic device. Further, the generating of at least one of the at least one utility recommendation and the at least one actuation data may be based further on the at least one optimization criteria. Further, the at least one utility recommendation may include a plurality of utility recommendations and a plurality of weighted scores associated with the plurality of utility recommendations. Further, the plurality of weighted scores are based on the at least one optimization criteria. Further, the at least one utility recommendation may include indication of at least one product and at least one service configured towards optimizing consumption of the at least one utility.

Further, generating (via the processing device 10004) of the plurality of the weighted scores may include determining a plurality of impacts corresponding to each utility recommendation of the plurality of utility recommendations, wherein the plurality of impacts corresponds to the plurality of optimization criteria. Further, the plurality of impacts comprises a cost saving impact, an environmental impact, a lifestyle impact and a budget impact. Further, generating of the plurality of the weighted scores may include calculating the plurality of weighted scores based on the plurality of impacts corresponding to each utility recommendation.

Further, the optimization criteria may include a plurality of optimization criteria and a plurality of importance levels associated with the plurality of optimization criteria. Further, the plurality of optimization criteria may include a cost impact, an environmental impact, a lifestyle impact and a budget.

In further embodiments, the at least one utility consumption information may include a first utility consumption information corresponding to a first time period and a second utility consumption information corresponding to a second time period. Further, the second time period is later than the first time period. Further, the analyzing may include determining a utility consumption variation based on comparing the first utility consumption information and the second utility consumption information and identifying a cause for the utility consumption variation; wherein the at least one utility recommendation may include at least one correctional recommendation that mitigates, at least partially, the utility consumption variation.

In an instance, the first time period may include duration of 12 months (or any other duration sufficient for capturing all periodic variations (e.g. seasonal variations with regards to environmental conditions, behavioral variations with regard to the at least one lifestyle information, maintenance variations with regard to the at least one premises information and so on) of the at least one premises. Further, the first utility consumption information may correspond to a baseline utility consumption, which may be derived, for instance, by averaging utility consumption over a period of, for example, 12 months.

In general, the utility consumption information may represent any information regarding consumption of the at least one utility. Further, the at least one utility consumption information source may be any source capable of supplying the at least one utility consumption information. In some embodiments, the at least utility consumption information source may include a smart utility meter configured to capture the at least one utility consumption information and transmit the at least one utility consumption information. For example, in some embodiments, the at least utility consumption information source may include a smart meter configured to measure consumption of the at least one utility (E.g. electricity, fuel, water etc.) by the at least one premises. In some embodiments, the at least one utility consumption information source may be a utility consuming appliance capable of measuring and transmitting consumption of the utility. For instance, the at least one utility consumption information source may be an IoT appliance configured to provide a corresponding functionality, while also configured to measure and transmit consumption of the utility. In some embodiments, the at least one utility consumption information source may be a database server configured to collect and provision the at least one utility consumption information. For instance, the database server may be operated by a utility provider. Further, in some embodiments, the at least one utility consumption information source may include a user device (e.g. a desktop computer, a tablet computer, a smartphone, a mobile phone, a wearable computer, etc.)

configured to receive the at least one utility consumption information manually entered by a user (e.g. by way of touch inputs, voice commands, gestures etc.) and transmit the at least one utility consumption information over a network (e.g. the Internet).

Further, the at least one lifestyle information may include a first lifestyle information associated with the first time period and a second lifestyle information associated with the second time period. Further, the at least one premises information may include at least one efficiency indicator associated with the at least one utility consuming appliance deployed in the at least one premises. Further, the at least one efficiency indicator may include a first efficiency indicator corresponding to a first time period and a second efficiency indicator corresponding to a second time period. Further, the analyzing may include determining a lifestyle variation based on comparing the first lifestyle information and the second lifestyle information. Further, the analyzing may include determining an efficiency variation based on comparing the first efficiency indicator and the second efficiency indicator; wherein the at least one correctional recommendation corresponds to at least one of the utility consumption variation, the lifestyle variation and the efficiency variation. Further, the at least one correctional recommendation mitigates at least partially, at least one of the utility consumption variation, the lifestyle variation and the efficiency variation.

Further, the analyzing may include determining an implementation of the at least one utility recommendation based on at least one of the utility consumption variation, the lifestyle variation and the efficiency variation.

In further embodiments, the communication device 10002 may be configured for receiving at least one environmental information from at least one environmental information source. Further, the at least one environmental information may be associated with the at least one premises. Further, the at least one premises information may include a premises identifier associated with a premises of the at least one premises. Further, the analyzing may include identifying a premises information associated with the premises, performing a first comparison of the premises information with a plurality of premises information, performing a second comparison of a lifestyle information associated with the premises with a plurality of lifestyle information, performing a third comparison of an environmental information associated with the premises with a plurality of environmental information, determining a reference premises information based on each of the first comparison, the second comparison and the third comparison, determining a reference utility consumption information associated with the reference premises, performing a fourth comparison of a utility consumption information associated with the premises and the reference utility consumption information and determining a utility optimization score based on the fourth comparison.

In further embodiments, the communication device 10002 may be configured for receiving at least one schedule information from a schedule information source. Further, the processing device 10004 may be configured for determining at least one activity and at least one-time period based on the at least one schedule information.

In some embodiments, the schedule information source may include a user device (e.g. a desktop computer, a tablet computer, a smartphone, a mobile phone, a wearable computer, etc.) configured to receive the at least one at least one schedule information manually entered by a user (e.g. by way of touch inputs, voice commands, gestures etc.) and transmit the at least one schedule information over a network (e.g. the Internet). In some embodiments, the schedule information source may include a calendar application configured to automatically transmit the at least one schedule information. In some embodiments, the at least one schedule information source may be an appliance capable of capturing and transmitting the at least one schedule information. For instance, the at least the at least one schedule information source may be an IoT appliance (e.g. IoT appliance, IoT sensor, IoT camera, microphone, etc.) configured to capture and transmit the at least one schedule information. In some embodiments, the at least one schedule information source may be a database server configured to collect and provision the at least one at least one schedule information.

Figure 2:
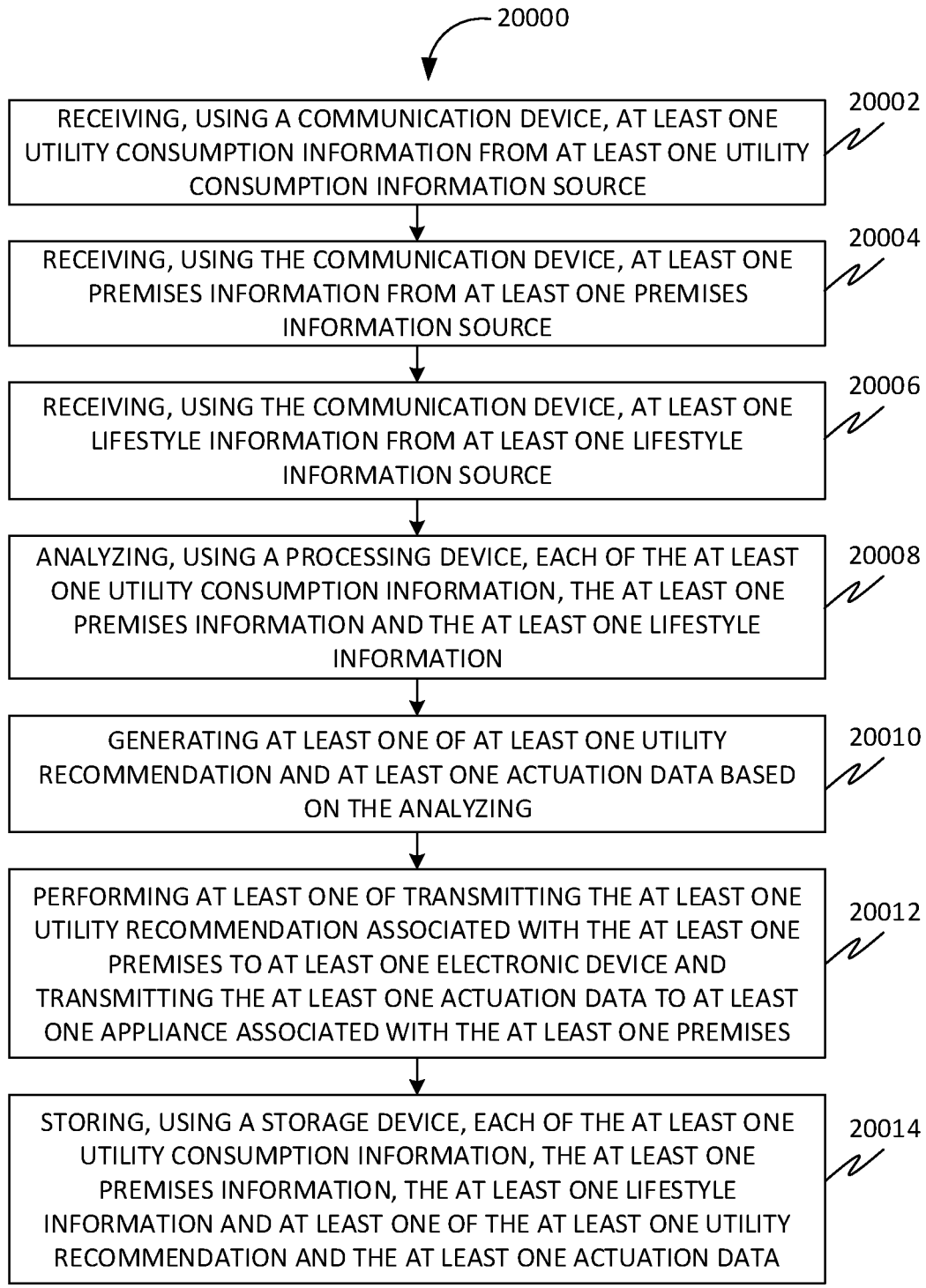
FIG. 2 is a flowchart of a method for optimizing utility consumption associated with at least one premises, in accordance with some embodiments.

FIG. 2 is a flowchart of a method 20000 for optimizing utility consumption associated with at least one premises, in accordance with some embodiments. At 20002, the method 20000 may include receiving, using a communication device (such as the communication device 10002), at least one utility consumption information from at least one utility consumption information source. Further, the at least one utility consumption information may be associated with consumption of at least one utility corresponding to the at least one premises.

Further, at 20004, the method 20000 may include receiving, using the communication device, at least one premises information from at least one premises information source. Further, the at least one premises information may be associated with the at least one premises.

Further, at 20006, the method 20000 may include receiving, using the communication device, at least one lifestyle information from at least one lifestyle information source. Further, the at least one lifestyle information may be associated with at least one occupant of the at least one premises.

Further, at 20008, the method 20000 may include analyzing, using a processing device (such as the processing device 10004), each of the at least one utility consumption information, the at least one premises information and the at least one lifestyle information.

Further, at 20010, the method 20000 may include generating at least one of at least one utility recommendation and at least one actuation data based on the analyzing.

Further, at 20012, the method 20000 may include performing at least one of transmitting the at least one utility recommendation associated with the at least one premises to at least one electronic device and transmitting the at least one actuation data to at least one appliance associated with the at least one premises. Further, at least one configuration of the at least one appliance may be based on the at least one actuation data.

Further, the at least one configuration of the at least one appliance may be based on the at least one actuation data. Further, the at least one configuration may include, for example, an operational state (e.g. ON, OFF, STANDBY, etc.) of the at least one appliance. Further, the at least one configuration may include one or more operational settings associated with the at least one appliance. Further, the at least one appliance may include an integration hub and a plurality of smart devices communicatively coupled to the integration hub.

Further, at 20014, the method 20000 may include storing, using a storage device (such as the storage device 10006), each of the at least one utility consumption information, the at least one premises information, the at least one lifestyle information and at least one of the at least one utility recommendation and the at least one actuation data.

In further embodiments, the method 20000 may include generating, using the processing device, at least one utility fingerprint associated with the at least one premises based on the analyzing. Further, the generating of at least one of the at least one utility recommendation and the at least one actuation data may be based on analyzing the at least one utility fingerprint.

In further embodiments, the method 20000 may include receiving, using the communication device, at least one building mode from the at least one electronic device. Further, the at least one building mode may include indication of the at least one appliance corresponding to the at least one actuation data.

In further embodiments, the method 20000 may include receiving, using the communication device, at least one optimization criteria from the at least one electronic device. Further, the generating of at least one of the at least one utility recommendation and the at least one actuation data may be based further on the at least one optimization criteria. Further, the at least one utility recommendation may include a plurality of utility recommendations and a plurality of weighted scores associated with the plurality of utility recommendations. Further, the plurality of weighted scores may be based on the at least one optimization criteria. Further, the at least one utility recommendation may include indication of at least one product and at least one service configured towards optimizing consumption of the at least one utility.

Further, the optimization criteria may include a plurality of optimization criteria and a plurality of importance levels associated with the plurality of optimization criteria. Further, the plurality of optimization criteria may include a cost impact, an environmental impact, a lifestyle impact and a budget.

Figure 3:
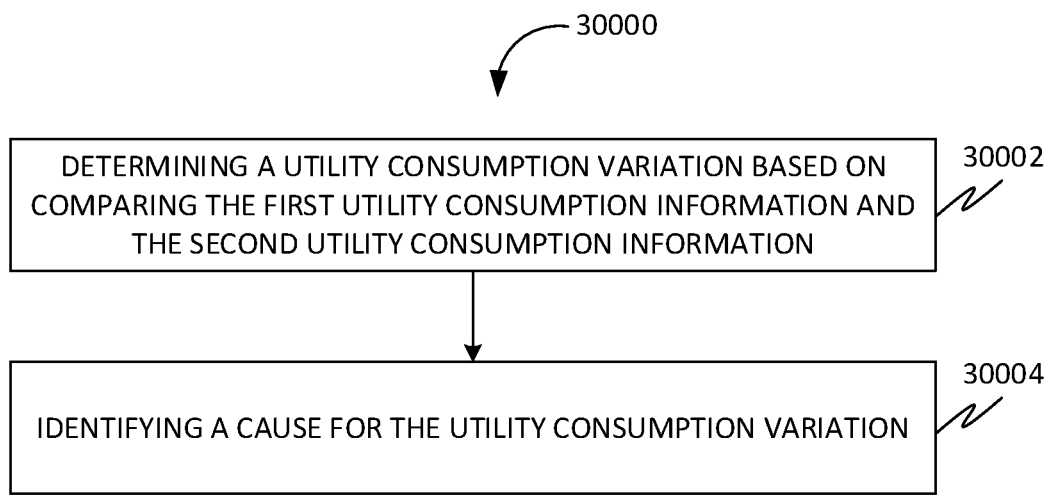
FIG. 3 is a flowchart of a method for determining a cause for a utility consumption variation, in accordance with further embodiments.

FIG. 3 is a flowchart of a method 30000 for determining a cause for a utility consumption variation, in accordance with further embodiments. Further, the at least one utility consumption information may include a first utility consumption information corresponding to a first time period and a second utility consumption information corresponding to a second time period. Further, the second time period is later than the first time period.

Further, at 30002, the method 30000 may include determining the utility consumption variation based on comparing the first utility consumption information and the second utility consumption information. The step 30002 may be a sub-step of the analyzing step 20008 of the method 20000.

Further, at 30004, the method 30000 may include identifying a cause for the utility consumption variation. Further, the at least one utility recommendation may include at least one correctional recommendation that mitigates, at least partially, the utility consumption variation. The step 30004 may be a sub-step of the analyzing step 20008 of the method 20000.

Figure 4:
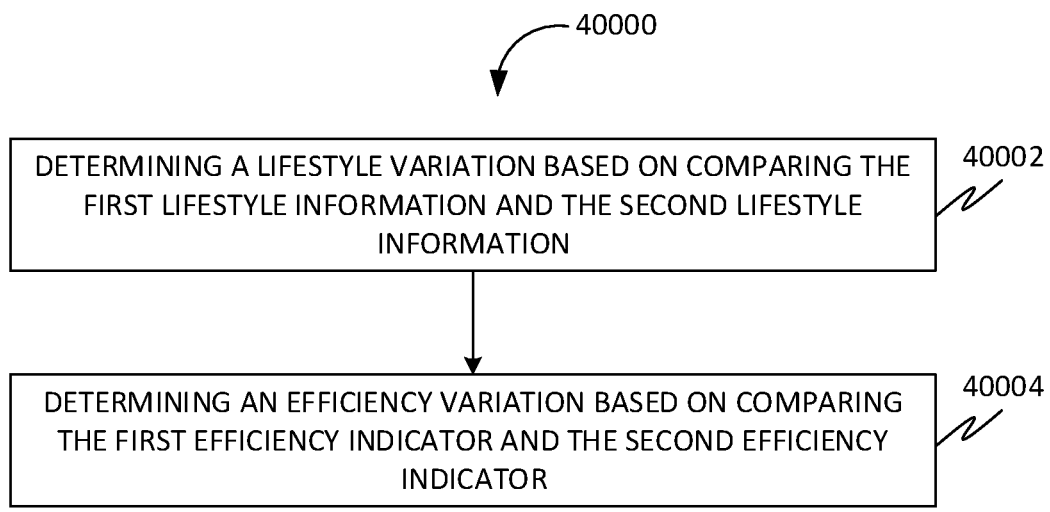
FIG. 4 is a flowchart of a method for determining a lifestyle variation and an efficiency variation, in accordance with further embodiments.

FIG. 4 is a flowchart of a method 40000 for determining a lifestyle variation and an efficiency variation, in accordance with further embodiments. Further, the at least one lifestyle information may include a first lifestyle information associated with the first time period and a second lifestyle information associated with the second time period. Further, the at least one premises information may include at least one efficiency indicator associated with the at least one utility consuming appliance deployed in the at least one premises. Further, the at least one efficiency indicator may include a first efficiency indicator corresponding to a first time period and a second efficiency indicator corresponding to a second time period.

Further, at 40002, the method 40000 may include determining the lifestyle variation based on comparing the first lifestyle information and the second lifestyle information. The step 40002 may be a sub-step of the analyzing step 20008 of the method 20000.

Further, at 40004, the method 40000 may include determining the efficiency variation based on comparing the first efficiency indicator and the second efficiency indicator; wherein the at least one correctional recommendation corresponds to at least one of the utility consumption variation, the lifestyle variation and the efficiency variation. Further, the at least one correctional recommendation mitigates at least partially, at least one of the utility consumption variation, the lifestyle variation and the efficiency variation. The step 40004 may be a sub-step of the analyzing step 20008 of the method 20000.

In further embodiments, the method 40000 may include determining an implementation of the at least one utility recommendation based on at least one of the utility consumption variation, the lifestyle variation and the efficiency variation. This step may be a sub-step of the analyzing step 20008 of the method 20000.

In further embodiments, the method 20000 may include receiving at least one environmental information from at least one environmental information source. Further, the at least one environmental information may be associated with the at least one premises. Further, the at least one premises information may include a premises identifier associated with a premises of the at least one premises.

Figure 5:
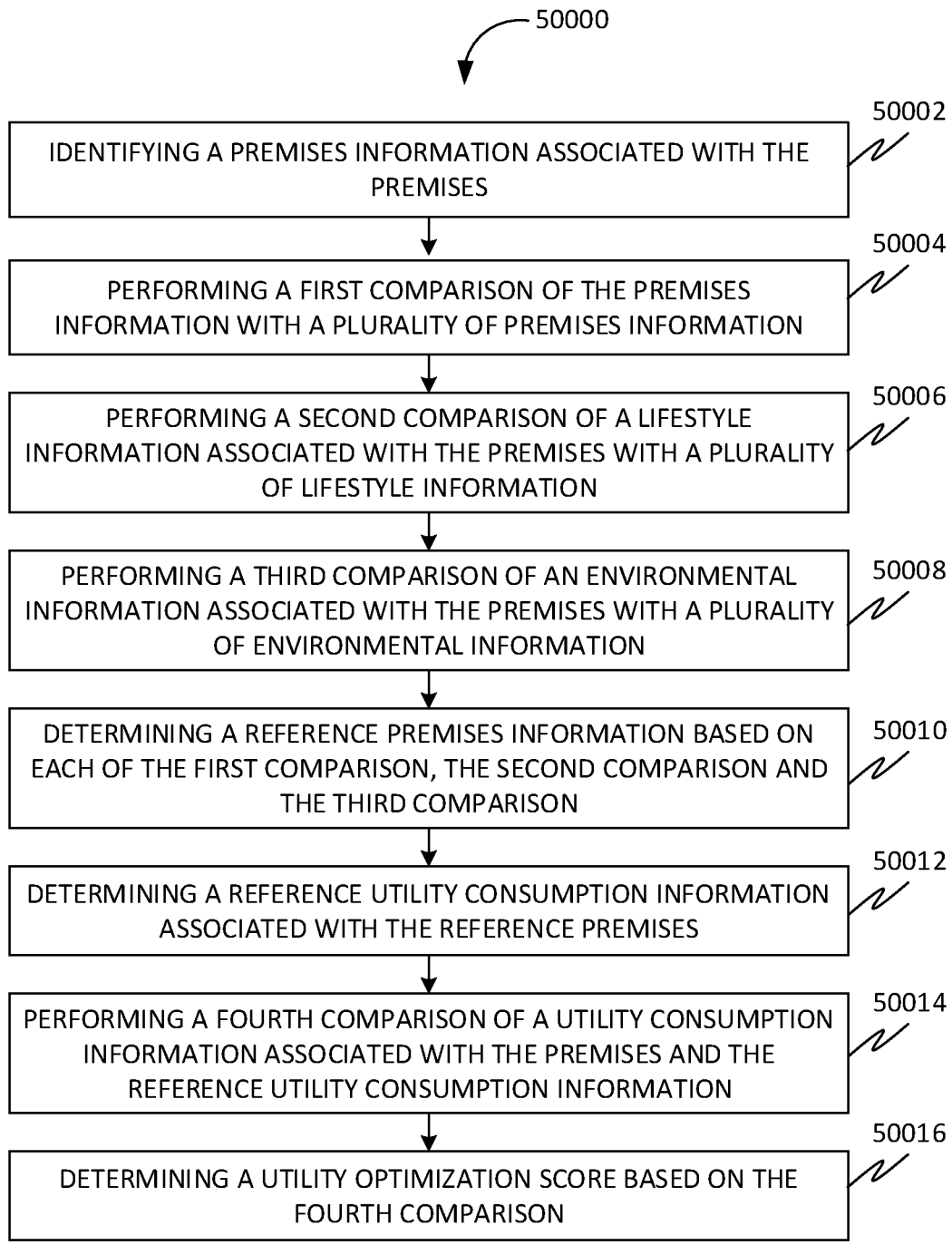
FIG. 5 is a flowchart of a method for determining a utility optimization score, in accordance with further embodiments.

FIG. 5 is a flowchart of a method 50000 for determining a utility optimization score, in accordance with further embodiments. The steps of the method 50000 may be sub-steps of the analyzing step 20008 of the method 20000.

Further, at 50002, the method 50000 may include identifying a premises information associated with the premises.

Further, at 50004, the method 50000 may include performing a first comparison of the premises information with a plurality of premises information.

Further, at 50006, the method 50000 may include performing a second comparison of a lifestyle information associated with the premises with a plurality of lifestyle information.

Further, at 50008, the method 50000 may include performing a third comparison of an environmental information associated with the premises with a plurality of environmental information.

Further, at 50010, the method 50000 may include determining a reference premises information based on each of the first comparison, the second comparison and the third comparison.

Further, at 50012, the method 50000 may include determining a reference utility consumption information associated with the reference premises.

Further, at 50014, the method 50000 may include performing a fourth comparison of a utility consumption information associated with the premises and the reference utility consumption information.

Further, at 50016, the method 50000 may include determining the utility optimization score based on the fourth comparison.

Figure 6:
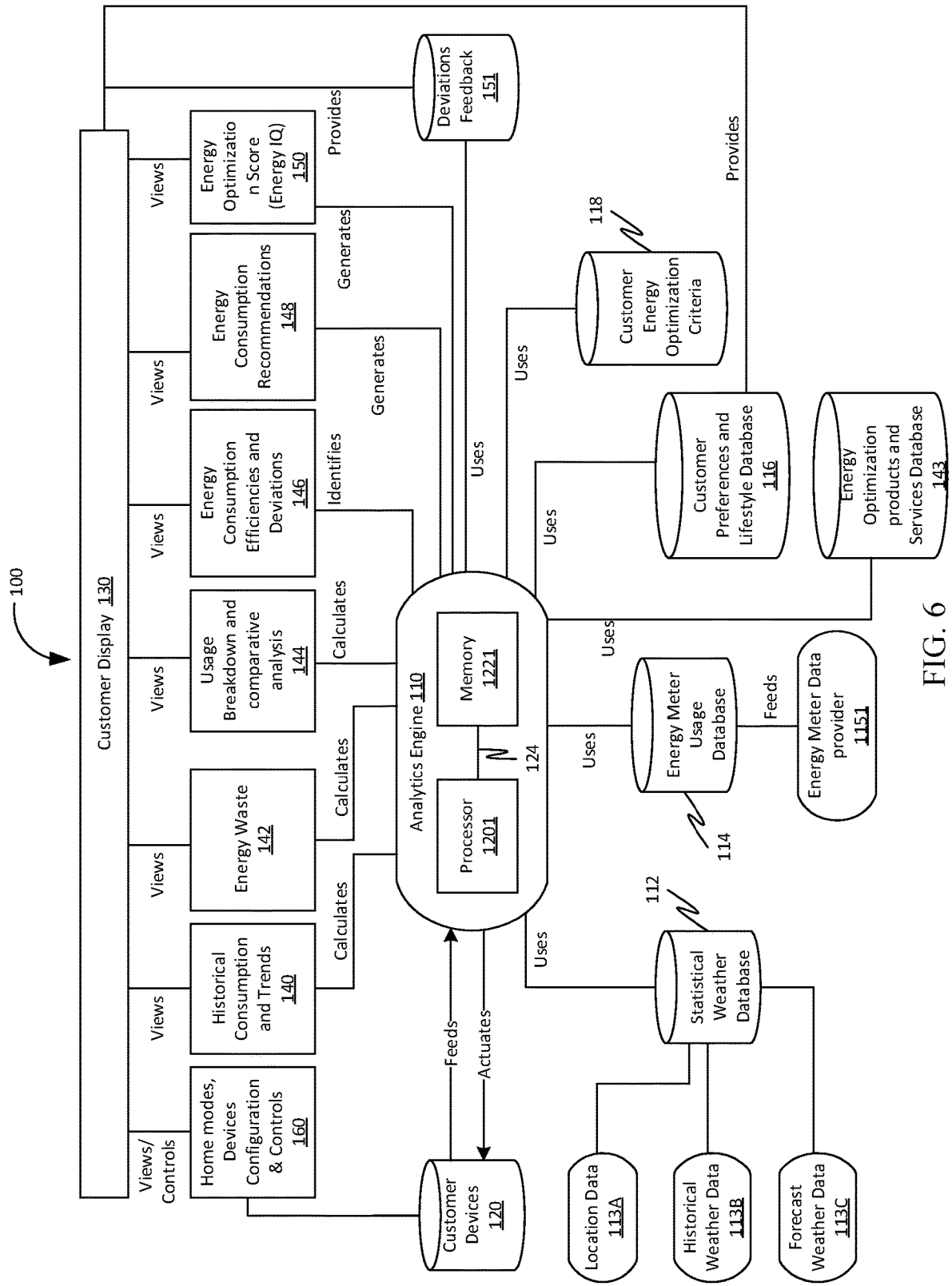
FIG. 6 is a block diagram of a system for end-use analytics and optimization of energy consumption.

FIG. 6 depicts a simplified system block diagram for end-use analytics and optimization of energy consumption.

Figure 7:
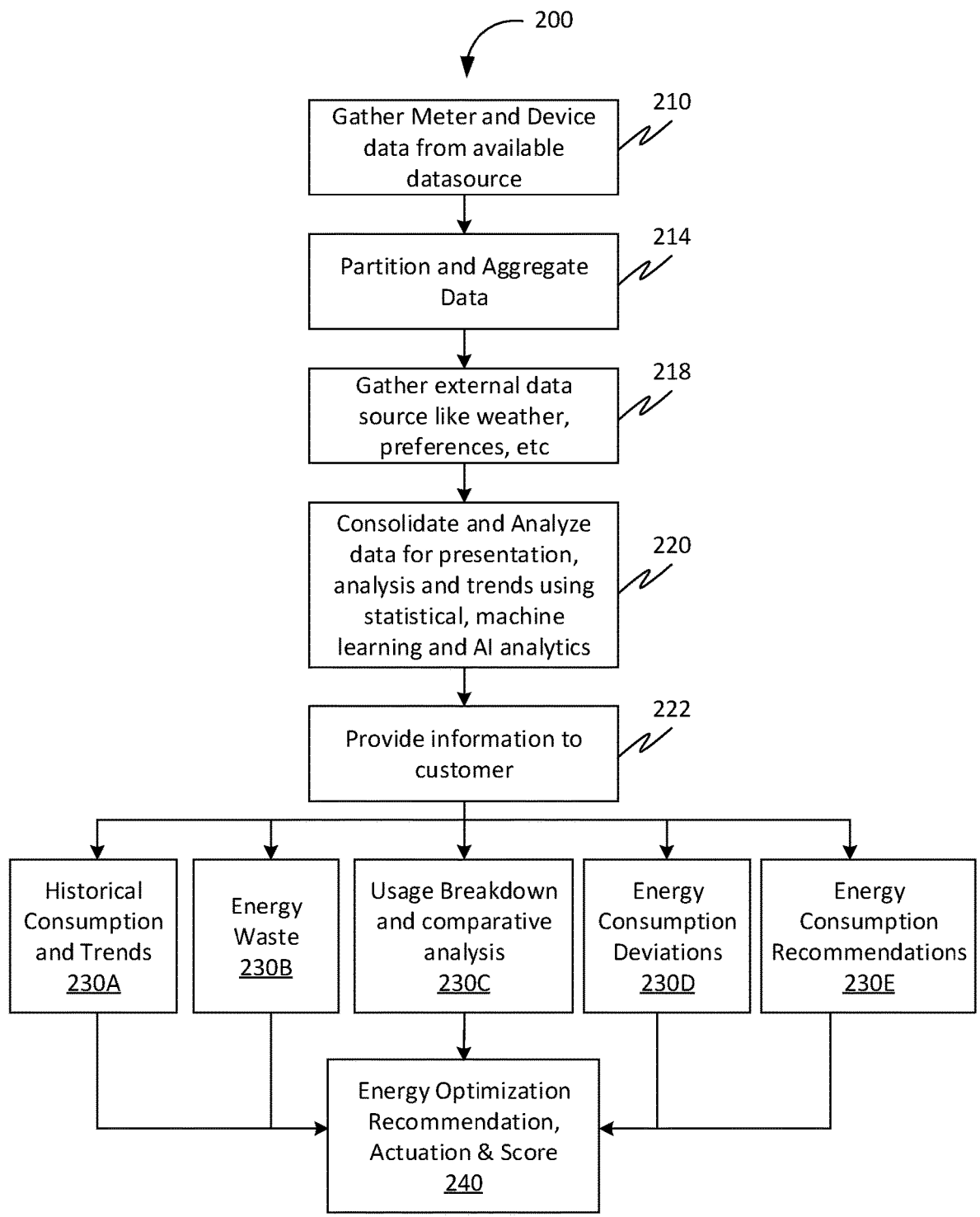
FIG. 7 is a flow diagram of the major processing steps that the platform of FIG. 6 may employ to receive and analyze the various data from the plurality of databases.
Figure 8:
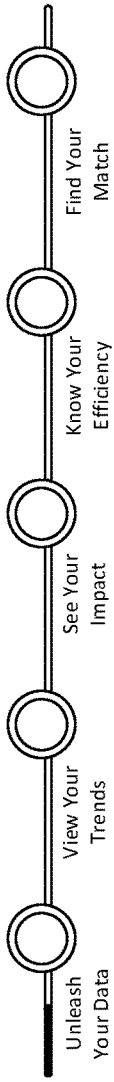
FIG. 8 depicts a representative GUI for user communications with the system, in accordance with some embodiments.

FIG. 7 depicts a flow diagram of the major processing steps that the platform of FIG. 6 may employ to receive and analyze the various data from the plurality of databases.

FIGS. 8, 9, 10, and 11 depict representative GUIs for user communications with the system.

Figure 12:
FIG. 12 depicts a representative GUI for system communications with the user, in accordance with some embodiments.

FIG. 12 depicts representative GUIs for system communications with the user.

Figure 13:
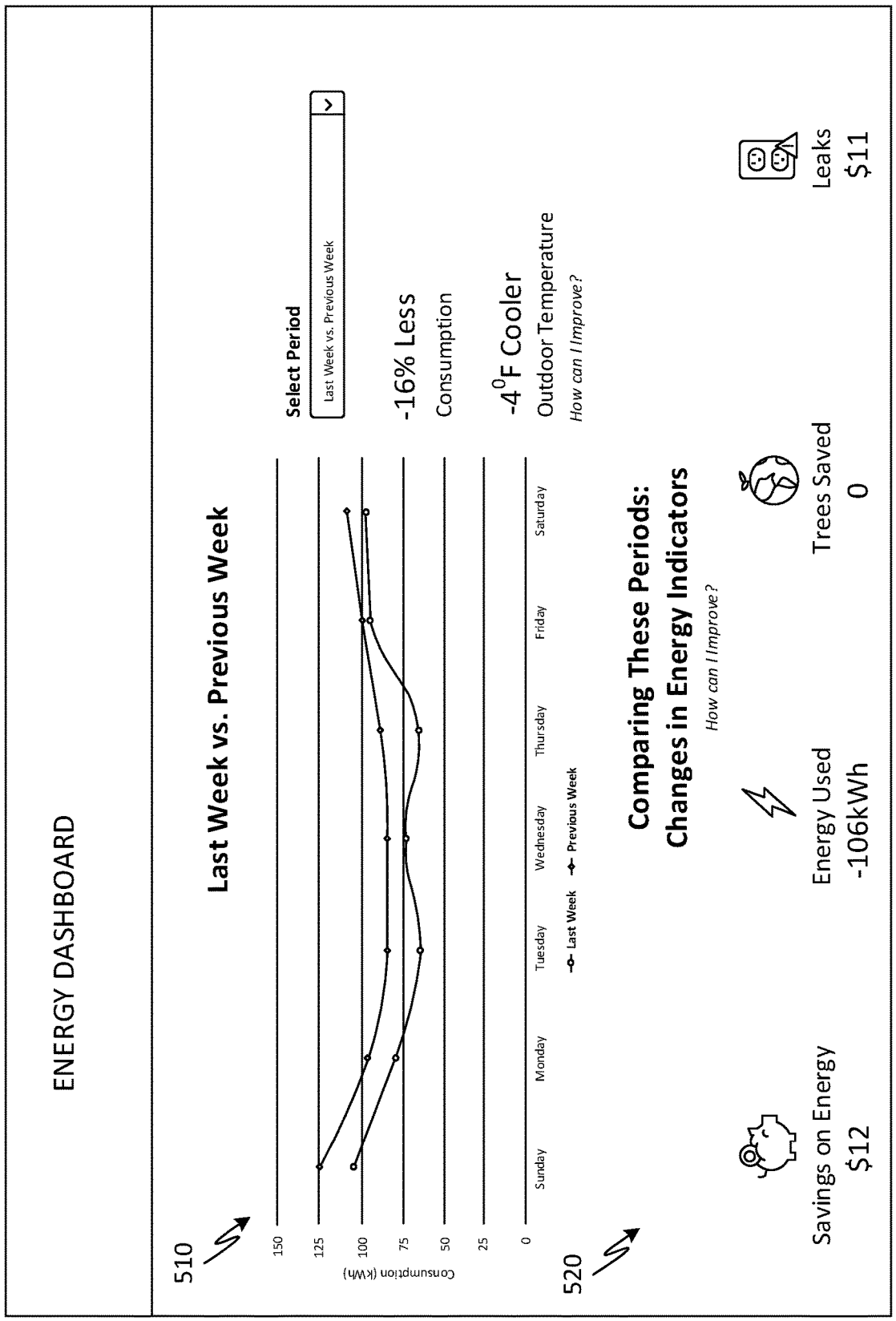
FIG. 13 depicts a representative GUI for system communications with the user, in accordance with some embodiments.

FIG. 13 depicts representative GUIs for system communications with the user.

FIGS. 14-19 depict representative GUIs for system communications with the user.

Figure 20:
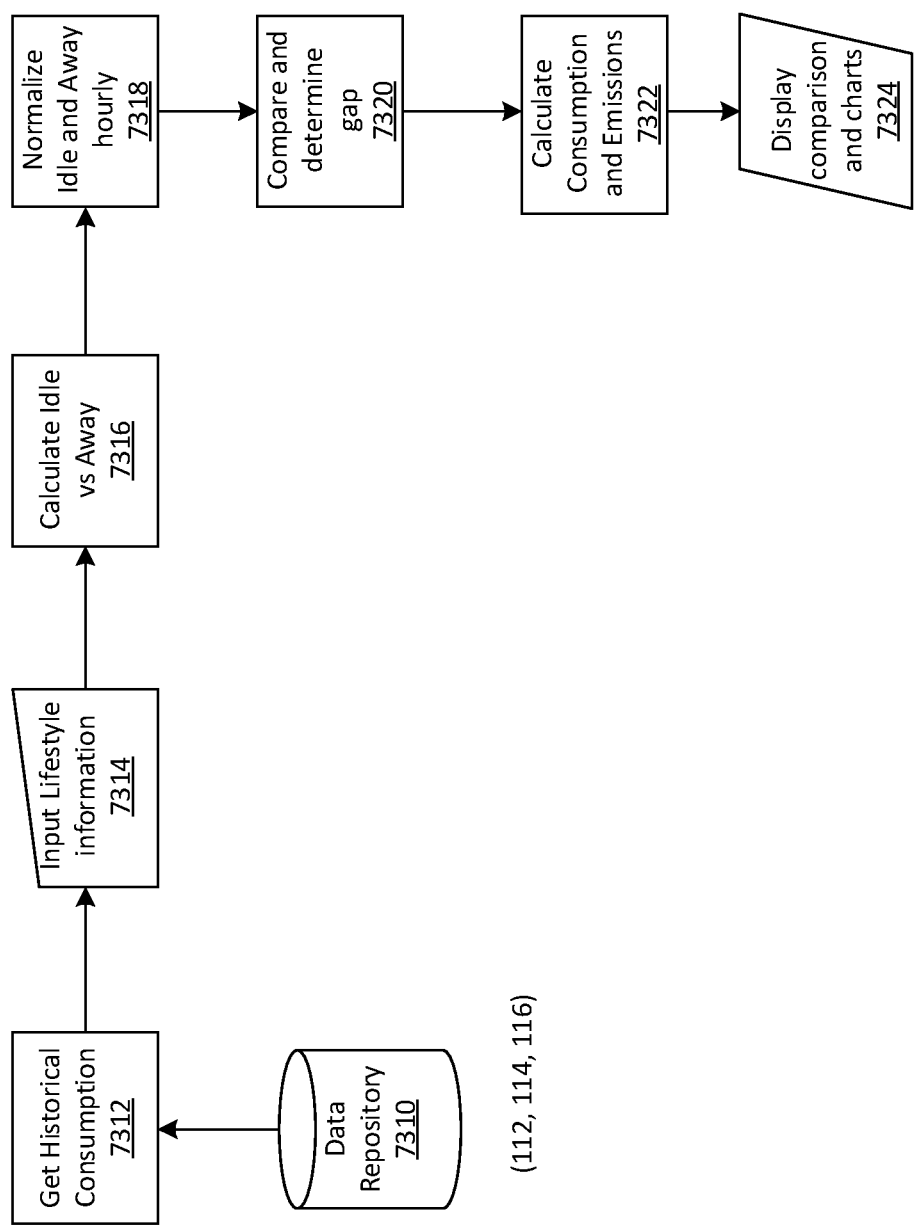
FIG. 20 depicts a simplified block diagram for calculating energy leakage, in accordance with some embodiments.

FIG. 20 depicts a simplified block diagram for calculating energy leakage.

Figure 21:
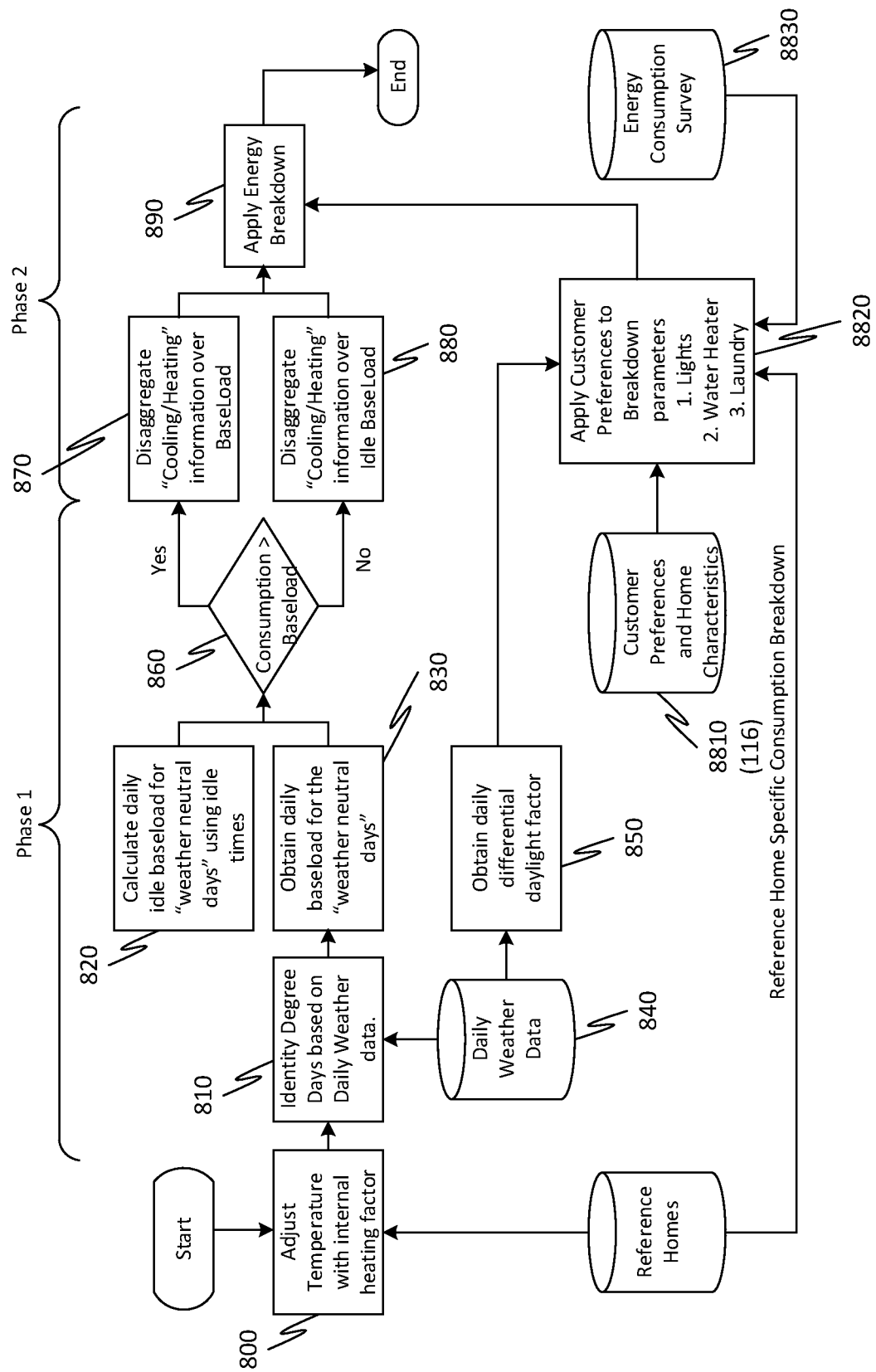
FIG. 21 depicts a more detailed block diagram of a portion of the block diagram of FIG. 20.

FIG. 21 depicts a more detailed block diagram of a portion of the block diagram of FIG. 20.

Figure 22:
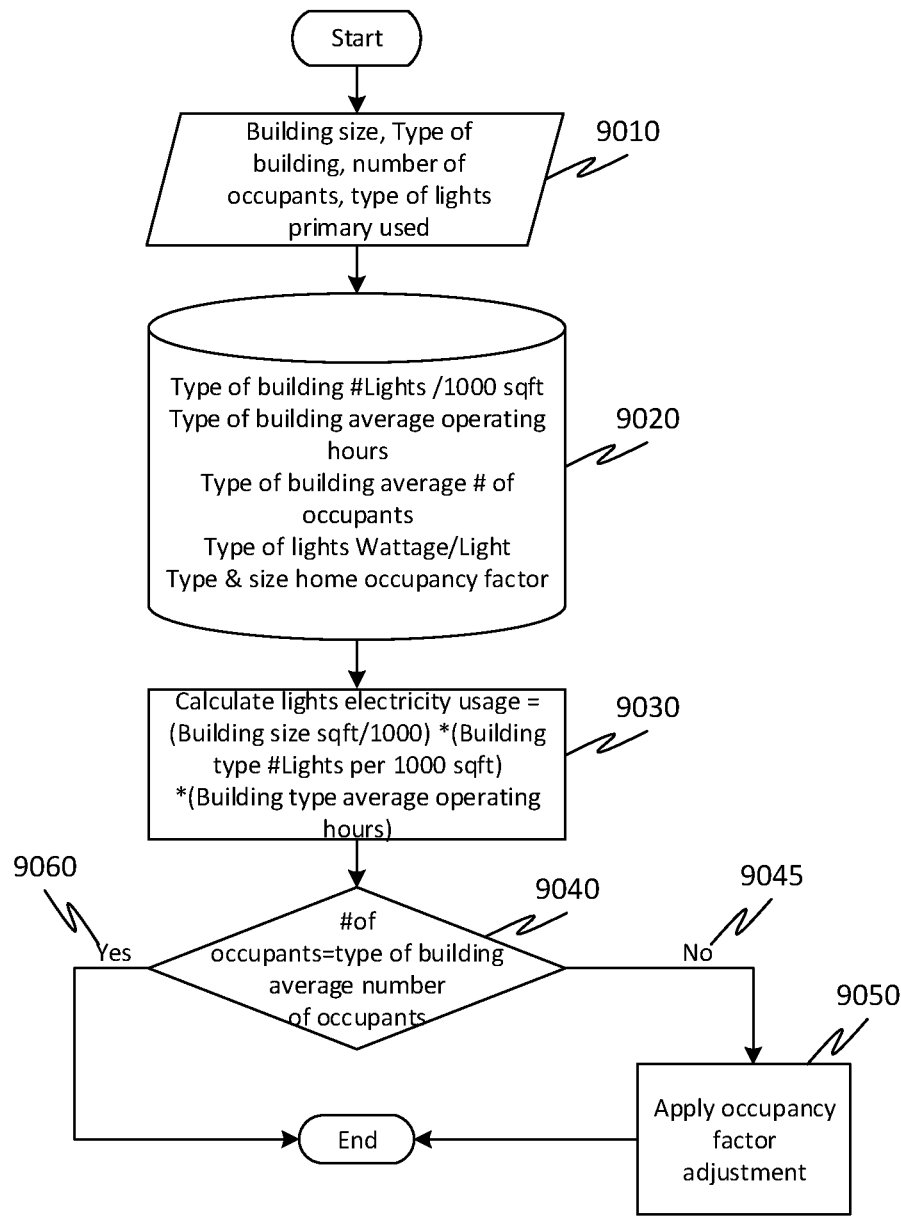
FIG. 22 depicts a simplified block diagram for calculating lighting energy consumption, in accordance with some embodiments.

FIG. 22 depicts a simplified block diagram for calculating lighting energy consumption.

Figure 23:
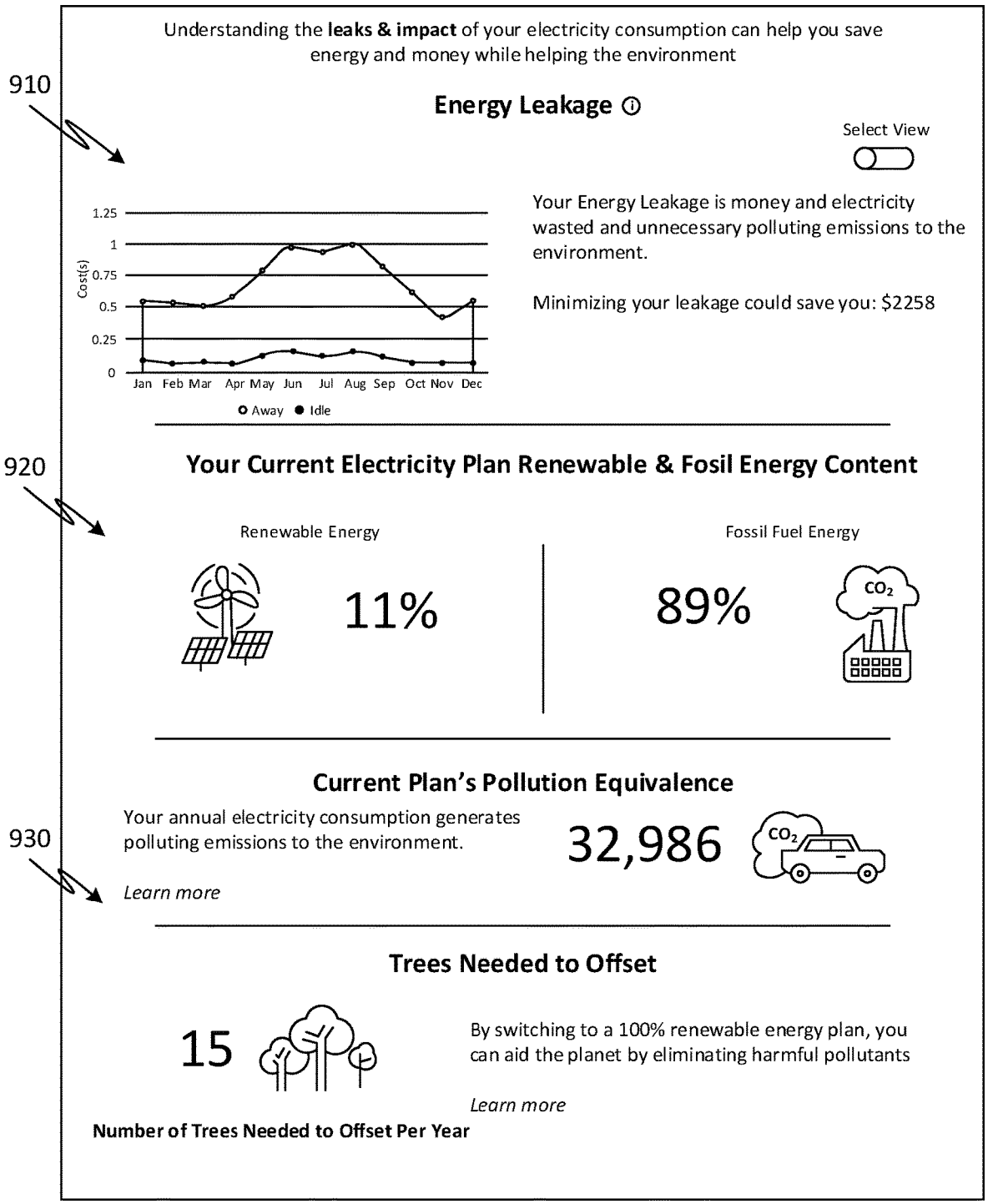
FIG. 23 depicts a representative GUI for system communications with the user regarding energy leakage, in accordance with some embodiments.

FIG. 23 depicts a representative GUI for system communications with the user regarding energy leakage.

Figure 24:
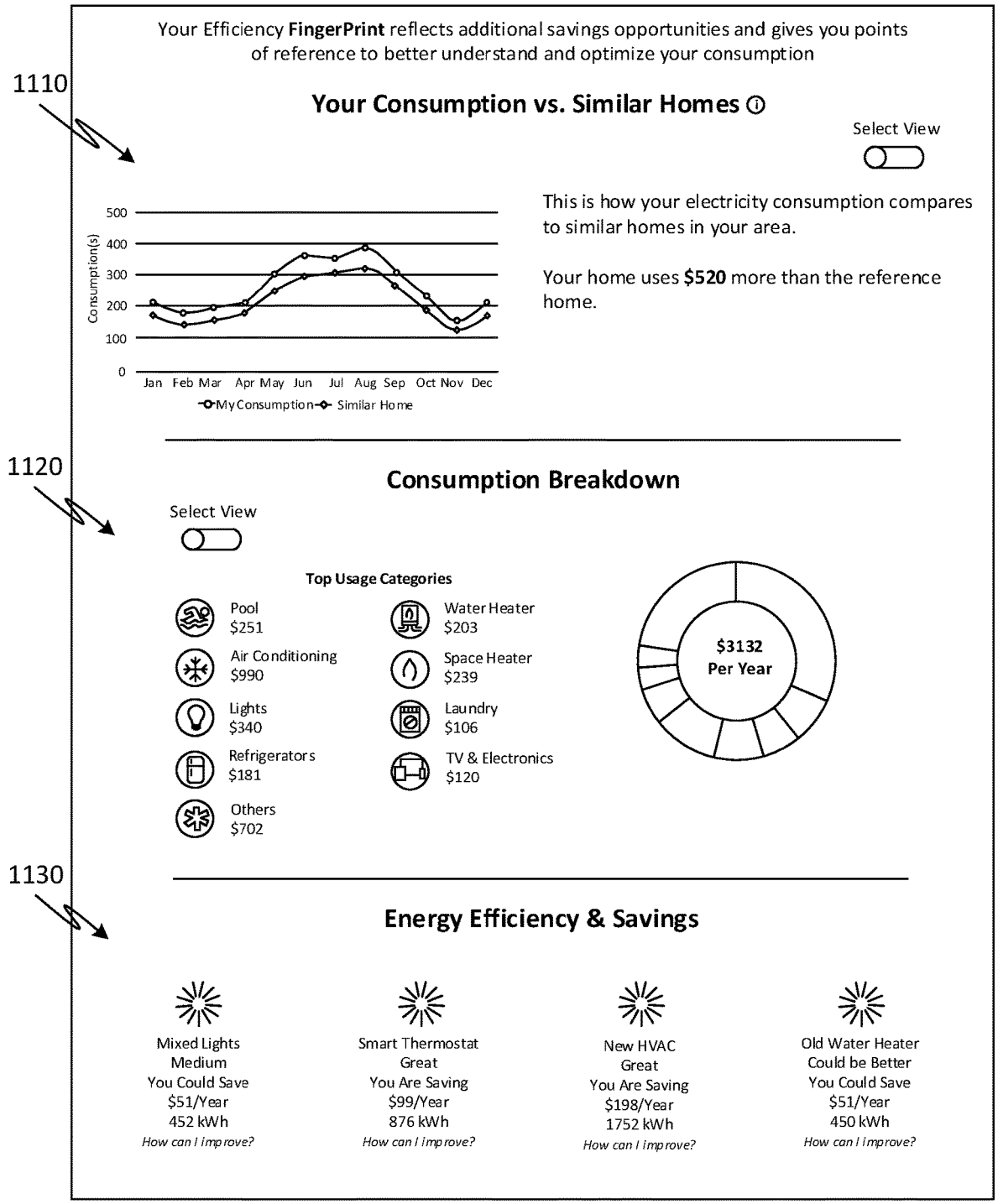
FIG. 24 depicts a representative GUI for available system comparisons, in accordance with some embodiments.

FIG. 24 depicts a representative GUI for available system comparisons.

Figure 25:
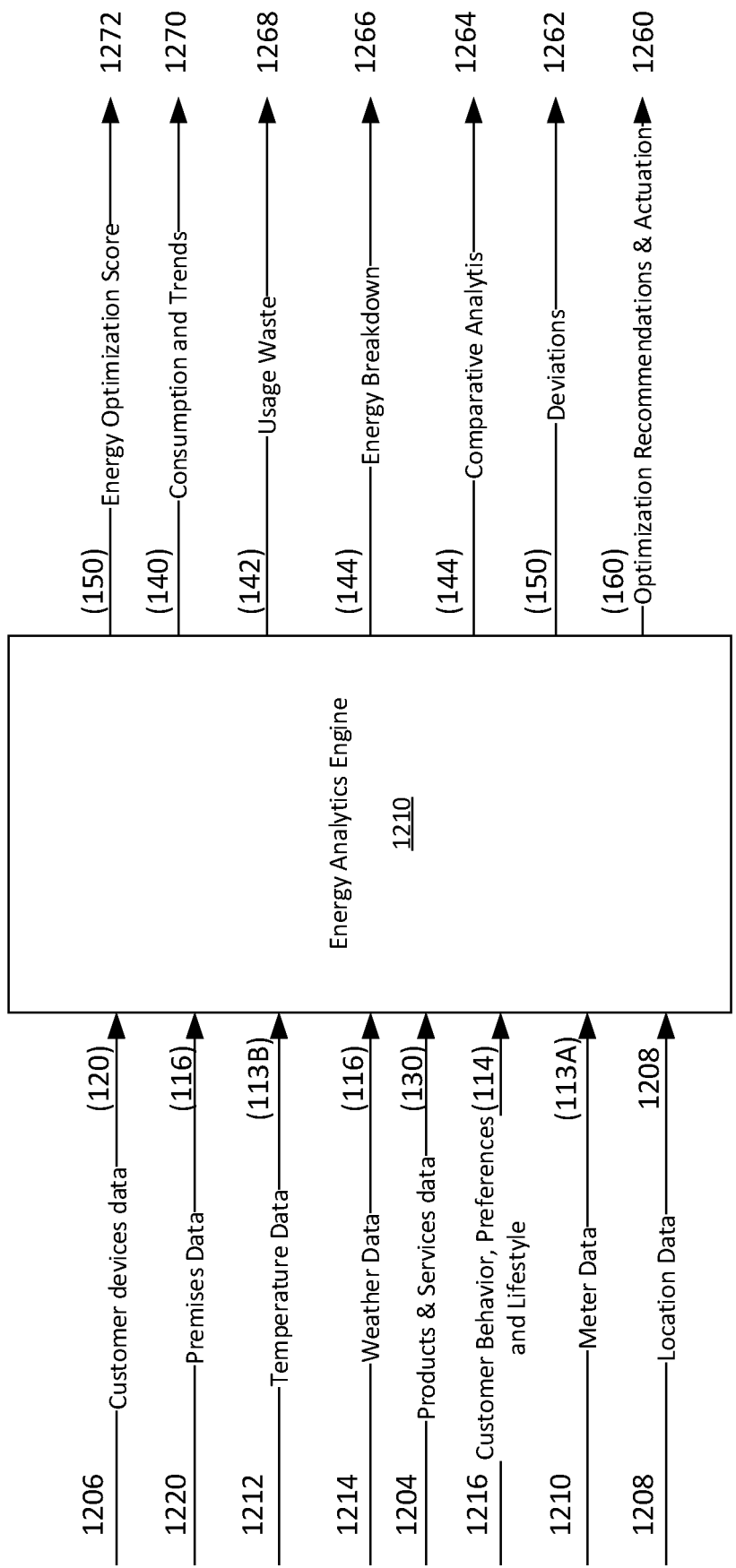
FIG. 25 depicts a simplified representation of inputs and outputs for the energy analytics engine, in accordance with some embodiments.

FIG. 25 depicts a simplified representation of inputs and outputs for the energy analytics engine (optimization advisory engine).

Figure 26:
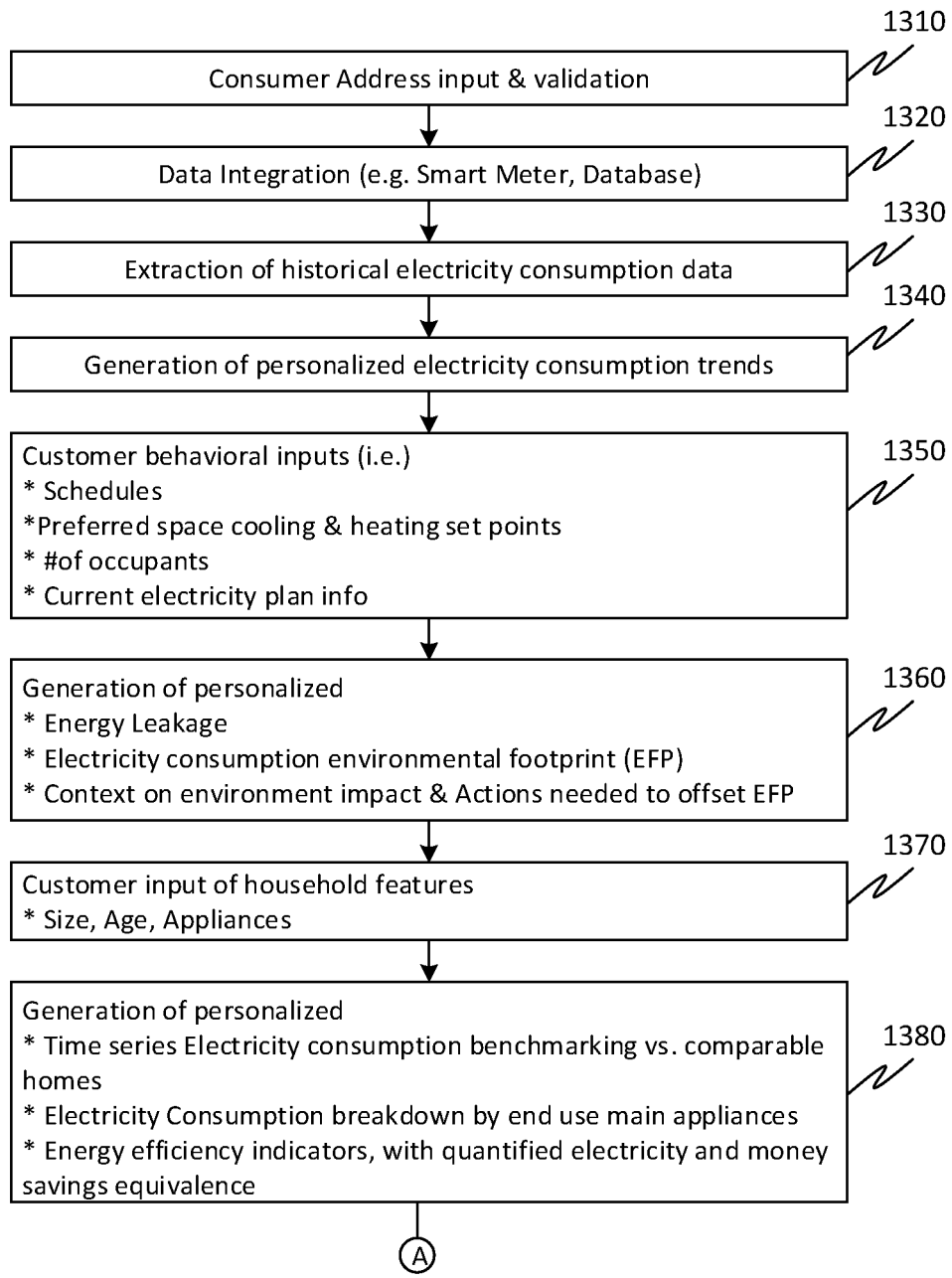
FIG. 26 is a simplified flow diagram of a method of the present disclosure.
Figure 27:
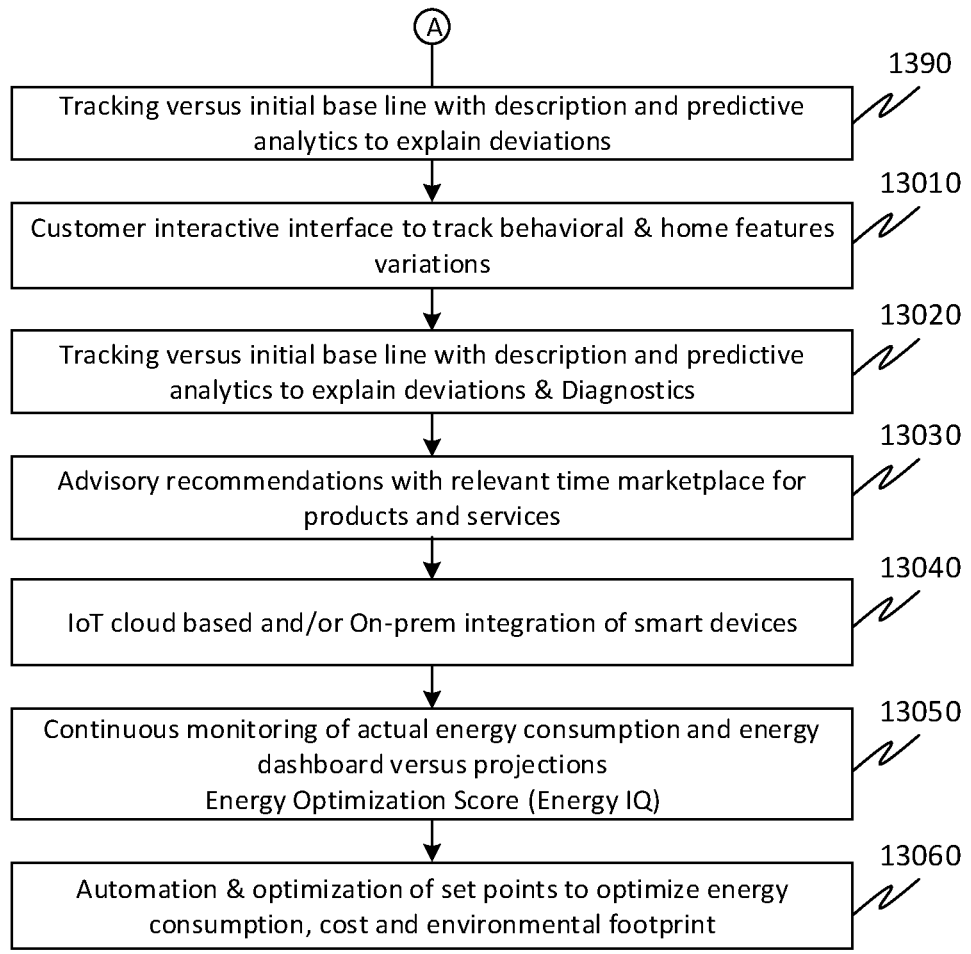
FIG. 27 is a continuation flow diagram of the method of FIG. 26.

FIGS. 26-27 depict a simplified block diagram of a method of the present disclosure.

Figure 28:
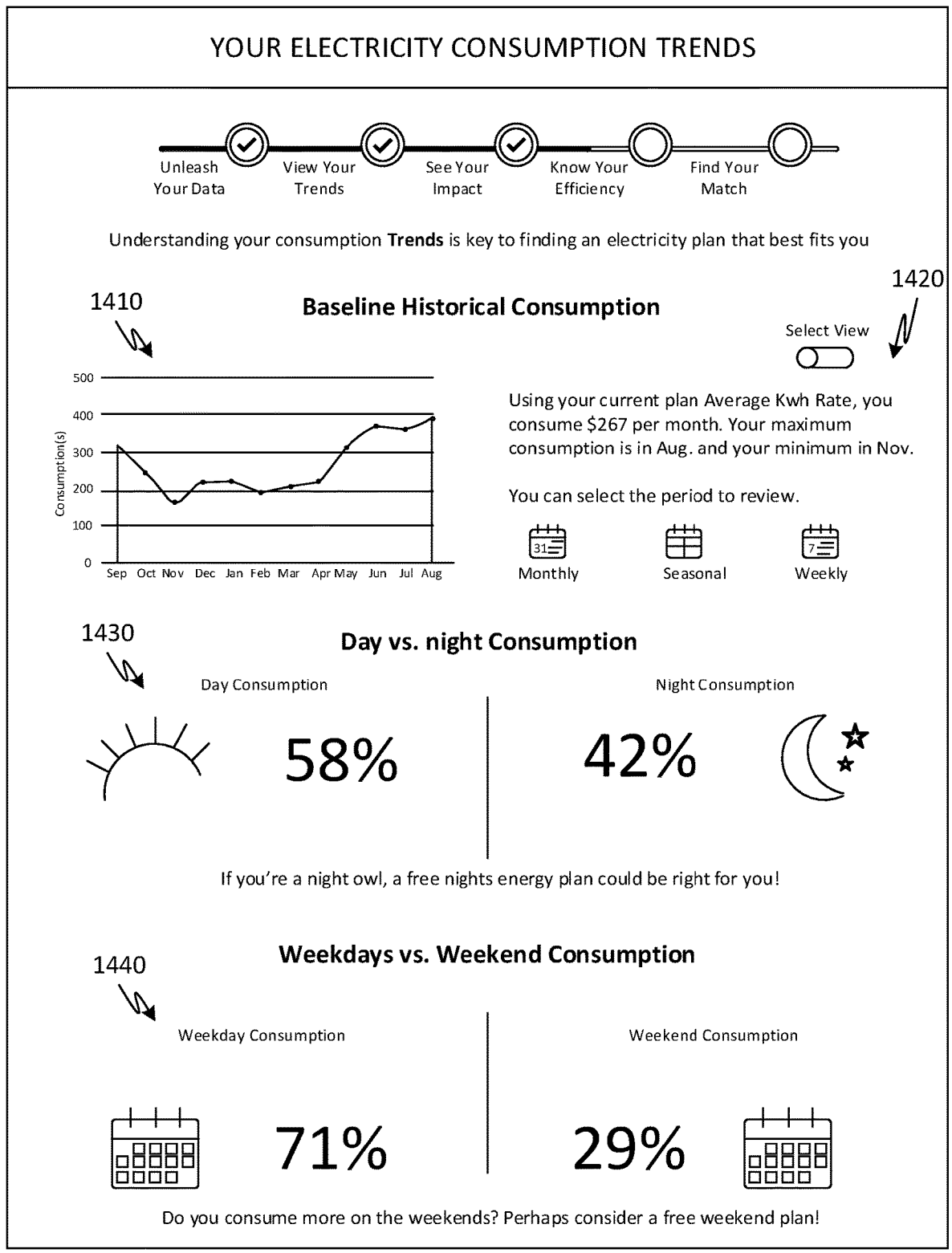
FIG. 28 depicts a representative GUI for system communications with the user regarding a selected portion of results from the system, in accordance with some embodiments.
Figure 29:
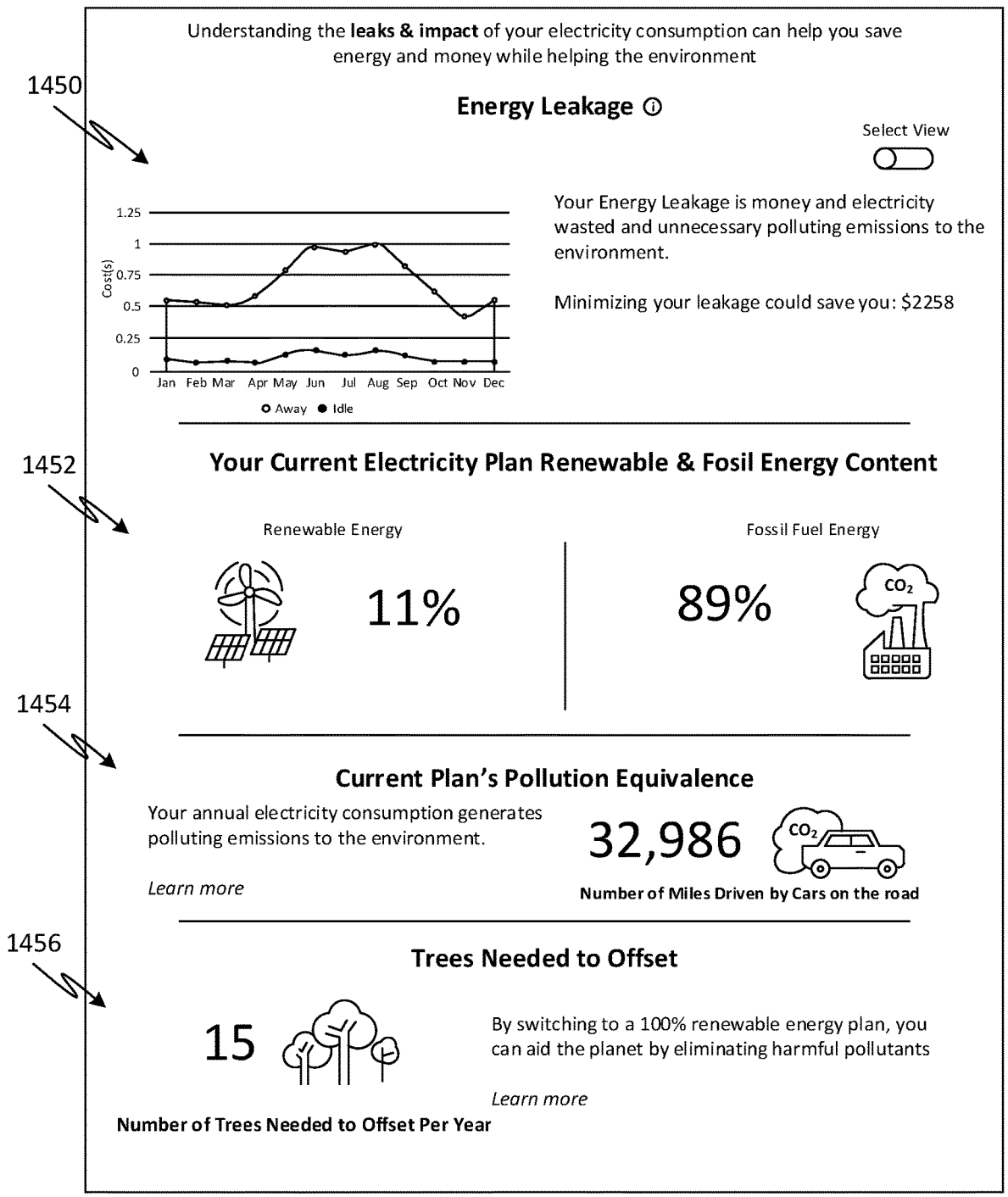
FIG. 29 depicts a representative GUI for system communications with the user regarding a selected portion of results from the system, in accordance with some embodiments.
Figure 30:
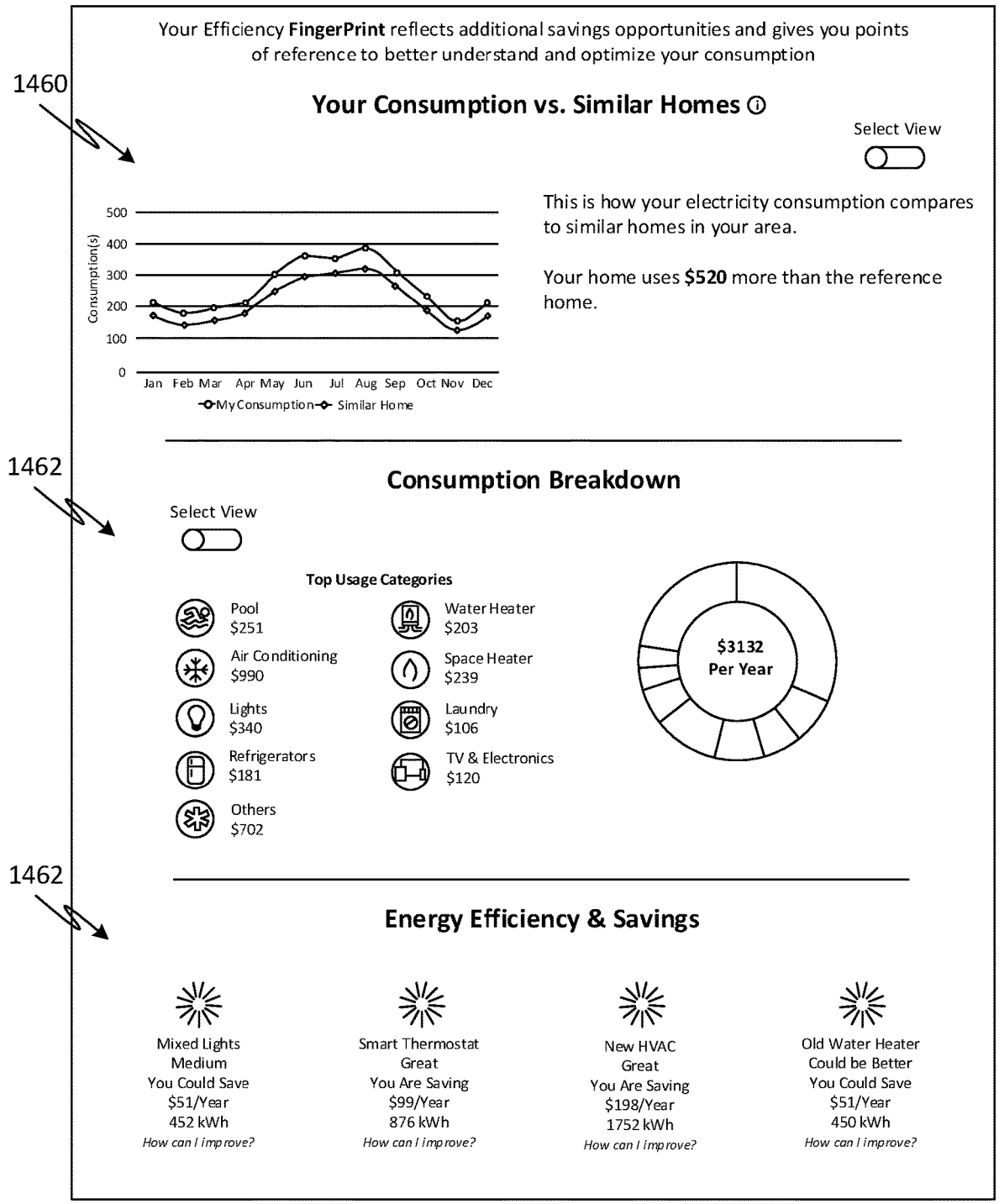
FIG. 30 depicts a representative GUI for system communications with the user regarding a selected portion of results from the system, in accordance with some embodiments.

FIGS. 28, 29, and 30 depict representative GUIs for system communications with the user regarding a selected portion of results from the system.

Figure 31:
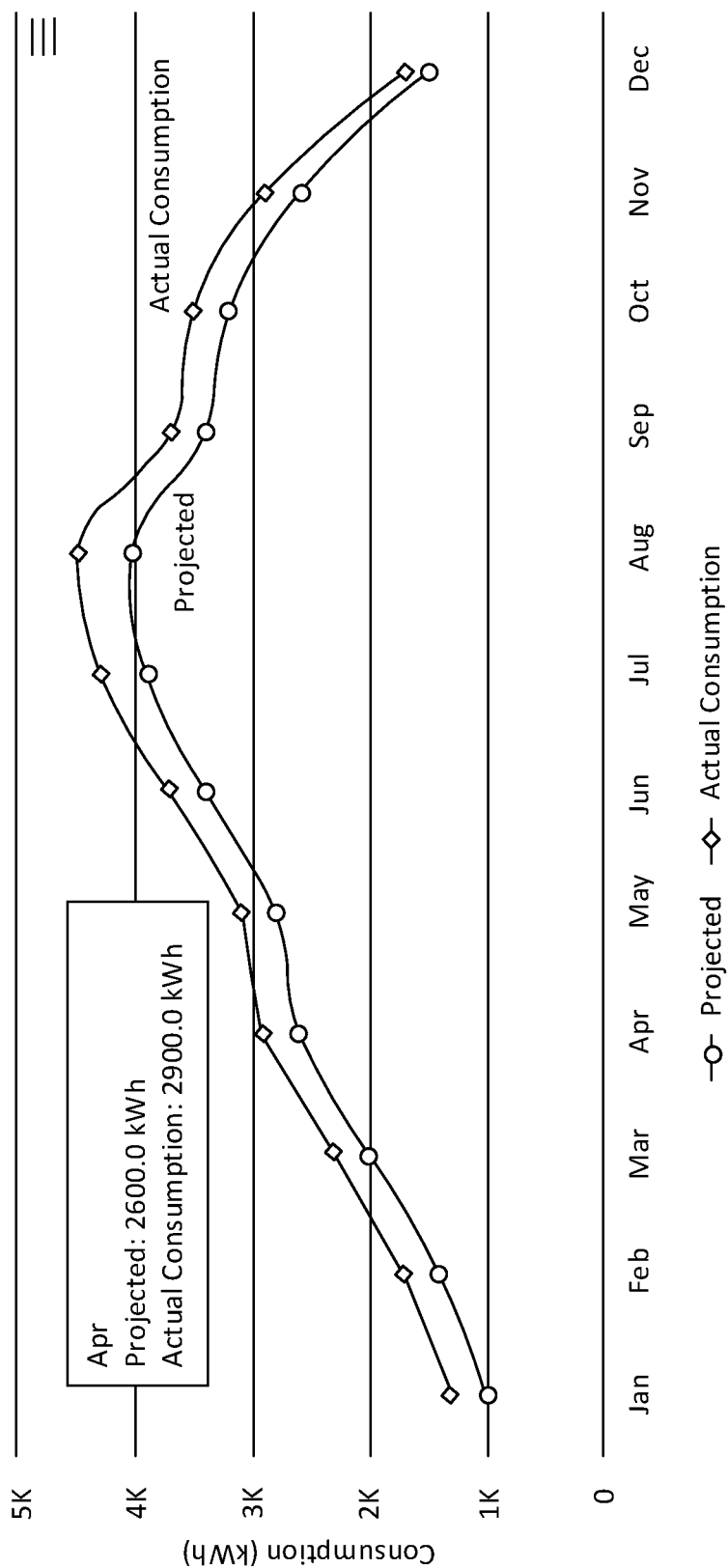
FIG. 31 depicts a projection of the annual baseline electricity consumption using the method and system of the present disclosure.

FIG. 31 depicts a projection of the annual baseline electricity consumption using the method and system of the present disclosure.

Figure 32:
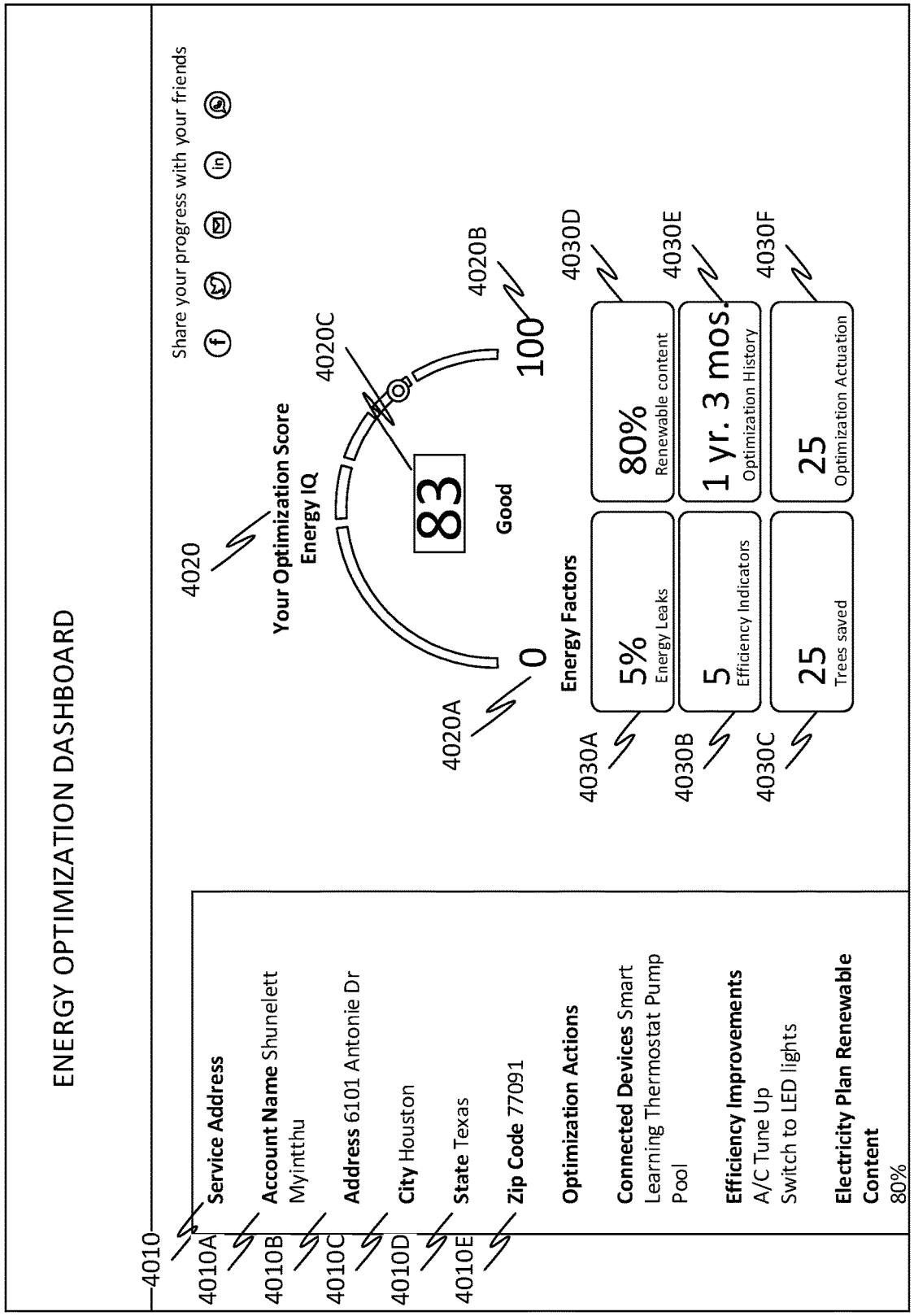
FIG. 32 depicts a GUI for an energy consumption indictor metric of the present disclosure.

FIG. 32 depicts a GUI for an energy consumption indictor metric of the present disclosure.

Figure 33:
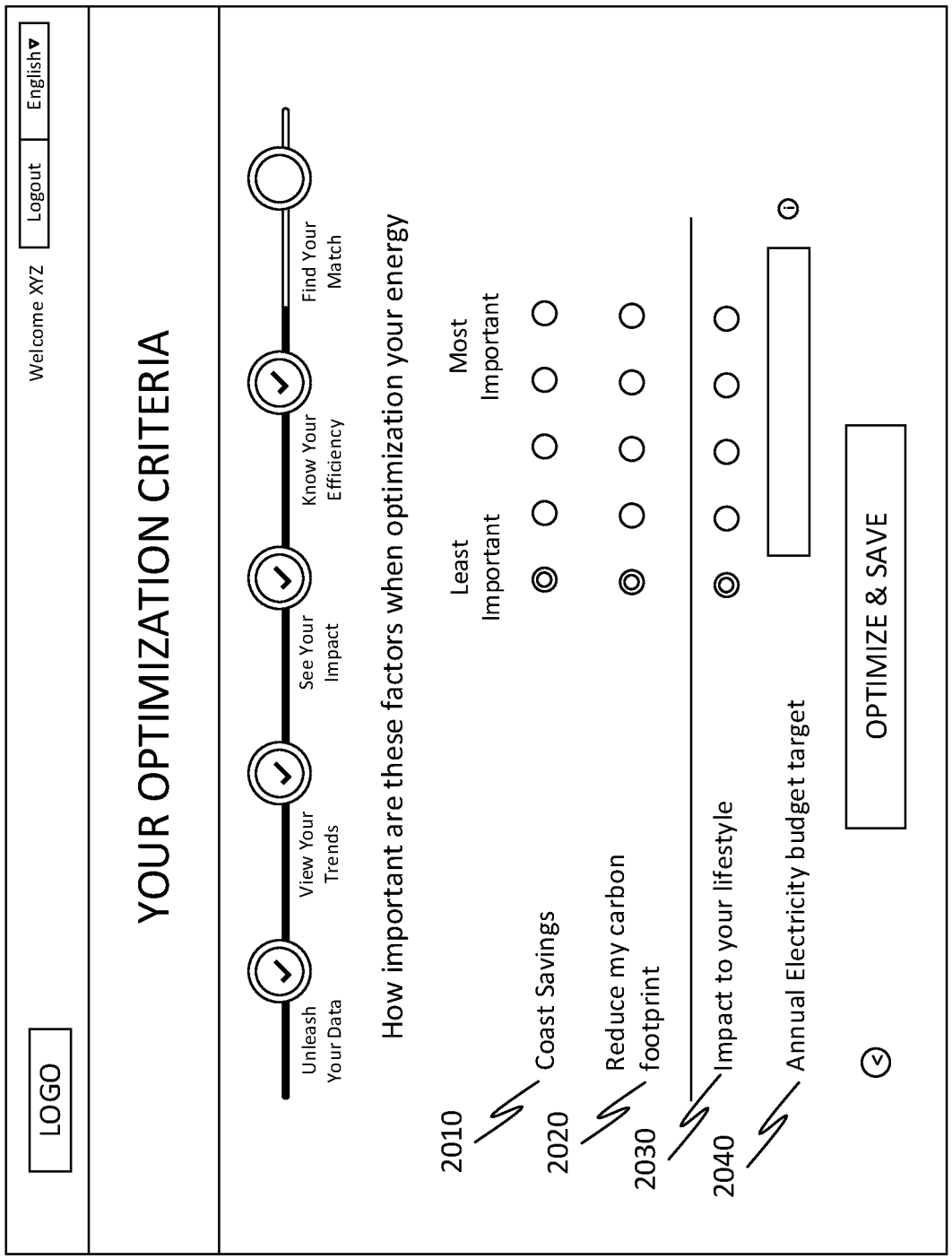
FIG. 33 depicts a GUI for energy consumption optimization goals/criteria of the present disclosure.

FIG. 33 depicts a GUI for energy consumption optimization goals/criteria of the present disclosure.

Figure 34:
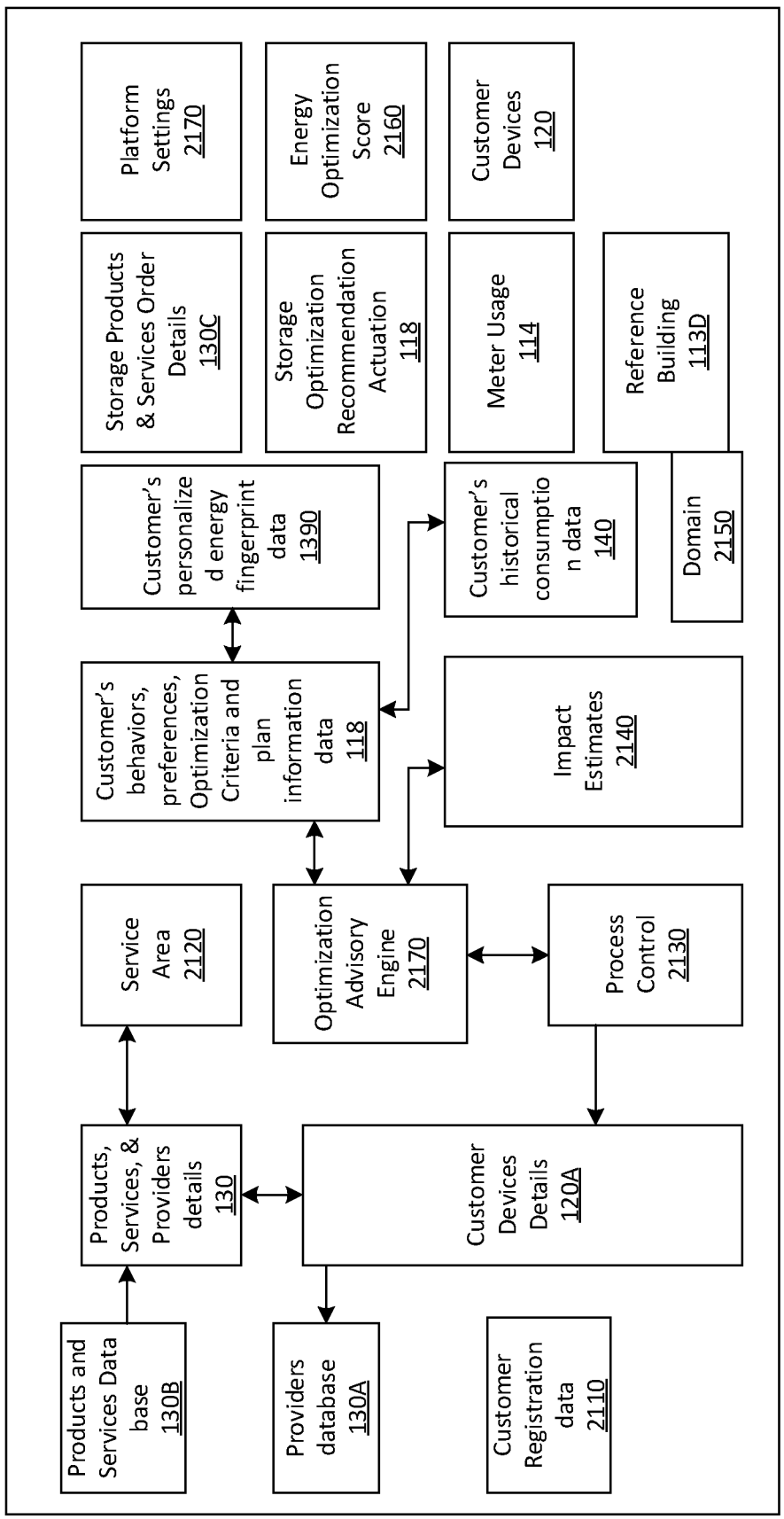
FIG. 34 depicts a database architecture of the present disclosure.

FIG. 34 depicts a database architecture of the present disclosure.

Figure 35:
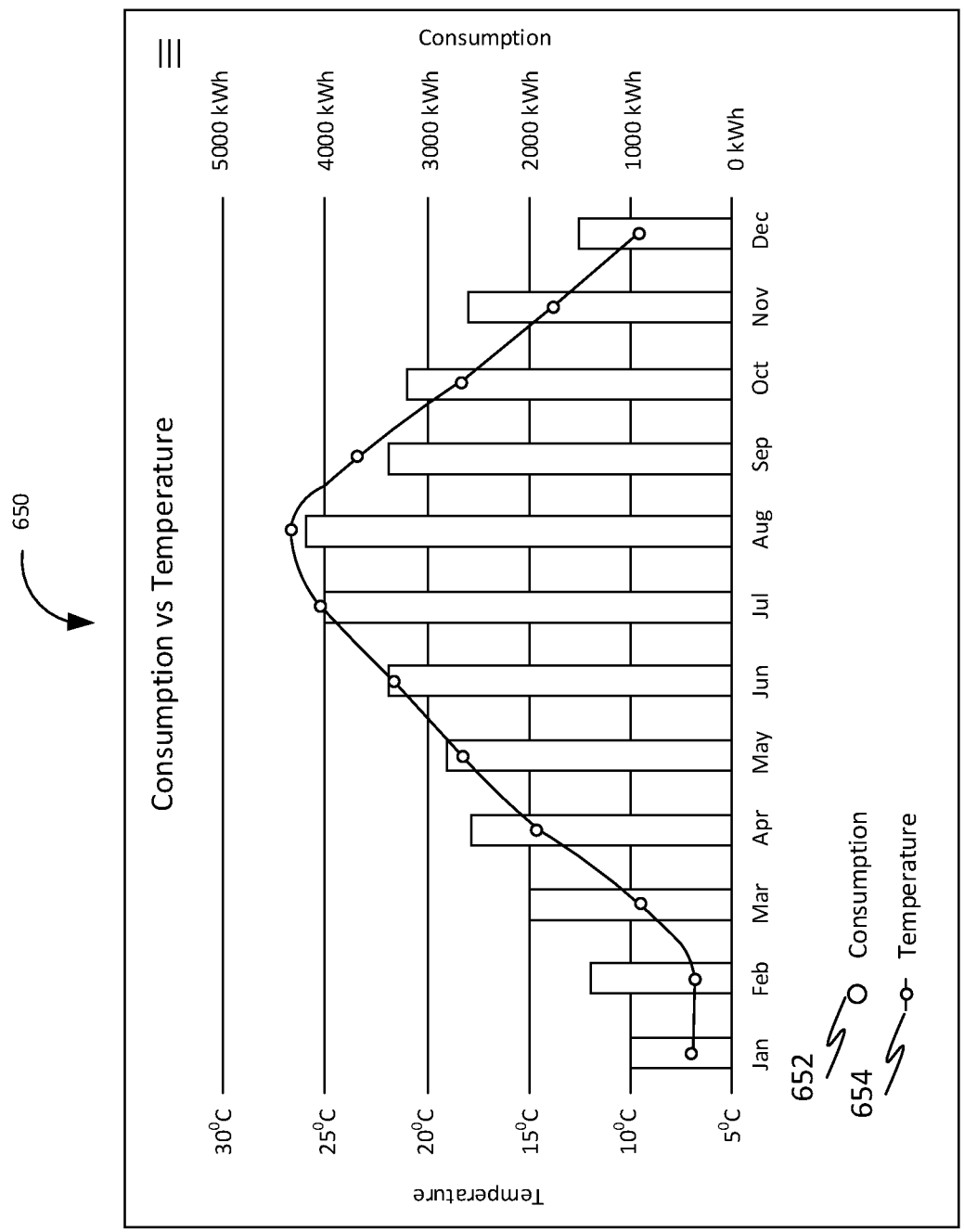
FIG. 35 depicts a GUI displaying period to period electricity usage variations compared to average outdoor temperatures metrics of the present disclosure.

FIG. 35 depicts a GUI displaying period to period electricity usage variations compared to average outdoor temperatures metrics of the present disclosure.

Figure 36:
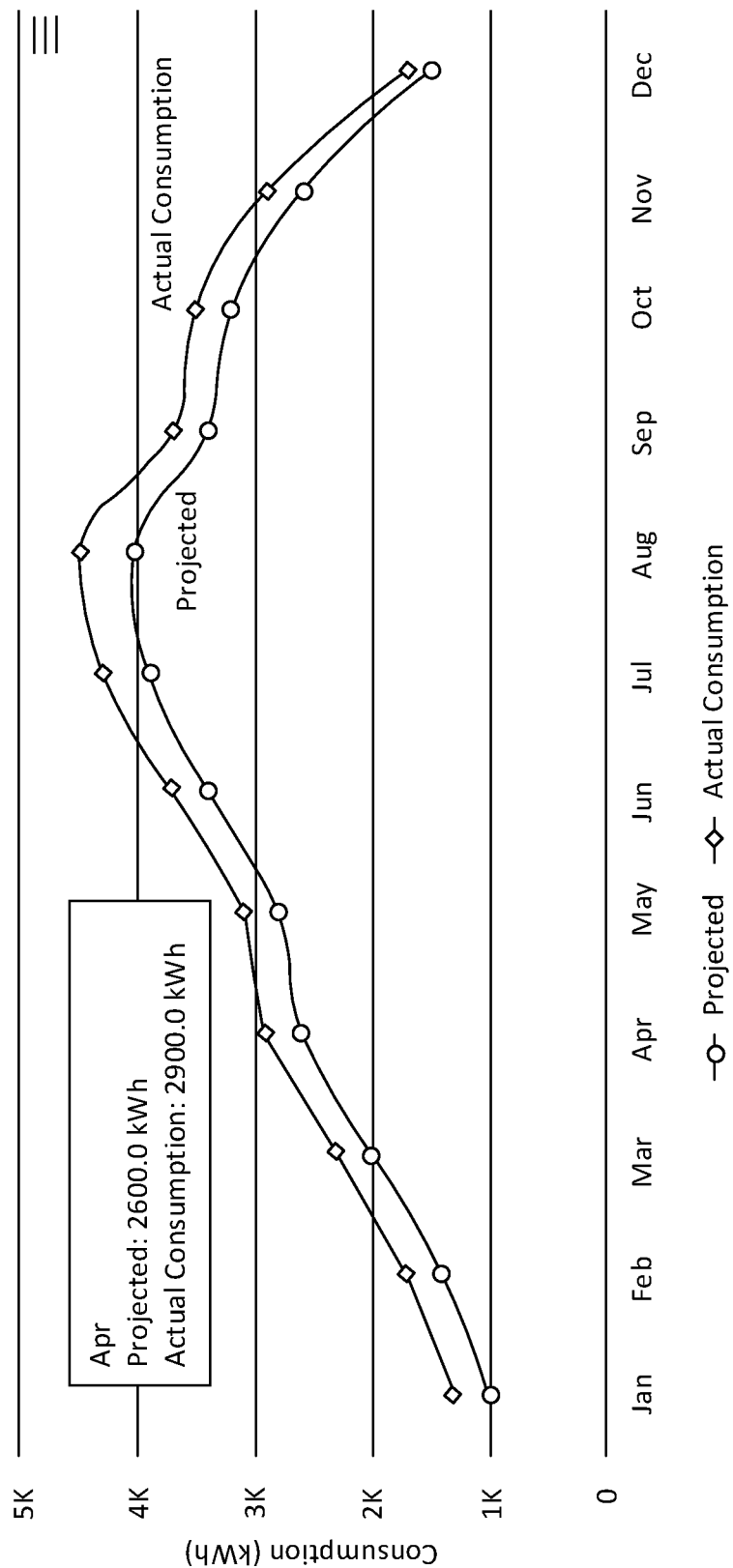
FIG. 36 depicts a GUI displaying consumption usage vs. projected predictions metrics of the present disclosure.

FIG. 36 depicts a GUI displaying consumption usage vs. projected predictions metrics of the present disclosure.

Figure 37:
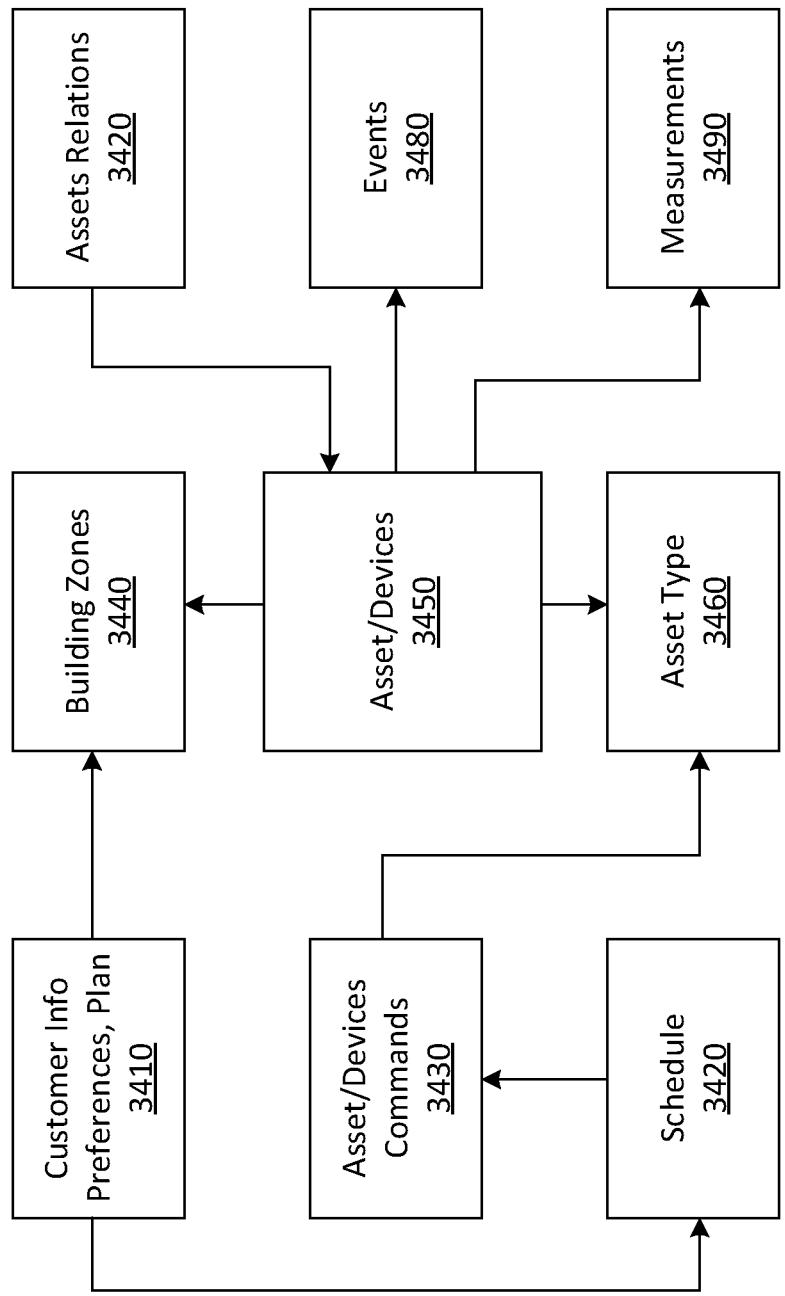
FIG. 37 depicts a simplified block diagram of the advisor database of the present disclosure.

FIG. 37 depicts a simplified block diagram of the advisor database of the present disclosure.

Figure 38:
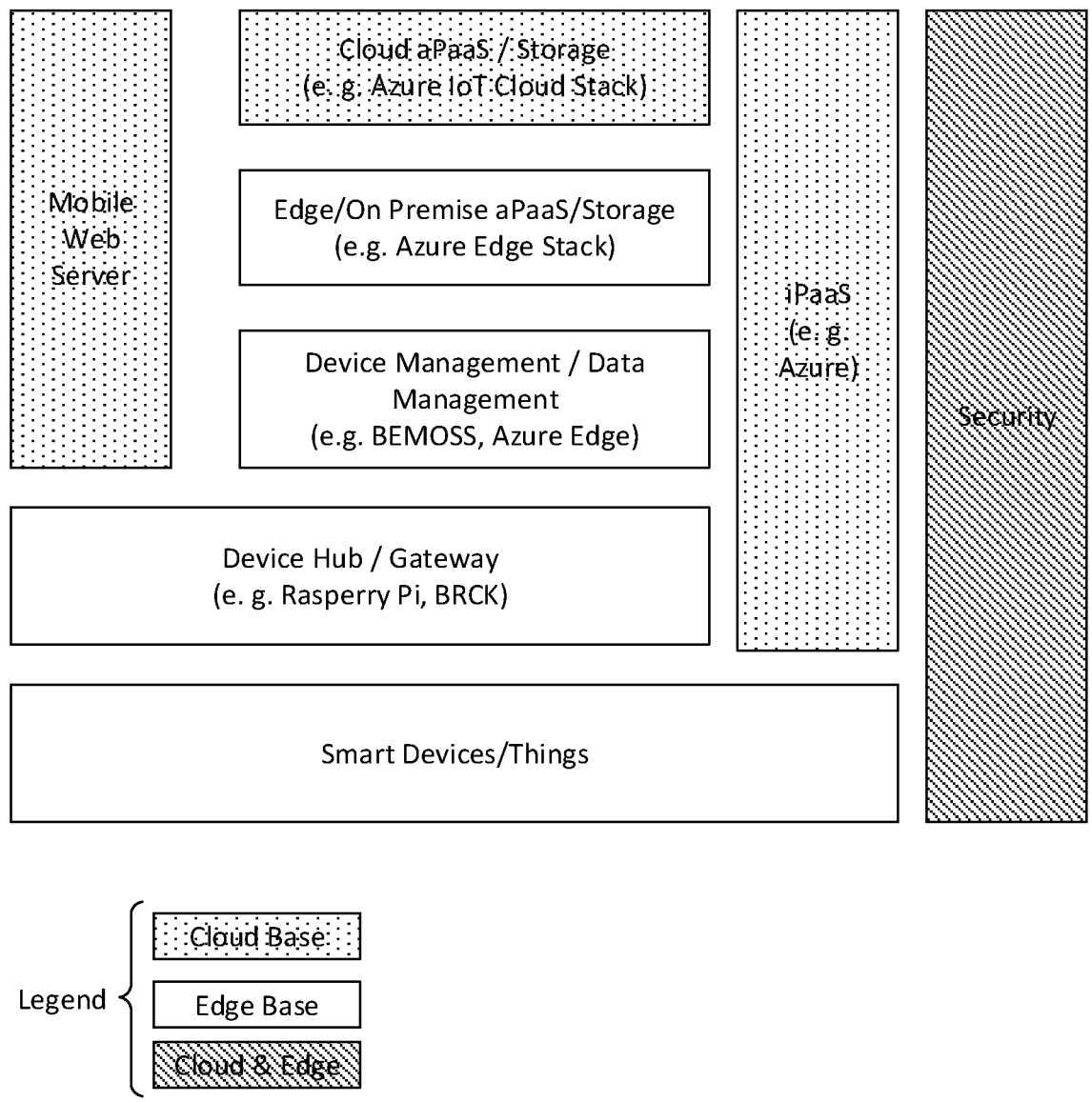
FIG. 38 depicts a simplified representation of the system of the present disclosure as a hybrid of edge and cloud computing components.

FIG. 38 depicts a simplified representation of the system of the present disclosure as a hybrid of edge and cloud computing components.

Figure 39:
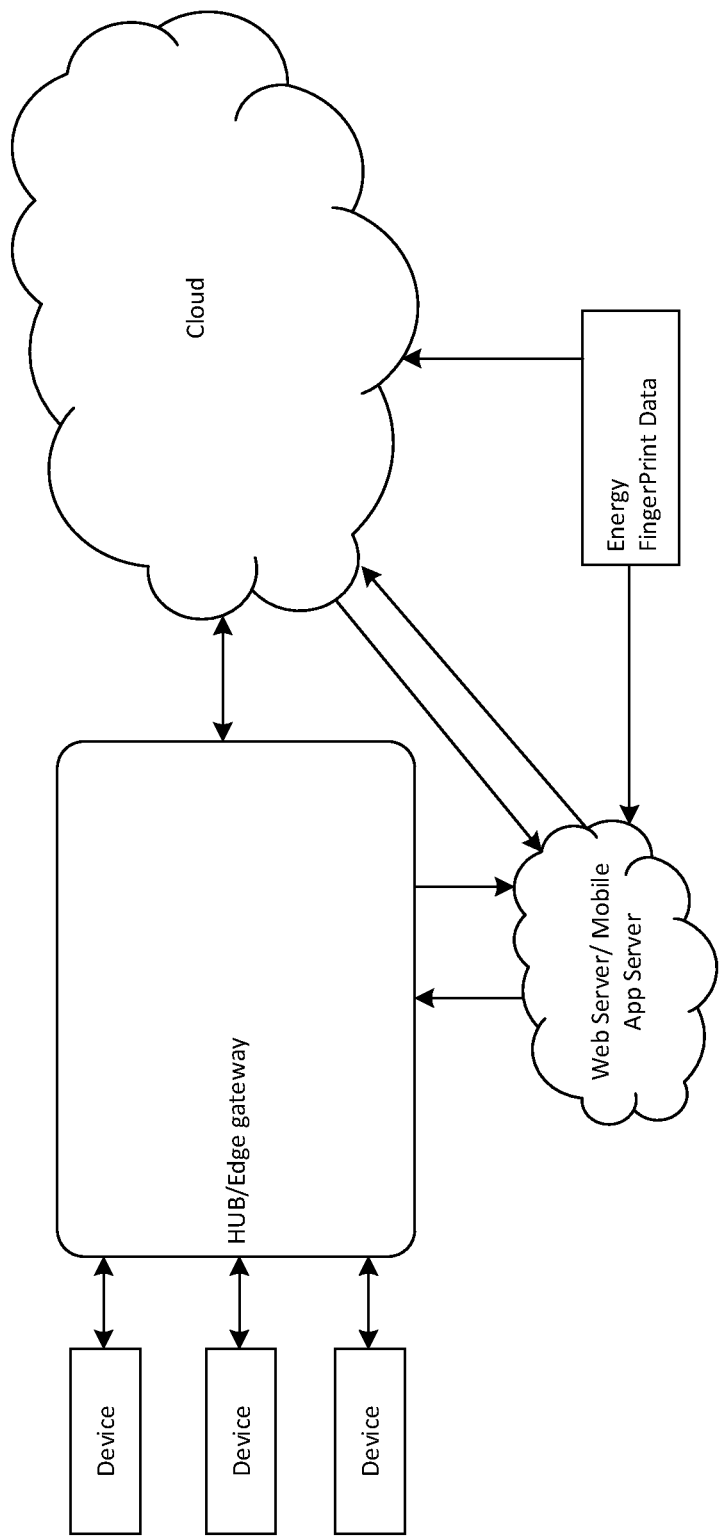
FIG. 39 depicts a simplified high-level product architecture representation of the system of the present disclosure.

FIG. 39 depicts a simplified high-level product architecture representation of the system of the present disclosure.

Figure 40:
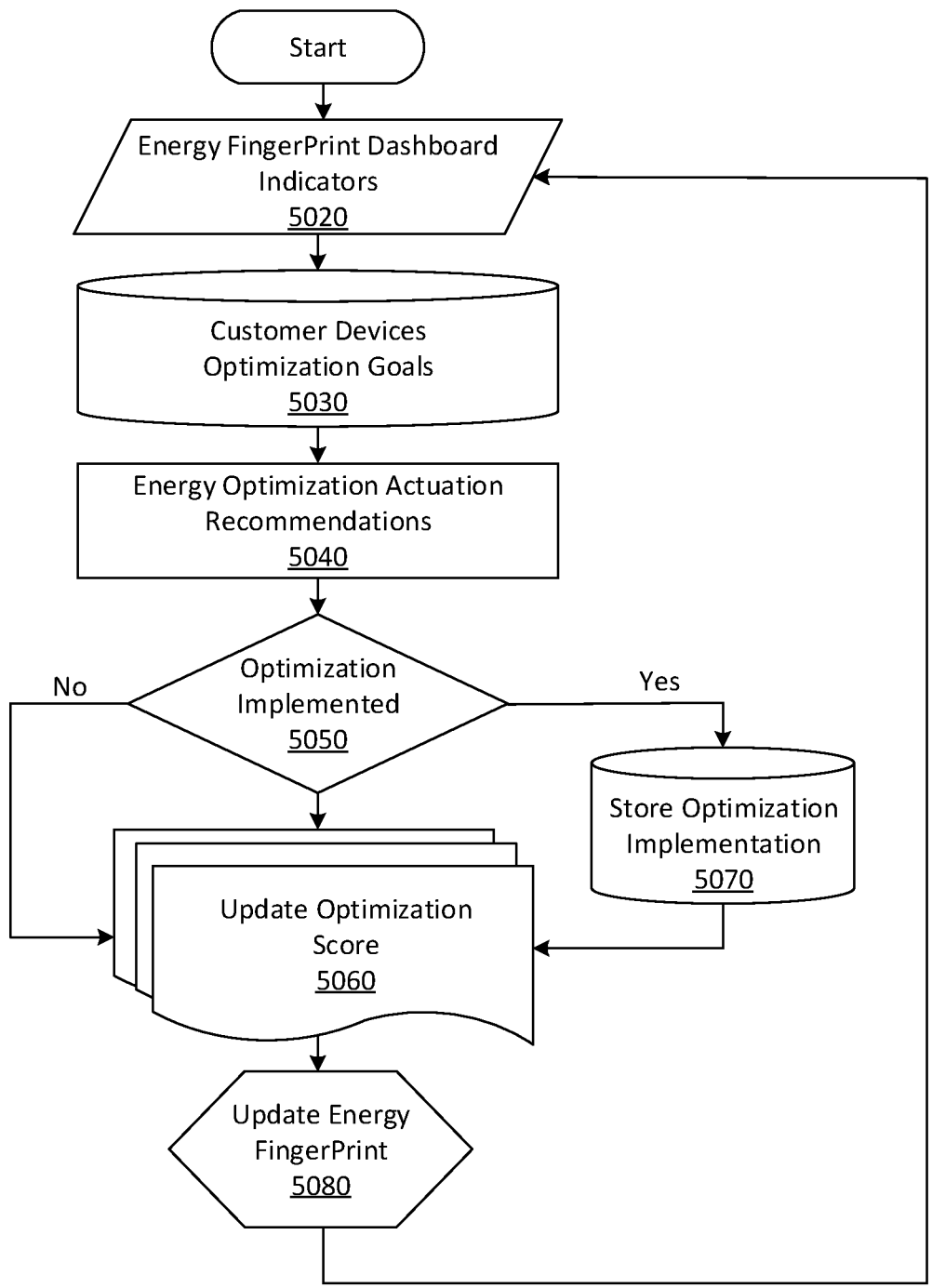
FIG. 40 depicts a simplified block diagram of the steps for calculating the energy optimization score.

FIG. 40 depicts a simplified block diagram of the steps for calculating the energy optimization score (e.g., Energy IQ).

Figure 41:
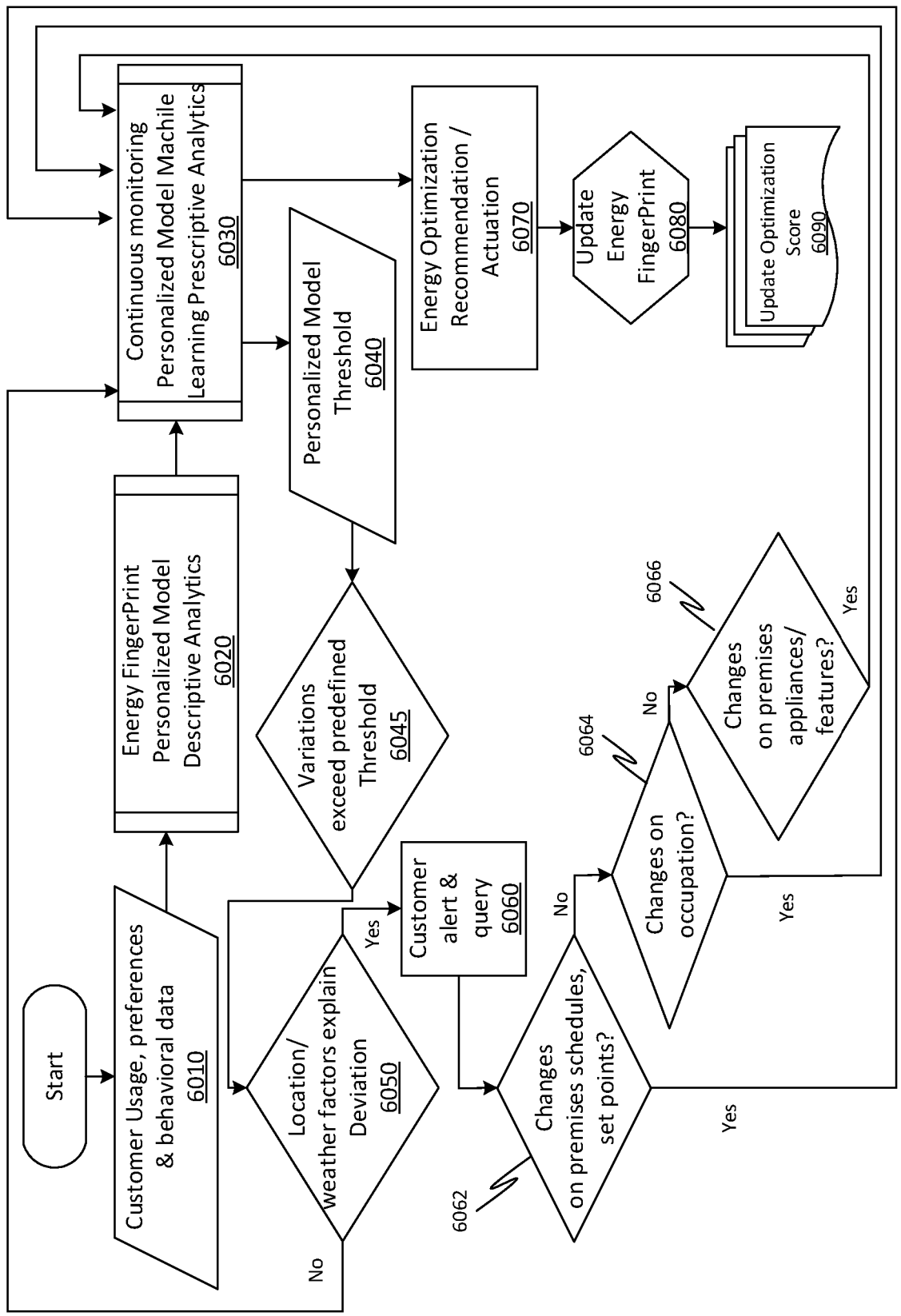
FIG. 41 depicts a representative example of a process for machine learning for prescriptive analytics with customer interactions.

FIG. 41, depicts a representative example of a process for machine learning for prescriptive analytics with customer interactions.

Figure 42:
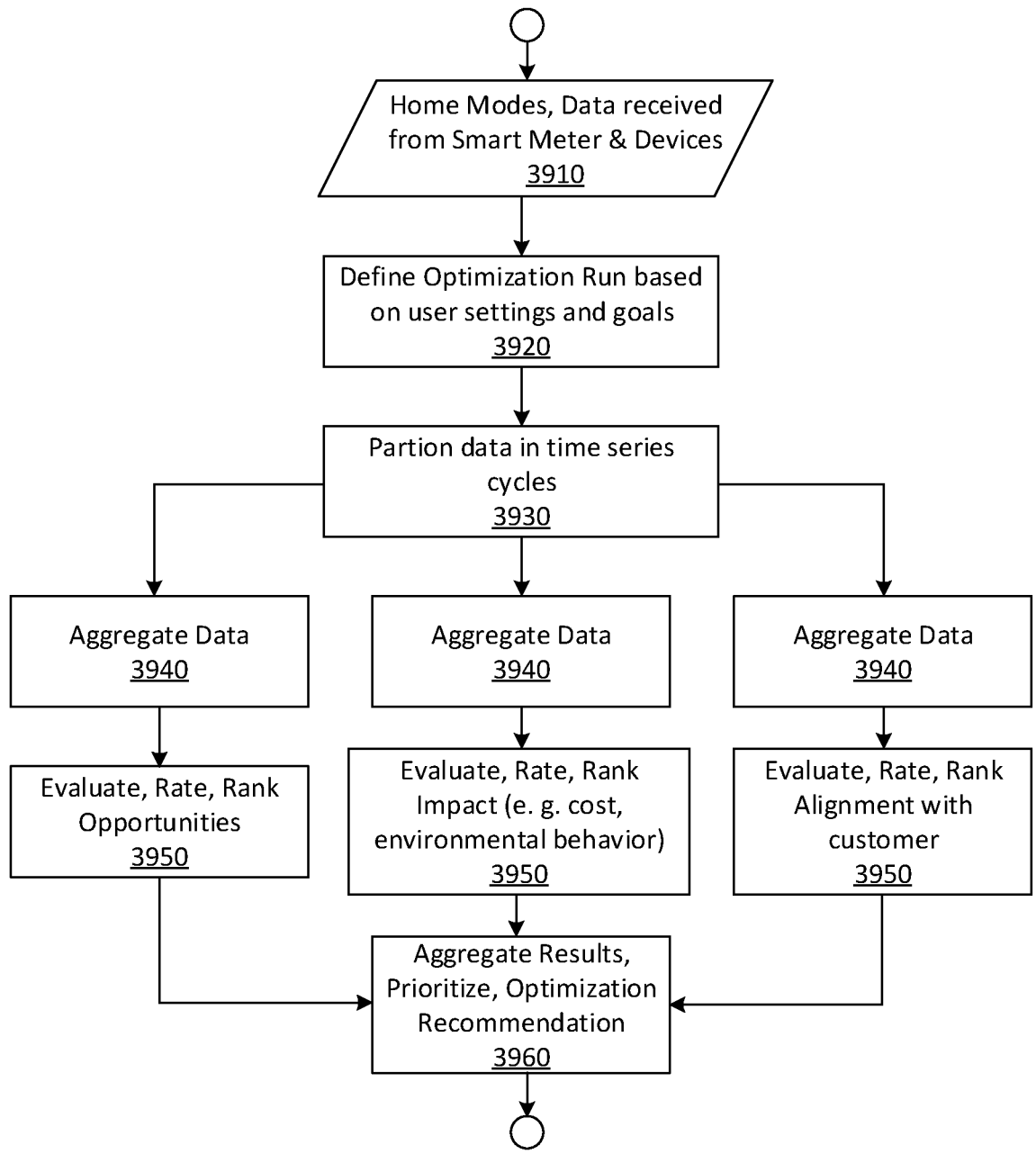
FIG. 42 depicts a simplified high-level representation of the energy analytics engine and the system of the present disclosure.
Figure 43:
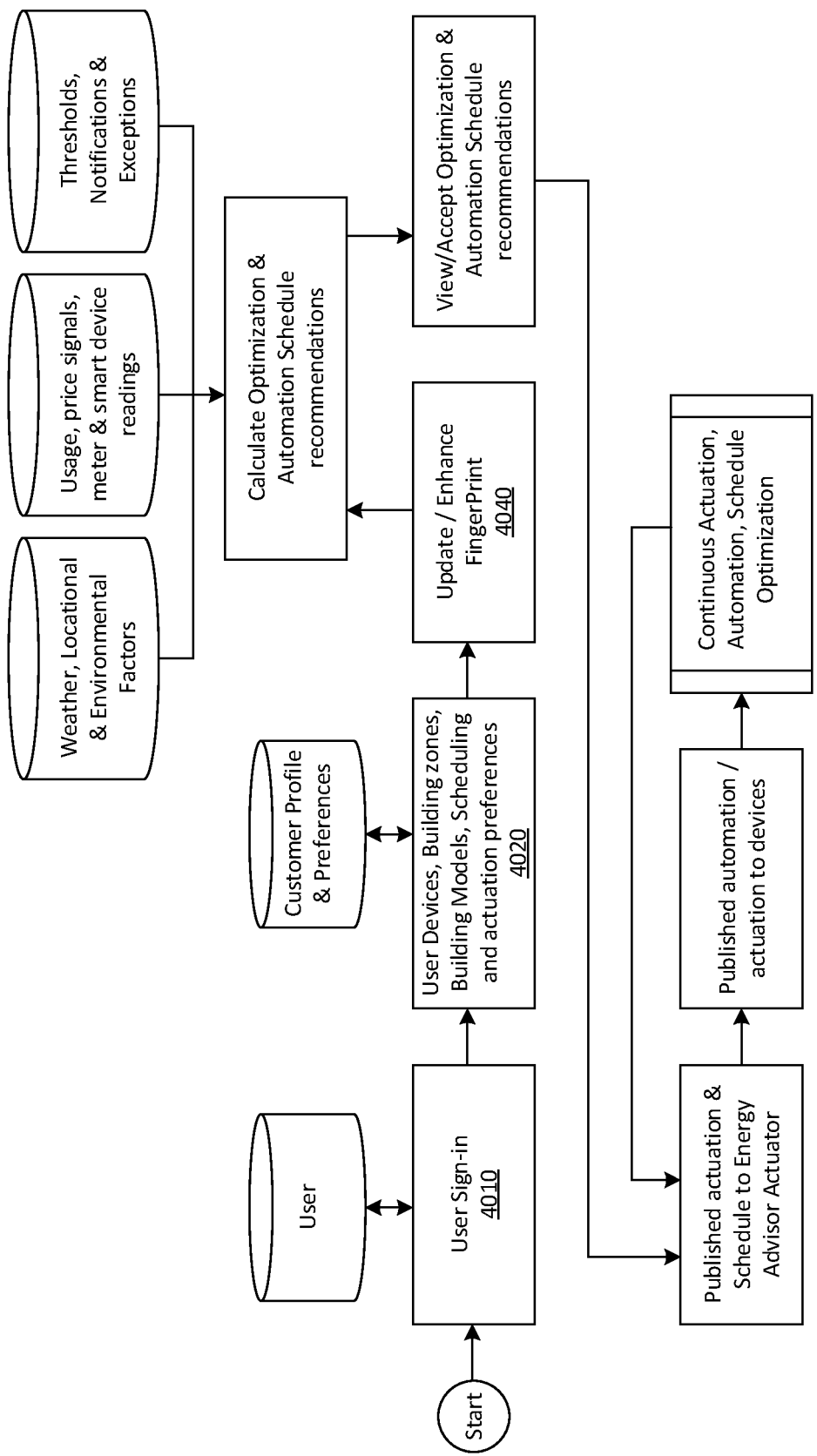
FIG. 43 depicts a simplified high-level representation of the energy analytics engine and the system of the present disclosure.
Figure 44:
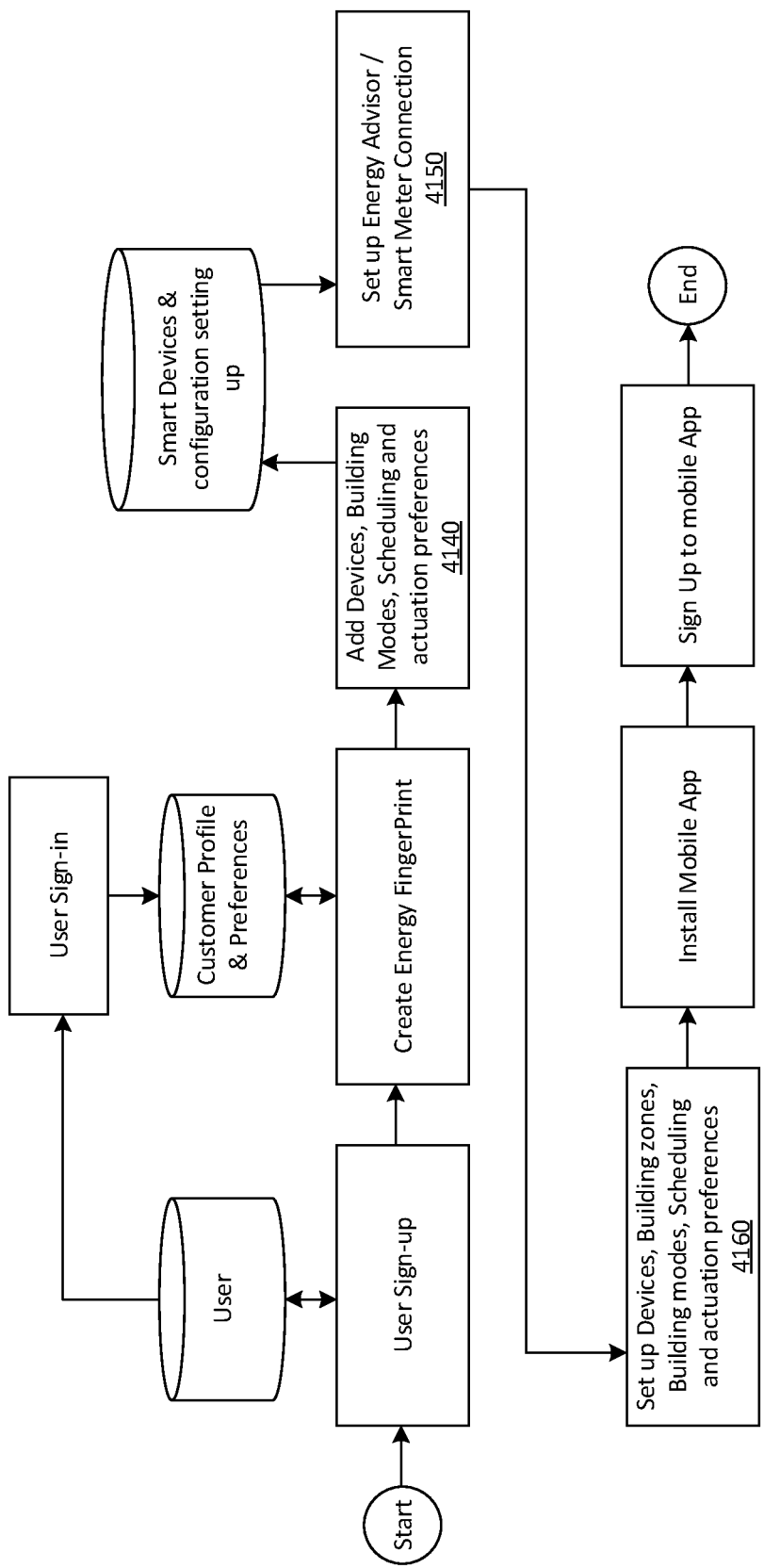
FIG. 44 depicts a simplified high-level representation of the energy analytics engine and the system of the present disclosure.

FIGS. 42, 43, and 44 depicts a simplified high-level representation of the energy analytics engine (optimization advisory engine) and the system of the present disclosure.

The present disclosure provides a system for energy analysis that may be implemented using a wide variety and range of technologies, for example, but not limited to web based, cloud, IoT devices, and traditional digital computing devices, or non-traditional computing edge devices. In one embodiment the system may include data and information collection and integration, data analysis and comparisons, data disaggregation and aggregation, summaries of analysis, generate alerts, reports, and recommended or corrective actions. After initialization and analysis, the system may be used to provide continuous or periodic monitoring and continue to recommend options to optimize energy consumption. As used herein "customer", "consumer", "occupant", "user" and "end user" may be used interchangeably, similarly for "premises", "residence", "structure", "building" and "dwelling", they may be used interchangeably. This system may then be used to calculate and rank available electric utility or supplier plans using an end-user's selection criteria for choosing a supplier, in addition to providing intermediary results that are useful for consumer awareness of their energy use and consumption.

Turning now to the drawings, wherein like reference numerals refer to like elements, FIG. 6 depicts a simplified block diagram of one embodiment or configuration of the platform or system 100 for end-use analytics and optimization of energy consumption of the present disclosure (hereinafter referred to as "platform" or "system") to establish a baseline for energy consumption and monitoring actual consumption for variances from the baseline and the determination of the cause for and correction of any variance. The system 100 includes an analytics and statistical analysis component, which may include an energy analytics engine (optimization advisory engine) (optimization advisory engine) 110 and one or more databases 112, 114, 116, 120, and 143, as discussed in more detail herein below. The energy analytics engine (optimization advisory engine) 110 may include a processor 1201 and a memory 1221 that can communicate via a bus or any other appropriate communication means 124. Although depicted as a single block representing a processor and a single block representing a memory in FIG. 6, a processor 1201 of the system of the present disclosure may be one or more processors and similarly for the memory 1221, a memory may be one or more memories.

Any memory, as used herein, may be operable to store instructions executable by a processor and may include one or more programs for one or more processors. The functions, acts or tasks illustrated in the figures or described herein may be performed by a properly programmed processor executing the instructions stored in a memory.

The functions, acts or tasks may be independent of the particular type of instruction set, storage media, processor or processing strategy and may be performed by software, hardware, integrated circuits, firm-ware, micro-code and the like, operating alone or in combination. Any processor may utilize processing strategies that may include but are not limited to multiprocessing, multitasking, parallel processing and the like.

The energy analytics engine (optimization advisory engine) 110 may further have associated therewith, or include, at least one display 130 for a user, such as but not limited to a liquid crystal display (LCD), an organic light emitting diode (OLED), a flat panel display, a solid-state display, a cathode ray tube (CRT), a projector, a printer or other now known or later-developed display device for selectively providing organized historical base data, processed data or other calculated and/or generated information to a user. Any display 130 is an interface for the user to see the functioning of a processor, the results of the functioning of a processor, or specifically as an interface with the software stored in a memory or a drive unit. The system may use a display to request permission from a user for permission to access that user's historical energy usage data, regardless of where or how stored or by whom it is stored. Historical energy usage data is useful for performing some of the analysis as described later herein.

Additionally, although not depicted, the energy analytics engine (optimization advisory engine) 110 may have associated therewith, or include, an input device configured to allow a user to interact with any of the components of system. The input device may be a number pad, a keyboard, or a cursor control device, such as a mouse, or a joystick, touch screen display, remote control, voice activated control, or any other device operative to interact with the system. An input device allows the system to obtain information from the user/consumer that is useful in performing some of the analysis as described later herein.

The energy analytics engine (optimization advisory engine) 110 may also include a disk or optical drive unit as a memory 1221. The disk drive unit may include a computer-readable medium in which one or more sets of instructions, e.g., software, may be stored. Further, the instructions may be used to perform one or more of the methods or types of analysis as described herein. During execution by a processor of the operations and functions of the energy analytics engine (optimization advisory engine), the instructions may reside completely, or at least partially, within a memory and/or within a processor having an attached or associated memory. The memory and the processor also may include various types of computer-readable media as discussed above. Thus, a computer implemented system and method are part of the present disclosure.

The present disclosure contemplates a computer-readable medium 1221 that includes instructions for execution by a processor(s) 1201, or a processor that receives and executes instructions responsive to a propagated signal. The instructions may be implemented with hardware, software and/or firmware, or any combination thereof. Further, the instructions may be transmitted or received over an external or internal network via an appropriate communication interface 124. The communication interface may be included as a part of a processor or may be a separate component. The communication interface 124 may be created in software, may be a physical connection in hardware, or a combination of both. The communication interface 124 may be configured to connect with a network, the cloud, the web, external media, a display, or any other components in the system, or combinations thereof. The connection with a network may be a physical connection, such as a wired Ethernet connection or may be established wirelessly. Likewise, the additional connections with other components of the system may be physical connections or may be established wirelessly or may be combinations thereof.

For example, the instructions to perform the actions described below may be included in a memory 1221. The processor 1201 may execute the programs in a memory 1221 and may receive inputs and send outputs via I/O to various other components or devices of the system. Again, FIG. 6 is a simplified block diagram of one embodiment or configuration of the platform or system 100 of the present disclosure and the interaction of a customer with that system or platform. The system manages the energy analytics engine (optimization advisory engine) 110 using analytics and statistical functions and uses as part of its inputs a customer database 116 and an energy meter database 114, which may be available from a third-party supplier of energy meter data 1151. The analytics and statistical functions of the energy analytics engine (optimization advisory engine) may be periodically updated to add to or improve functionality of the energy analytics engine (optimization advisory engine). Moreover, the energy meter database 114 may receive data directly from energy meters. Energy meter data may also be data received from sensors resident at a customer premises but may be forwarded to the system for processing and analysis. Alternatively, the data sent from sensors may be sent directly to an energy meter database 114. Further, the energy analytics engine (optimization advisory engine) 110 may access data related to a customer residence or customer premises (such as a customer profile in the customer database 116 and a customer device database 120). As discussed in more detail below, the customer profile may include data specific to the customer that may be used by the energy analytics engine (optimization advisory engine) 110 for end-use analytics and statistical methods and optimization for energy consumption, while the customer device database is a listing of devices in the customer premises that may be monitored and controlled for optimization for energy consumption.

The energy analytics engine (optimization advisory engine) 110, using selected analytics and/or statistical functions using various data bases such as, for example, but not limited to, the energy meter database, the customer databases, weather database, and temperature database, may generate calculations, comparisons and recommendations 148 for a customer. For example, the energy analytics engine (optimization advisory engine) may receive historical energy usage data and then arrange and display historical and current energy consumption data and calculate desired consumption characteristics and trends, as discussed in more detail later herein. The customer may view the current energy consumption 140, 144 via an input/output device 130 (such as a display) dedicated to communication with, or periodically in communication with, the system or platform of the present disclosure. Or, the customer may view the current energy consumption via a computer, a PDA, and/or a mobile telephone. In addition, the energy analytics engine (optimization advisory engine) may generate energy consumption statistics and/or recommendations 148 to "save energy", as discussed in more detail later herein. The system 100 may provide the results of any analysis for display to various devices, such as, for example, but not limited to, a cell phone, a tablet, laptop, etc. In general, this disclosure relates to obtaining and analyzing energy consumption to establish a baseline for energy consumption and monitoring actual consumption for variances from the baseline. The customer may set up and establish energy optimization criteria 118 based on the baseline, and depending on a variance, the energy analytics engine (optimization advisory engine) 110 may either control the devices 120 (via configuration and control instructions 160) or recommend products or services from a local product and services database 143 (for example, but not, limited to suggesting HVAC products and local installers or repairmen).

More particularly, the present disclosure preferably provides a cloud or web-based platform 100 that includes an analytics and computational engine 110, and that will when initially accessed by a user, provide that user with a unique account identification for registration using a communication device 130 (display), and then the platform 100 will use a cloud or web based graphical interface for communicating with that user on that user device. These communications may be for information flowing to the user in the way of selected displays, or for a user to provide information to the platform for use in energy usage analysis for that user, as described more fully later herein. The device for communications with and use with the system may be portable and may be located on any type of computer, tablet, laptop, smart phone, or other smart device with communications abilities. The platform of the system, using a cloud or web based graphical user interface (GUI) when accessed by a user, initially launches a user sign-up display, or a sign-in display, if the user already has an account with the system, and registers the user's device with the system and sets up network connectivity with that user device. In addition, once set up, in one embodiment a user may be asked, via an electronic release form displayed by the GUI, for electronic confirmation allowing for access to selected user data, like for example, but not limited to, access to a database of historical energy consumption by that user from an external database 1151 maintained by some third party, and other protected historical or other personal data. Access to a user's historical energy consumption is needed in order for the system to perform analysis of the historical data for future energy use optimization and recommendations for reduced consumption. Personal information for a user may be encrypted when stored by the system.

Continuing to refer to FIG. 6, the platform 110 of the system 100, using one of many different formats of the web based graphical user interface (GUI), may ask the user to provide non-intrusive information regarding user lifestyle information and residence or premises information and properties, as described more particularly later herein. This user information is stored by the system in a user/customer database 116 and may be changed or updated at any time using that same GUI format. When changes are made, the system 100 may provide a display that may be altered and in some cases the analysis and results may be performed again with the new analysis and results being provided to the user. In addition, the GUI may ask the user to provide recommended or selected criteria values for a set of preselected criteria for optimization criteria once a baseline has been established, as more fully described later herein, and stored in a database 118. Again, personal information for a user may be encrypted when stored by the system.

The platform 110 of the system 100, after analysis of selected data, and using several different formats of the web based graphical user interface (GUI), may display on the user communication device (or display) 130 different energy consumption and utilization charts and reports from the information gathered from a smart meter or other smart device database 120 (e.g., any other smart building appliances and devices) or a database of historical energy consumption by that user. Other GUI formats may be employed by the system to obtain additional data and/or information regarding the user or the user's premises (e.g., for example, but not limited to, a listing of smart devices on or in a customer premises). The system also obtains or is provided with local products and service providers for storage in a database 143 for potential selection and recommendation by the energy analytics engine (optimization advisory engine) 110 as a function of variances and their analysis.

Referring now to FIG. 7 there may be seen a simplified flow diagram of the overall major processing steps (method 200) that the platform 110 may employ to receive and analyze the various data from the plurality of databases. More particularly, the energy analytics engine (optimization advisory engine) generates a unique energy profile that integrates as much energy usage data as is available, but preferably at least twelve months of energy usage data 210, user profile data (lifestyle information and schedules, premises properties, location and schedules), user preferences 218, and weather and external temperature data 218. In addition, although not depicted in FIG. 7, this energy analytics engine (optimization advisory engine) may be used to calculate an energy optimization score (e.g. Energy IQ) and perform variance analysis for determining a cause and recommended action to correct or remove the variance, as more fully described later herein.

FIG. 7 illustrates in more detail a portion of the steps of the analysis steps and pre-processing of data before analysis as depicted in FIG. 7, but in a slightly different sequence. This illustrates that certain steps may rearranged and still provide the desired analysis and processing for the desired key performance indicators (KPIs) 220 of the present disclosure. FIG. 7 illustrates that historical energy usage data 210 may disaggregated 214 into a plurality of different time series categories for analysis and comparative purposes. Further, information is provided to customer 222.

Continuing to refer to FIG. 7, it may be seen that the Cloud or web based platform 110 of the present disclosure receives and integrates all the information and data gathered through the GUI, as well as all of the other data gathered from other data sources (external databases for weather, meter data, external database data regarding reference buildings and historical statistical data regarding lighting and appliance energy consumption, etc. which is then used for comparisons, analysis, disaggregation and aggregation, as well as product, appliance and repair or service providers for variance corrections) 210. The platform 110 conditions and converts all data in their respective various native storage formats from all the various data sources into one single and common interoperable database storage format for the system, using a data storage format. And that system database format enables two-way communication between a system database and the original database providing the data to allow for periodic data updates. A representative example of a database format is described later herein with regard to FIG. 34. The required data is then partitioned (dis-aggregated) and aggregated 214 by the platform 110, as needed for analysis and comparison purposes.

The Cloud or web based platform 110 of the present disclosure receives and integrates weather information 218 (112) and generates significant weather or other types of events to evaluate certain consumption responses, and provides a display of and storage of enhanced historical energy usage data 114 (e.g., 140, 144) that has been analyzed and disaggregated for main electrical consumption categories (HVAC, pump pools, clothes drying, etc.) based on selected disaggregation or partitioning methods or algorithms 230$c$, and for some embodiments, integration of actual measurements from smart devices. The historical energy usage data 230$a$ may be partitioned (or disaggregated) into different time periods or "cycles" such as for, example, but not limited to week and weekend aggregation, total usage aggregation, day and night aggregation, etc. These various cycles are useful for later analysis and may also be displayed for comparative and analytic tending purposes.

More particularly, the Cloud or web based platform 110 of the present disclosure provides a calculation and energy analytics engine (optimization advisory engine) capable of initially generating a unique customer multidimensional energy profile (Energy Fingerprint) that uses as much energy usage data as is available, but preferably at least 12 months of historical energy consumption 210 and in addition integrates household lifestyle activities and user preferences 218 (116) to create a multidimensional envelope providing a more accurate model (e.g., digital twin) of the user's consumption based on a user's premises and its devices, and the user's priorities, behaviors, and activities. It also provides, an energy analytics engine (optimization advisory engine) generates a unique energy profile that integrates as much energy usage data as is available, but preferably at least twelve months of energy usage data 210, user profile data (lifestyle information and schedules, premises properties, location and schedules), user preferences 218, and weather and external temperature data 218. In addition, although not fully depicted in FIG. 7, this energy analytics engine (optimization advisory engine) may be used to calculate an energy optimization score (e.g. Energy IQ) 240 and perform variance analysis for determining a cause, suggest optimization recommendations, and perform device controls and actuations, as more fully described later herein.

Figure 11:
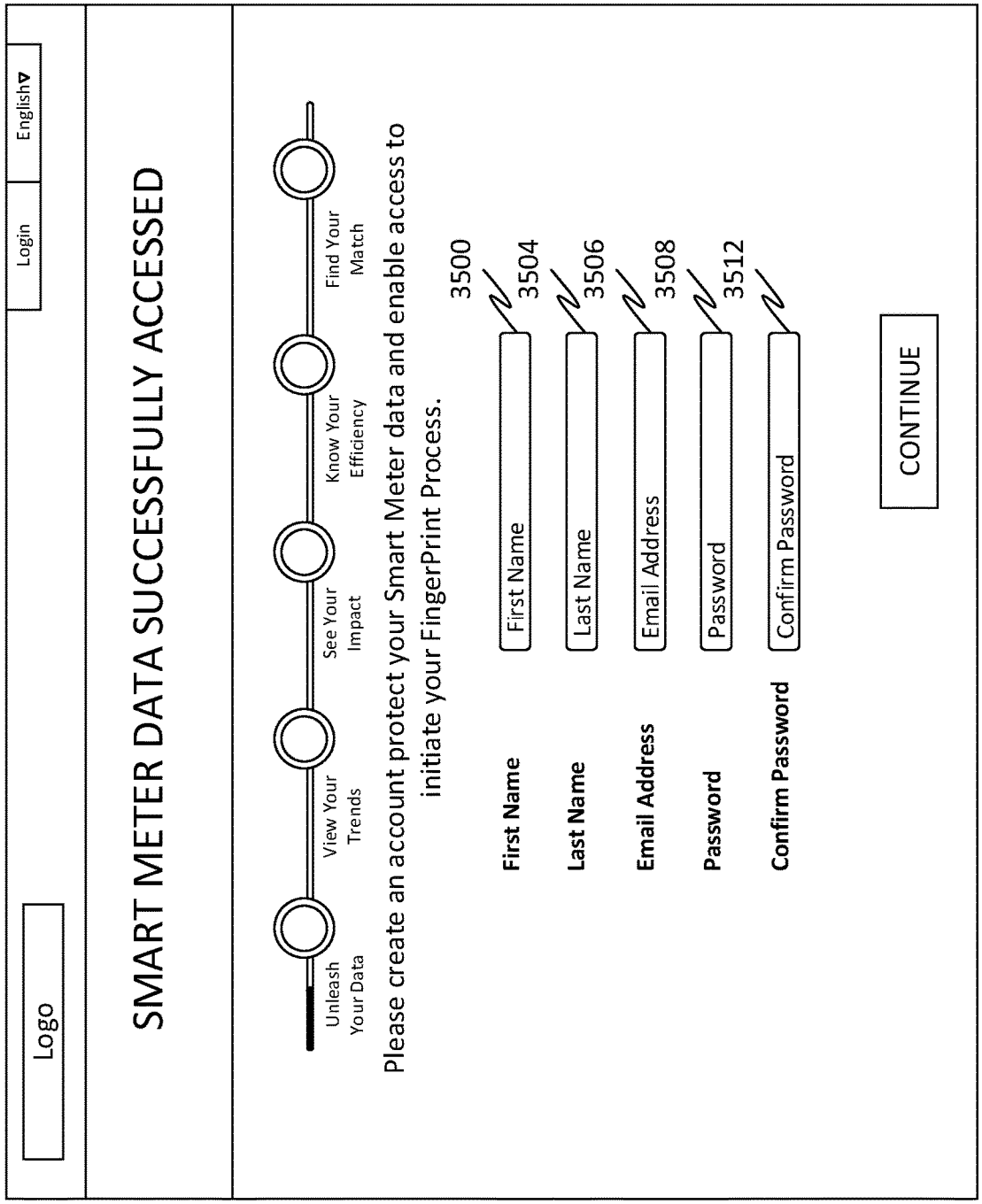
FIG. 11 depicts a representative GUI for user communications with the system, in accordance with some embodiments.

The platform of the present disclosure preferably provides a responsive web-based interface to provide a user with a way to initially sign up and then later sign into the system, and to capture user information, such as, for example, but not limited to lifestyle information and schedules, residence properties and information, and consent for accessing historical energy consumption data. A representative GUI for the initial communications with the system 100 is depicted in FIG. 11. FIG. 11 is the initial GUI used to create an account using a customer name 3500, 3504, email address 3506 and password 3508/3512. In addition, a check box may be used to confirm authorization to use the address and to access usage data for that address. As may be seen from FIG. 8, the information requested may include, but is not limited to, type of housing 310, address 320, city 330, state 340, zip code 350. It may also include the user energy supplier 360, and electricity meter number 370, as well as asking for permission to retrieve historical energy usage data for that user, not depicted. Although, once a user is registered with the system, a user may later access the system using any other device, using at least a user logon identification and a password, which is depicted in FIG. 11, but is not depicted in FIG. 8.

The Cloud or web-based platform 110 of the present disclosure also combines household information from a user (dwelling type and size, number of rooms, appliances, number of occupants, etc.), lifestyle behaviors 116 and uses a basic disaggregation algorithm that provides a general split of historical energy consumption into buckets (e.g., A/C, heating, pool, clothes dryers, etc.). Referring now to FIGS. 9 and 10 there may be seen representative GUI's for obtaining lifestyle information from a user and other aspects regarding the use of energy and their premises. FIG. 9 is used to initially gather information from the user on lifestyle information and preferences, like for example, but not limited to boxes for indicating when the user workday occurs (day or night) 3310, as well as periods of sleep, work, and being at the premises for a twenty-four-hour period for weekdays and weekends 3320, 3330, how many people live in the house 3360, how many are in the house during the day 3350, preferred heating and cooling set points 3340, 3350, normal working hours 3310, energy supplier plan 3370, etc. While FIG. 10 may be used to gather information from the user on the user's premises, such as for example, but not limited to age and/or year built 3410, size 3480, heating system type 3420, A/C cooling system age 3430 and/or type, hot water heater age 3440 and/or type, number of refrigerators and freezers 3530, type of light bulbs used 3440, age of heating/cooling system 3430, presence of smart devices 3520, swimming pool 3450, electric car(s) 3540, back up electricity generators or batteries, solar panels 3470, etc. The information from a GUI like that of FIG. 10 is needed for more detailed analysis of historical usage data and for analysis and presentations for potential recommendations to decrease energy consumption, as described more fully later herein. This type of data may and other data in the system may be encrypted or otherwise provide with appropriate data security.

The Cloud or web-based platform 110 of the present disclosure provides a calculation and energy analytics engine (optimization advisory engine) capable of generating a unique customer multidimensional energy profile (also known as an Energy Fingerprint) integrating the available historical (for example, but not limited to: 12-24 months) electricity consumption 210, user profile (lifestyle and dwelling properties), customer preferences 218, and for calculating a carbon footprint (current, projected and any delta in carbon footprints). The platform 110 may also provide automated initial and on-going periodic reports 230c capability, for example, but not limited to comparison of the current period's energy consumption vs. consumption (1) in previous/last time period, (2) in same time period last year, (3) by other users in same zip code or area, (4) by other periods or time frames. FIGS. 4, 5, and 6 are described later herein and illustrate representative GUI formats for these types of comparisons.

In more detail, the Cloud or web-based platform 110 of the present disclosure downloads available historical energy consumption 210 from a depository for historical storage of energy usage data stored at some sampled rate (like, for example, but not limited to, every 5 or 15 minutes). From this time series for energy usage data, the platform extracts by disaggregation and aggregation consumption and lifestyle behaviors (including times of use—e.g., day/night, peak/off-peak, weekday/weekend). Referring now to FIGS. 4, 5, and 6 there may be seen representative figures generated by the platform from the downloaded historical usage data regarding the historical use of energy and associated lifestyle behaviors for a user's premises. The types of aggregation that may be performed on the historical usage data, may be for example, but not limited to total consumption (cycle total), daily consumption (aggregates consumption per day), and hourly and day of week consumption (to provide energy consumption trends over time periods, including, but not limited to, days, nights, weeks, weekdays weekends, months, seasons, etc.), etc. This aggregated data is stored in a system memory in a replicated distributed database with controlled replication settings to reduce data loss from any processor (or node) issues.

Figure 14:
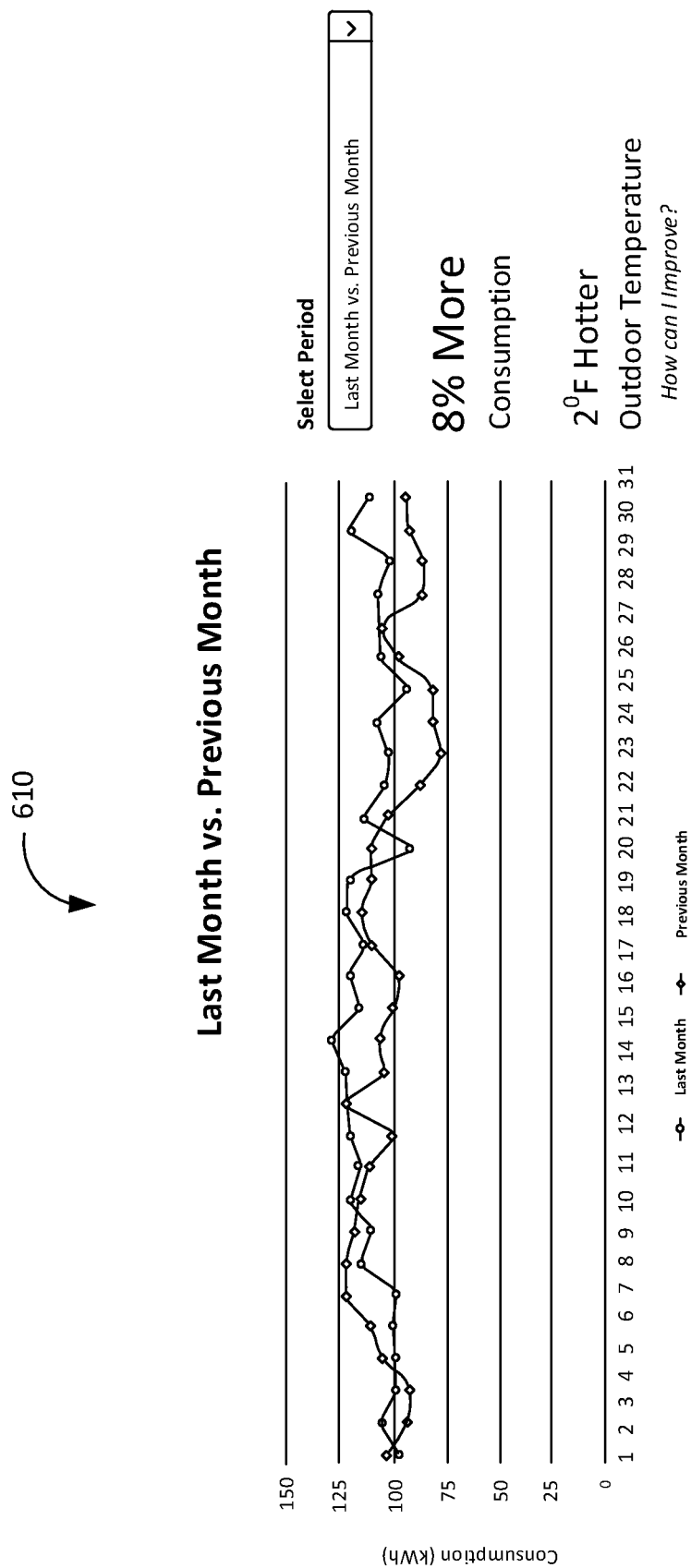
FIG. 14 depicts a representative GUI for system communications with the user, in accordance with some embodiments.
Figure 15:
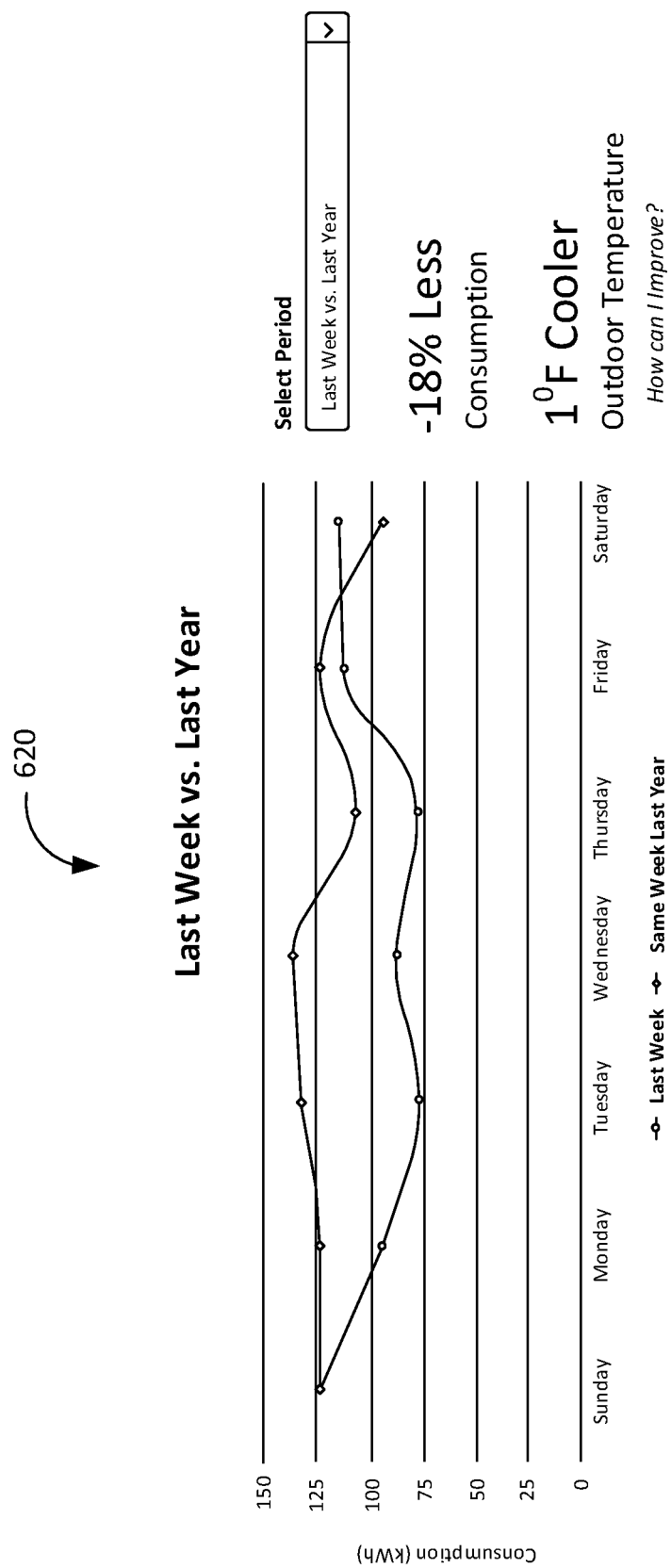
FIG. 15 depicts a representative GUI for system communications with the user, in accordance with some embodiments.
Figure 16:
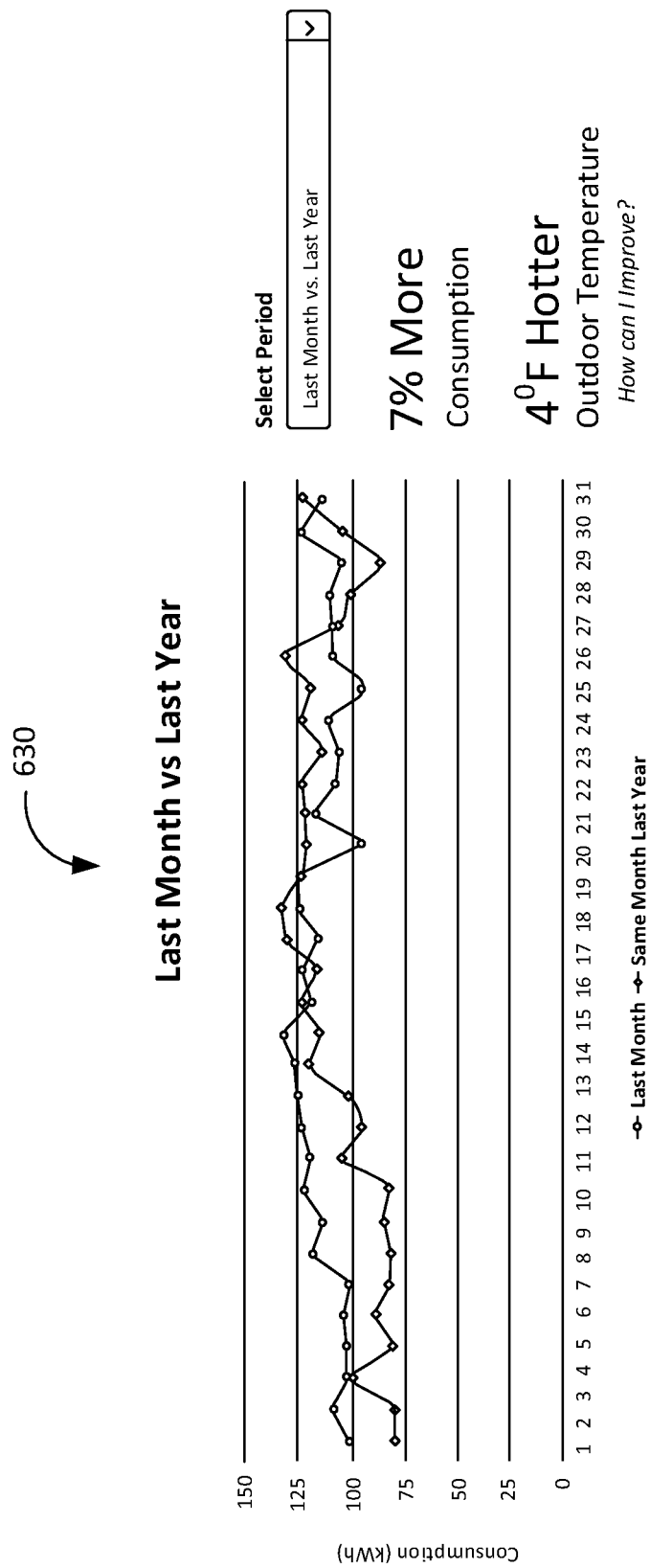
FIG. 16 depicts a representative GUI for system communications with the user, in accordance with some embodiments.

Referring now to FIG. 12, there may be seen a set of representative GUIs for total historical baseline consumption 410, day and night comparisons (which period of time may be defined by the energy supplier or provider) 420, and weekday and weekend comparisons 430. That is comparisons for energy consumption in total 410 and in unique adjacent time periods 420, 430. Similarly, FIG. 13 illustrates a representative GUI for last week and previous week comparisons 510, and associated differences 520 between the two, and last month and previous month 520. That is comparisons for energy consumption in the same time periods (a week or month) for different times. This display is part of a series of energy "dashboards" that may be used to display various results from the system and methods of the present disclosure, like those in other figures discussed herein. While FIGS. 14-16 illustrates two representative GUIs for last week and same week from last year comparisons 610, and last month and same month from last year comparisons 620. That is comparisons for energy consumption in the same time periods (a week or month) for different times 610, 620. This type of information and data may be used for trending and analysis for reasons why the comparisons are different.

Figure 17:
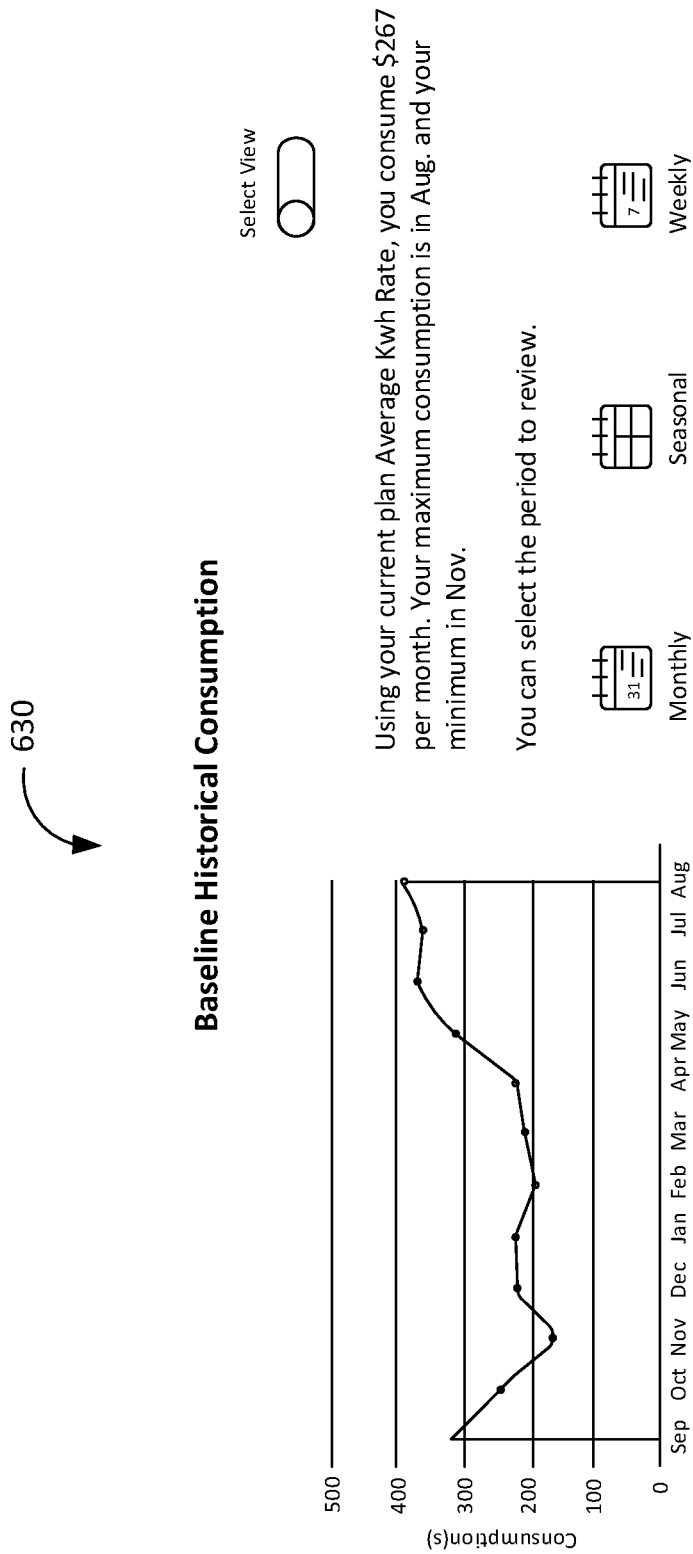
FIG. 17 depicts a representative GUI for system communications with the user, in accordance with some embodiments.
Figure 18:
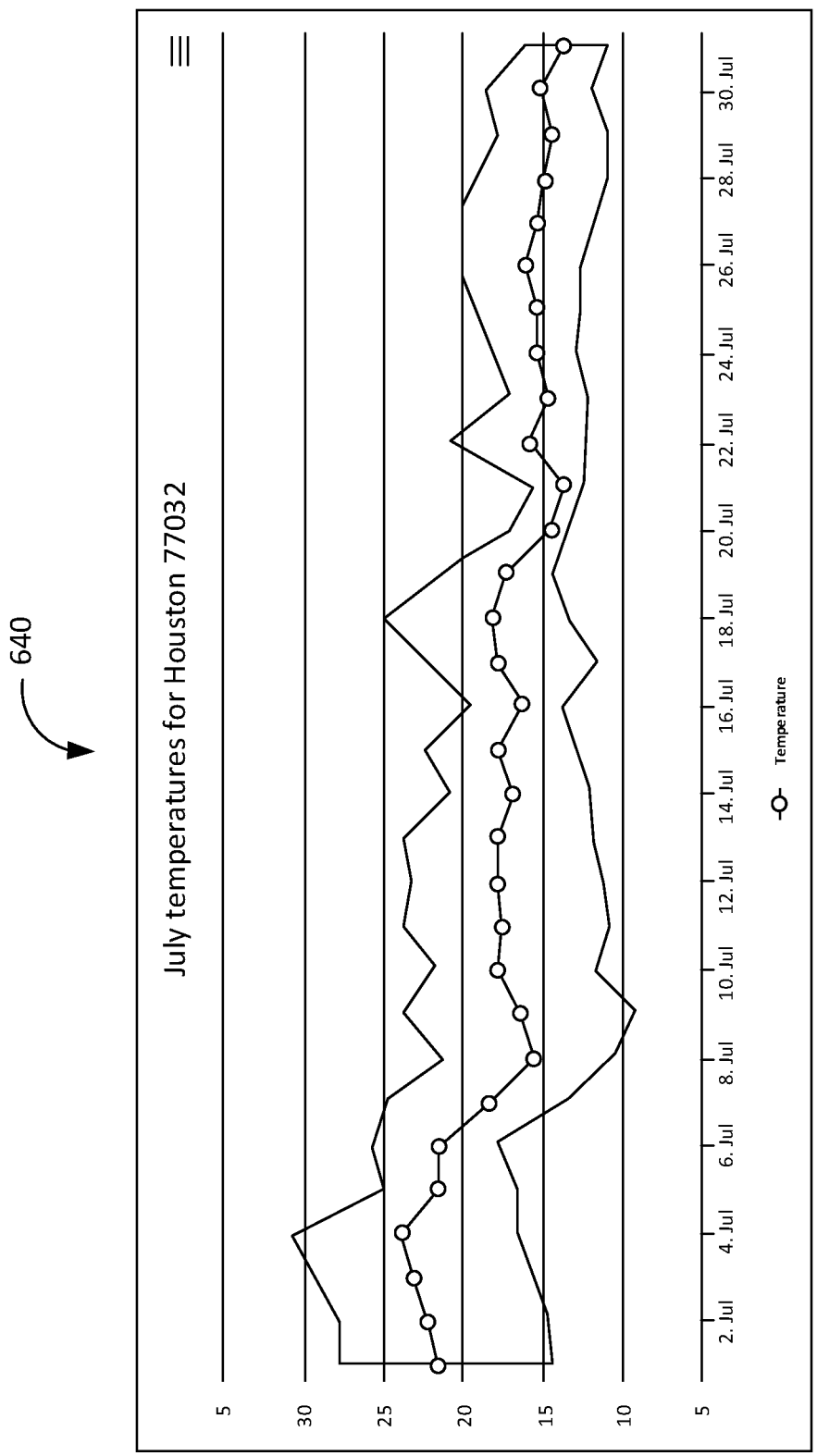
FIG. 18 depicts a representative GUI for system communications with the user, in accordance with some embodiments.
Figure 19:
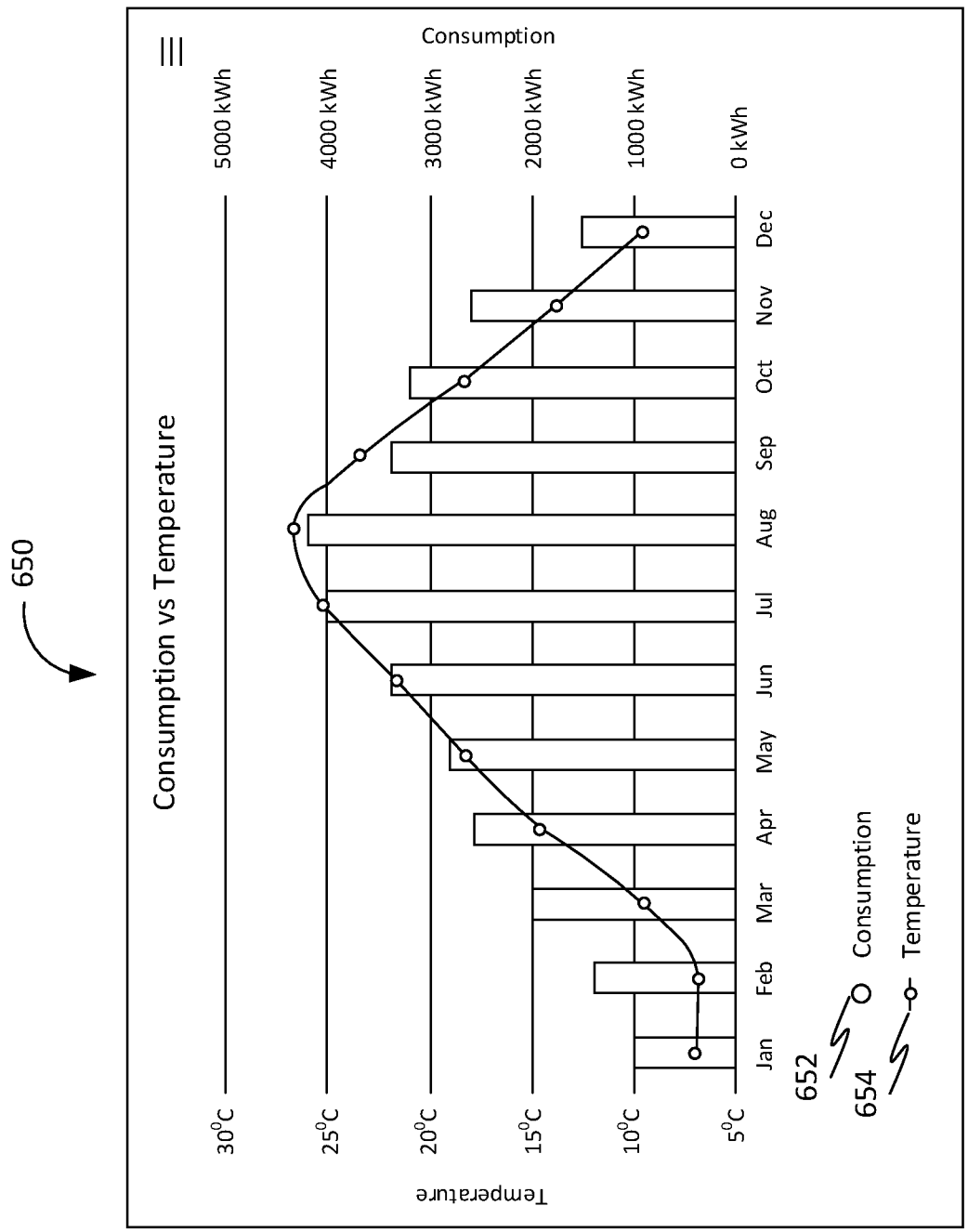
FIG. 19 depicts a representative GUI for system communications with the user, in accordance with some embodiments.

FIG. 17 depicts a historical baseline 630 from the previous historical usage data 114 along with some descriptive text and FIG. 18 depicts a chart 640 representing mean temperatures with variances in Houston in the area of zip code 77032 from the temperature data 112. FIG. 19 depicts consumption vs temperature graph 650 showing average monthly temperatures 654 along with average monthly consumption 652. Again, this type of information and data may be used for trending and for educating a consumer about annual usage (or other periods) and analysis for reasons as to why comparisons may be different. Continuing to refer to FIG. 6, the Cloud or web-based platform 110 of the present disclosure also uses historical weather data 113b for the physical geographical location 113a of the premises to normalize energy consumption based on weather and temperatures. Further, the Cloud or web-based platform 110 of the present disclosure also uses forecast weather data 113c. Note that the resulting energy fingerprint is dynamic and changes over time based on adjustments in lifestyle, behaviors, preferences and consumption.

The Cloud or web-based platform 110 of the present disclosure may use each monthly historical consumption as a reference to project the consumption and cost for each individual month and may be adjusted for seasonal effects (e.g., 2017 had Harvey effects in some areas in Texas that didn't repeat in 2018 and might have impacted electricity consumption). The system will recognize weather events (like Harvey) and its impact on consumption and make suitable adjustments in its calculations. Other types of events may also impact consumption (a power outage) and suitable adjustments may be made in the systems analysis and calculations.

Continuing to refer to FIG. 6, the energy fingerprint is the unique digital model/twin from which are determined, for example, but not limited to the following reports and analysis, historical consumption and trends 140, energy waste 142, usage breakdown and comparative analysis 144, energy consumption efficiencies and deviations (or variances) 146, energy consumption recommendations 148, and energy optimization score (Energy IQ) 150, as described later herein. The system 100 may display information in GUI's, like for example, but not limited to the consumption statistics for monthly consumption, Day vs Night consumption 420, Week vs Weekend consumption 430, and Seasonal Consumption; a carbon footprint based on the current energy plan for energy supplier; efficiency factor information 116 defined as, for example, but not limited to Idle vs Away consumption comparison, and Idle vs Away Seasonal Indexes; efficiency indicators, such as for example, but not limited to LED lights usage, cooling temperature set point vs National Average Cooling Temperature, heating temperature set point vs National Average Heating Temperature; comparative premises analysis from a monthly consumption vs reference building consumption; and consumption breakdown by device and appliance, and other similar GUIs like those illustrated in FIGS. 4, 5, and 6. Further, the display 130 may display information deviations feedback 151.

Referring now to FIG. 34 there may be seen a simplified block diagram of the arrangement of the data base for collecting and storing data and calculation steps for the system of the present disclosure. More particularly, there may be seen some of the data base storage locations for data previously noted in FIG. 6, specifically for meter data usage 114, customer behavior and preferences 116, customer historical usage 140, reference buildings 113d, customer devices 120, optimization recommendations 118, and available products and services personnel details 143, the products and services database 130b, and providers database 130a, and products and services order details 130c. In addition, storage locations for platform settings 2170, energy optimization scores (e.g. Energy IQ) 2160, and customer registration 2101 are depicted.

The resulting intermediate fingerprint data is stored in database 1390 and is used as the primary input to the calculations needed to be performed to track, analyze and determine energy usage that is somehow not as expected, as well as operating appliances and adjusting set points, if so programmed by a customer. That data 1390 is compared with the behavior and preferences data 116 and forwarded to the energy analytics engine (optimization advisory engine 110) for any needed calculations. Part of the results are then to an impact estimates data base where at least a determination or evaluation of any needed correction actions occurs. From there, the process control 2130 evaluates the need to exercise/operate/shut off/change customer devices 120, and if necessary performs those actions. The process control 2130 also uses input data from products and service data base 143 as well as the service area data 2120. If products and service are needed, then the database for providers 130a and products and services database 130b are used to identify the items needed from these two databases.

Although single interconnections between blocks are depicted in FIG. 34, one of ordinary skill in the art would clearly recognize that there are in fact multiple such interconnections in the system. The energy leakage consumption calculation of the present disclosure identifies quantities of electricity unintendedly consumed during time periods in which there are no occupants in a given premises ("away" time) compared to the electricity consumed during times in which the premises occupants are not actively using electricity (e.g., sleeping periods, a.k.a. "idle" time). The energy leakage starts with the identification of the idle and away energy consumption periods. As noted earlier in FIG. 9 the customer provides inputs about schedules including but not limited to number of occupants, time to go to bed, and wake up time, and may also include information about time at which the occupants leave the premises, and the time at which the occupants return.

Most existing platforms for determining a base and consumption load use sub-metering and/or data science techniques to determine periods and amounts of electricity usage but focus on monitoring and quantifying how much electricity is consumed when the household is actively engaged in activities that use electricity which are part of their daily routines and lifestyles. While there are energy saving opportunities from that knowledge, and almost all electricity consumers are interested in saving electricity and money, there is no significant interest in sacrificing comfort or making changes to lifestyle and habits in order to achieve that goal.

The objective of the energy leakage calculation of the present disclosure is to identify ways to save electricity in non-intrusive ways that do not interfere with or limit a consumer's intentional engagement in activities that utilize electricity (e.g., watching TV, using computers, cooking, doing laundry, etc.).

The energy leakage calculation of the present disclosure directly links customer historical usage, lifestyle schedules, preferences, and settings through analysis, comparisons and simplified pragmatic methods to identify non-intrusive ways to save energy without requiring efforts by the customer to change any regular activities in which electricity is actively consumed in the household. This integration of a plurality of customer inputs, data and behavioral science brings visibility to previously unknown wasted electricity, quantify its associated cost and environmental impact, and equally important provides a non-intrusive way to save energy. This energy leakage calculation offers a cue rich, pain free path to positive action for reducing energy consumption. To mitigate for potential user input bias or errors in the schedules that users input to the system, the idle time is also determined using a method based on clustering analytics for unsupervised learning, as described herein below. Clustering is a method for unsupervised machine learning algorithms. Typically, unsupervised algorithms make inferences from datasets using only input vectors without referring to known, or labelled, outcomes. The objective of clustering methods is simple; group similar data points together and discover any underlying patterns. To achieve this objective, clustering techniques such as K-Means, X-means, or Probability Methods (e.g., Gaussian Mixture Models or non-Gaussian models) look for a fixed number (k) of clusters in a dataset. The clustering method allows for the classification and visualization of period usage data into "k" number of clusters. Each cluster may then be identified as a period of high, low, or nominal usage.

The clustering analytics process used may be a straight forward k-means method or a Gaussian approach with the use of probability to help classify the data. Further, the results of a Gaussian mixture model on actual energy usage data may be plotted along the y-axis for a specific one-week period for a specific premises and along the x-axis represents energy usage during fixed times (timestamps) during each day.

The classification cluster that contains the energy usage and timestamp of lowest usage 1110 may be employed as the electricity consumed during times in which premises occupants are not actively using electricity (e.g., sleeping periods, lowest usage, a.k.a. "idle" time). Once all points are assigned to a cluster using the Gaussian distribution, then statistical inferences (e.g., mean and variance) may be determined for that cluster; these statistical inferences may then be used for analysis, forecasting and other related uses.

However, the non-probabilistic nature of k-means and its use of simple distance-from-cluster-center to assign cluster membership leads to poor performance for many real-world situations. Given simple, well-separated data, k-means finds suitable clustering results. From an intuitive standpoint, any clustering assignment for some points is probably more certain than for others; for example, if there appears to be a very slight overlap between the two middle clusters, the assignment between which of the two choices may be ambiguous in the cluster assignment of points between them. The k-means model has no intrinsic measure of probability or uncertainty regarding assignment of data as part of cluster assignments.

Probability based methods (e.g., Gaussian mixture model (GMM)) attempt to find a mixture of multi-dimensional Gaussian probability distributions that best model any input dataset. In the simplest case, probability methods such GMMs can be used for finding clusters in the same manner as k-means. However, the two disadvantages of k-means—its lack of flexibility in cluster shape and lack of probabilistic cluster assignment—mean that for many datasets (especially low-dimensional datasets) it may not perform as well. However, the use of such methods (e.g., GMM) overcomes these limitations, and provides for a more accurate analysis of energy usage idle time data. For example, A Gaussian mixture model (GMM) has soft boundaries and may have a single point assigned to two different clusters but with different degrees of belief (e.g., 60% in one cluster and 40% in the other cluster). Once all points are assigned to a cluster using the Gaussian distribution, then statistical inferences (e.g., mean and variance) may be determined for that cluster; these statistical inferences may then be used for analysis, forecasting and other related uses.

These Gaussian methods (mixture model cluster classification techniques) may be further developed to identify, in real or near-real time, outliers and anomalies through statistical techniques using a mean, standard deviation, and other estimators against each individually computed cluster value. The determination of the assignment of a new data point or set of data points to its classification may be achieved via Euclidean geometry as well, as an alternative.

Referring to FIG. 20, the basic calculation steps for energy leakage consumption are as follows, historical energy consumption information 7312 is retrieved from a data repository 7310 (e.g., cloud, server, data lake, etc.) along with customer input of lifestyle information 7314 regarding activities and schedules using a web browser GUI user interface (as depicted in FIGS. 9-10). More particularly, the calculation steps are as follows, idle and away periods 7316 are initially determined by using and combining multiple methods, like inputs from a customer, combined with use of machine learning algorithms including machine learning clustering techniques for unsupervised learning, like for example but not limited to, a Gaussian mixture model for classification of data, as described earlier herein. Next the energy consumption during idle and away periods is normalized 7318 to adjust for outdoor temperature differences, followed by normalization of energy consumption during idle and away periods accounting for scheduled operation of appliances (e.g., pump pools running during away periods, etc.). Idle and away period data are then compared to generate the leakage 7320. And, if desired, then a calculation and comparison of average hourly electricity usage during idle and away periods may be made, followed by an estimation of the resulting associated cost and emissions 7322 to the environment. The results from these calculation and comparison steps may then be displayed 7324 as descriptive analytics in formats such as for example, but not limited to idle and away electricity consumption and associated energy leakage, cost and emissions over a period of time (e.g., annual, monthly, weekly, etc.). These steps are briefly summarized herein below regarding FIG. 21.

Referring now to FIG. 21, there may be seen additional details regarding selected steps of FIG. 20. More particularly, it may be seen that more details 810 are provided regarding internal temperature for a residence compared to weather data 840 for outside temperature for each day (or other selected period of time) to determine "weather neutral" days (or "degree days") 820, 830. For those "weather neutral" days, a determination is then made as to whether that day is labelled as an "idle" day 820 or a "baseline" day 830, based on energy consumption for that day. The energy consumption for those days is then disaggregated 870, 880 to remove preselected appliance consumption (for example, but not limited to heating and air conditioning systems, etc.) for energy breakdown. The breakdown data is then displayed in a variety of different formats, along with breakdowns 890 for other appliances, like for example, but not limited to, lighting, washing machines, dryers 8820, customer preferences 8810, etc.

Referring now to FIG. 23 there may be seen a representative figure in a representative GUI format generated by the platform 100 from the analyzed data regarding the energy leakage (or unnecessarily consumed or used energy) for a user's premises 910 and its renewable content and environmental impacts 920, 930 in easy to understand language. The energy leakage consumption calculation of the present disclosure identifies quantities of electricity consumed unintendedly during time periods in which there are no occupants in the given premises (away time) compared to the electricity consumed during times in which premises occupants are not actively using electricity (e.g., sleeping periods, a.k.a. Idle time).

The energy consumption breakdown starts with the identification of the energy consumption base load. As noted in FIGS. 20 and 21, the consumption base load is calculated using at least the historical weather information 840. The weather information used by the system is stored in a weather database 113b for a specific location or area 113a and used in calculations based on, for example, hourly historical weather and temperature data. This weather data is then used to identify the days when the external temperature does not impact the energy usage associated with cooling or heating of a premises 810 using as reference the personal preferences of the user regarding heating and cooling set points for residence temperatures 800. The base load calculation also takes into account the hours of daylight to adjust for the consumption related to lights, in addition to the effects of the weather's daily hourly temperatures 8820.

In more detail, the energy consumption analysis breakdown depicted in FIG. 21, is a hybrid method to determine the electricity consumption by end-use appliances to assist in understanding the contribution of specific appliances usage to the total electricity consumption of a given premises. It may also assist in assessing the performance of such appliances and in identifying replacement savings opportunities.

As noted earlier herein with regard to the discussions of FIGS. 20 and 21, the analysis starts with an analysis of as much historical energy usage data as is available, but preferably at least 12 months of electricity usage data in, for example, but not limited to an electricity consumption time series using a pre-processing step that, aligns in time and unifies the sampling rate of the electricity consumption time series with the sampling rate of data from any other source. Thus, usage data can come from many different sources and with many different uniform or non-uniform sampling rates. The data may be collected not only by smart meters but any other hardware or databases. Furthermore, it can come from any single source with a non-uniform sampling rate After the usage data sampling rate is pre-processed to a consistent sampling rate, the location and historical outdoor temperature information over the same period for a given premises associated at that location (which may be estimated) 840, and the customer input about the premises characteristics, schedules and preferred space heating and cooling setting preferences 8810, 8820. Further, energy consumption survey 8830 is obtained.

The method used by the system of the present disclosure may use and integrate or compare three approaches:

a) First, a set of physical methods are used to determine the amount of electricity used for air conditioning, space heating and lighting.

i) The determination of electricity usage related to air conditioning and space heating starts with the base load calculation using as much energy usage data as is available, but preferably at least 12 months of historical electricity consumption data, along with the consumer's preferences for cooling and heating set points, and the outdoor weather information at the user's location. The method determines a base load.

This method is a variation of the well-known "degree days" 810 approach to mitigate the potential effects of unusual or non-¬uniform electricity consumption patterns and behaviors. The first step is the correlation and aggregation of the energy consumption to account for outdoor temperatures 820, 830. The calculation starts by analyzing the historical hourly weather information (such as outdoor temperature, humidity, UV index, etc.) using as much energy usage data as is available, but preferably during at least the last 12 months (depending on time period for which the historical usage data is available) for the given premises location and identifying the dates in which the mean outdoor temperature is close to the preferred space heating and cooling set points adjusted for internal premises use heat generation and has a standard deviation within a predefined range.

The electricity consumption associated with those "Weather Neutral" dates 830 is then calculated considering that given such outdoor temperature range there should be no electricity consumption associated with indoor space cooling or heating 860. That amount of electricity consumption is established as the given premises electricity base load comprising the use of electricity by all end-use appliances with the exception of electrical space heating or cooling 870, 880.

In addition, the idle energy consumption during the "Weather Neutral" dates is calculated for the premises considering only a range of time when the premises is mostly idle (for example, during sleeping hours). This idle energy consumption is used for the case where the actual energy consumption falls below the base load as determined hereinabove.

The delta between total electricity consumption and the determined base load consumption is assumed to be the electricity usage by electrical space heating and/or cooling.

The flowchart of FIG. 21 illustrates the main steps for the method just described. ii) The determination of the electricity usage related to lighting uses a hybrid method integrating physical and statistical data and modeling. As illustrated in FIG. 22, the first step consists of gathering the following inputs 9010 regarding a premises: Premises (home or building) size, type of building (commercial, industrial, residential: single family home, apartment, or mobile home), number of building occupants, and the primary type of lights used. The historical database 9020 employed should contain statistical and physical information related to the number of lights per 1,000 sq. ft. for each type of building, the average wattage per type of primary lights, the statistical number of effective hours of lights usage per type of building, the average number of occupants per type and size of building and the type and amount of building occupancy. Second, using statistical information from the historical database 9020 about the number of lights per 1,000 sq. ft. for the given type of building entered, the total number of lights in the given building is calculated. Third, the electricity consumption per hour for all the lights in the building is calculated multiplying the average wattage per type of primary lights used by the total number of lights 9030. Fourth, the statistical number of effective hours of lights usage per type of building is multiplied by the electricity consumption per hour previously calculated 9040. Fifth, an occupancy adjustment "factor" 9050 is calculated based on the number of occupants and the size of the building. Finally, the occupancy adjustment factor is applied to the electricity consumption for lights usage calculated using the previous steps resulting on the electricity consumption related to lights usage in the given premises. Again, FIG. 22 illustrates the steps for the method just described.

Publicly available data sources for this statistical light energy consumption information include but are not limited to the USA Census databases and statistics, the USA Energy Information Administration surveys and statistics.

b) As additional data sets in the database become available, the traditional "degree days" method may be applied to the data on an aggregated basis to mitigate/normalize for unusual or non-uniform electricity consumption patterns and behaviors within individual data sets. Based on this analysis the predefined number of degrees that account for internal building use of heat generation is fine-tuned and may be correlated to particular premises features including, but not limited to, premises age, size, number of occupants, etc.

c) Lastly the physical model for the calculation of the amount of electricity used for air conditioning, space heating, and lighting explained above is coupled with statistical modeling of end-appliance building electricity consumption (this can be done using among others a database of actual historical electricity consumption measurements by end appliance-sub-metering-, disaggregation of high frequency electricity consumption total loads, or public data sources including but not limited to Information Energy Agency (IEA) end use appliances consumption survey).

Statistical modeling is also used based on an Information Energy Agency (IEA) end-appliance building electricity consumption survey.

This statistical analysis is used as the baseline for determining the percentage of end use electricity consumption by main end-use appliances taking into account the particular premises features such as weather zone, type of building, building size, age, type of appliances existing and used in the given premises, fuel type used by main appliances, and number of occupants, etc.

This statistical analysis also helps to calibrate (double check the reasonableness) the amount of electricity usage calculated using the base load calculation methods described above.

The calculation of the actual consumption breakdown percentages is then adjusted on a monthly basis to account for factors that indicate usage or lack of use or whether related appliances like electrical space heaters and air conditioning are being used, and the variation in the number of hours of daylight throughout the year is used to adjust the percentage of electricity consumption related to lights in the given premises.

Again, FIG. 23 is a representative figure in a representative GUI format generated by the platform 100 from the analyzed data regarding the energy comparisons and energy consumption 910 and associated environmental impact 920, 930. Again, the energy leakage consumption calculation of the present disclosure identifies quantities of electricity consumed unintendedly during time periods in which there are no occupants in the given premises (away time) compared to the electricity consumed during times in which premises occupants are not actively using electricity (e.g., sleeping periods, a.k.a. Idle time). FIG. 24 is a comparison of user consumption with a reference house, discussed later herein.

FIG. 25 illustrates in a summary manner a portion of the various inputs needed for analysis and outputs that are then supplied by the energy analytics engine (optimization advisory engine) 1210 (110) after analysis of the supplied data. These inputs and outputs have been discussed earlier herein. The inputs are for example, but not limited to premises data 1220, temperature data 1212, weather data 1214, customer behaviors, preferences and lifestyle data 1216, meter data 1218, location data 1208, products and services data 1204, and customer devices data 1206. The outputs are for example, but not limited to energy optimization score (e.g. Energy IQ) 1272, consumption and trends 1270, leakage (waste) 1268, energy usage breakdown 1266, comparative analysis 1264, deviations 1262, and optimization recommendations and actuation 1260.

One representative example of a display of one portion of the results from the system is depicted in FIG. 28. This example is representative of a portion of the results that are collectively referred to as the energy fingerprint of the present disclosure. That is, a unique energy fingerprint for each customer is one that integrates personalized, historical energy consumption data with locational information, building characteristics, lifestyle behaviors, and personal preferences to create a multidimensional model of the time varying energy consumption for a customer's residence. Although many different results may be displayed in a user GUI, FIG. 28 displays total idle versus away 1410 consumption for each of 12 months, total consumption per month for a year 1420, day versus night consumption 1430, and weekend versus weekday consumption 1440. Other results, as illustrated by FIGS. 29 and 30 may be placed in one or more different GIU formats, at the option of a user. FIG. 29 depicts energy leakage 1450, renewable content 1452, pollution equivalence 1454, trees need to offset your consumption based on supplier provided data 1456. FIG. 30 depicts baseline historical consumption 1460, day versus night consumption 1462, and weekday versus weekend consumption 1464. The present disclosure also provides a method for the generation of an environmental impact component as part of the "Energy Fingerprint" with a matching representation of the environment impact with a calculation of possible actions needed to offset the consumer's consumption impact.

Referring now to FIG. 24, once a consumer has a multidimensional energy model (energy fingerprint), that model may be employed to benchmark the electricity consumption along with the multiple variables impacting electricity consumption of a consumer premises with the electricity consumption and variables impacting electricity consumption in comparable premises (i.e., residential, commercial, industrial) in the same area, all based on integrated multivariable time series data sets.

On the other hand, the method of the present disclosure, provides a benchmarking of energy consumption between comparable premises based on each of the given premises baseline model (Energy Fingerprint model); an Energy Fingerprint model integrates these multiple variables impacting electricity consumption and their changes over time, whether uniform or non-uniform time series (e.g., 15 minutes intervals) and provides a more precise point of reference to provide insights about consumption patterns, to determine energy optimization opportunities, and to forecast future energy consumption.

This method of the present disclosure comprises the benchmarking of time series electricity consumption data and physical and behavioral variables impacting electricity consumption for a given premises (where the time series sampling may be for example, but not limited to, seasonal, 15 minutes 1 minute, 30 second interval) and its occupants with the electricity consumption of reference buildings with equivalent characteristics including but not limited to weather zone, building size, age, fuel type used by main appliances, number of occupants, appliances, schedules.

The method is supported by a database (i.e., library) of each premises Energy Fingerprint (e.g., residential, commercial, industrial) containing their multidimensional modeling comprised of the integration of multiple functions variating over time.

Electricity consumption variations over time

Lifestyle Behaviors variations over time (i.e., schedules, occupants)

Preferences variations over time (i.e., space cooling and heating set points, water heating temperature, cost reduction, environmental footprint reduction, etc.)

Building features efficiency variations over time (i.e., new A/C, new led lights, aging appliance, broken air sealing barriers, maintenance, etc.)

Location specific outdoor temperature variations over time

The method queries for inputs from user or from a data source related to the multiple dimensions listed in the previous paragraph. Based on the inputs, the best matching fingerprint (reference premises) is selected from the system database and used to calculate a set of analytics (e.g., descriptive, prescriptive) comparing the given premises actual energy consumption versus the reference premises' consumption. This may be performed for multiple references and then averaged for a final version of the comparisons. FIG. 24 illustrates a representative GUI depicting the results from such a comparison. The actual comparison of consumption is depicted over a period of a year 1110, but other periods may be selected by a user. A breakdown of consumption is also provided for the year 1120, as is the efficiency and savings comparison 1130.

FIGS. 26-27 illustrate a simplified method or workflow and the calculations and results ascertainable from using the energy fingerprint process flow to also provide for a way for a user to establish a baseline for energy consumption and monitoring actual consumption for variances from the baseline and the determination of the cause for and correction of any variance. In summary, the method of the present disclosure creates a web-based platform with a web-based user interface (GUI) for user sign up and sign in and for enabling a user device to interface with that platform and use it to establish a baseline for energy consumption and monitoring actual consumption for variances from the baseline and the determination of the cause for and correction of any variance.

More particularly, the method of the present disclosure starts with a customer interfacing with the system to register and commence a customer consumption portfolio using a distinct visualization dashboard GUI, as previously depicted in FIG. 11. This initial registration enables a user to interface with the system using any user device 1310. For one embodiment, after this initial setup of an account for the customer, again with a user identification and password, and the customer authorizing the use of historical energy data for the customer's premises, then the system will automatically locate the appropriate meter usage data based on the meter number associated with the user's premises 1320. The method then extracts whatever data is available but preferably at least 12 months of historical energy use (for example, but not limited to, smart meter data) from the appropriate meter usage database 1330. Such databases may be maintained by an individual utility, or at a state level or at a regional level by a third party.

Automated Machine Learning (AML) may be used to generate a personalized forecasting prescriptive algorithm involving the fitting of electricity consumption for each customer and multiple factors including but not limited to weather factors, behavioral factors (e.g. schedules, appliances set points, occupancy), premises features (e.g. conditions of appliances, building materials, building age) and parameters determined by an ensemble of machine learning models 1340. AML is the process of automating end-to-end the process of applying machine learning algorithms to real-world problems. In a typical machine learning application, a dataset consisting of input data points is used to train the models. The raw/unfiltered uncleansed data is pre-processed via extraction, selection, imputation, and application of feature set that make the dataset amenable for machine learning. Following those pre-processing steps, an algorithm selection and hyper parameter optimization is performed to maximize the predictive performance of their final machine learning model. Automating the process of applying machine learning end-to-end offers the advantages of producing simpler solutions, faster creation of those solutions, and models that often outperform models that were designed by intuition.

The method of the present disclosure starts by extracting historical energy use (for example, but not limited to, smart meter data) from the appropriate meter usage database. After the time series usage data is downloaded, then the system performs multiple iterations on preloaded algorithms and optimizes the number and selection of hyper parameters. Optimization maximizes the predictive performance and can help minimize computational expense. The parameters evaluated in this process can include but are not limited to historical variations in weather factors (for example Outdoor temperature, humidity, UV index, cloudiness, etc.), premises occupancy, occupants' lifestyles and preferences including premises schedules/utilization, and appliances set points (including thermostats, water heaters, lights schedule and intensity, etc.), and premises features (for example size, thermal and insulation properties, appliances, etc.).

Once the number and optimum parameters are identified, the system runs the preloaded machine learning algorithms (including but not limited to Rain Forest, KNN, etc. than can be obtained from any standard Python Library) generating the personalized model that best describes the electricity consumption as a function of the features selected. Normally this process is run using at least 12 months of historical electricity consumption to train and test the model to account for changes related to seasonality. When there are not 12 months of historical electricity consumption available, the process utilizes the data available to generate a model that will have the lowest degree of uncertainty and potentially highest prediction accuracy. To account for this increased uncertainty and potentially greater variations, the mean and standard deviation for the model generated with the known data are calculated and used to project "an acceptable working envelope/boundary" for the values generated by the predictive model.

The resulting personalized model 1340 has many uses including but not limited to the projection of the annual baseline electricity consumption as depicted in FIG. 31, but especially when only partial or incomplete information is available. As time goes by and additional electricity consumption data becomes available, the model is recalibrated replacing the projected data with the newly available actual data. As the process continues, the model uncertainty decreases progressively over time, and the prediction accuracy increases. Another use of this personalized model includes the forecast of energy consumption to evaluate actual consumption values and perform prescriptive and diagnostics analytics to determine if actual usage falls within an "expected" range within x number of standard deviations (sigma) or if an alarm or further evaluation needs to be triggered.

After the usage data is downloaded then the system performs disaggregation and aggregation on this data and the data is also converted into a unique and specific database format and stored by the system. The method next uses this disaggregated and aggregated data in specific combinations and summaries to generate personalized energy consumption trends 1340. Examples of these types of trends were previously depicted in FIGS. 4, 5, and 6.

The method also solicits from the selected customer behavioral inputs 1350 that are unique to their household, such as for example, but not limited to time schedules, number of occupants, interior temperature set points for heating and cooling, current electricity provider and plan, number of occupants and activities within the household, and usage of electrical appliances and devices, etc. FIG. 9 is one representative example of a GUI for obtaining this information from a customer.

Following this, the method may next generates personalized energy consumption 1360 based on customer behavioral inputs above that leads to additional analysis and results in personalized energy consumption such as for example, but not limited to a unique consumer calculation characteristic coined "energy leakage" representing inadvertently used electricity during periods in which the customer is not present, a determination of a unique energy consumer environmental impact fingerprint, a representation of the consumer's environmental impact through a simple determination of the number of trees saved or needed to offset the CEI (consumer environmental impact).

Following this, the method may next solicit from the customer additional inputs 1370 related to the household's attributes such as for example, but not limited to size and age, installed appliances, installed smart devices, current provider and electricity plan, etc. FIG. 10 is one representative example of a GUI for obtaining this information from a customer.

Following this additional data input, the method may next generate personalized and customizable actionable information 1380 such as, for example, but not limited to visualization of time-series usage data for comparison against localized and regional locations (benchmarking), unique energy usage breakdown by appliances (interior and exterior), unique energy efficiency indicators for cost savings, energy reduction, and consequently the environmental impact savings by the consumer. This information may then be used to calculate a base line with descriptive and predictive analytics and use that as a basis for determining deviations or variations (using an end-user's criteria) 1390.

As depicted in FIGS. 26-27, the present disclosure also provides a method 1300 for generating personalized energy analytics to establish a baseline for energy consumption and monitoring actual consumption for variances from that baseline and the determination of the cause for and correction of a variance; the baseline consists of the integration of preferably at least 12 months of historical electricity consumption in a data series (for example sampled at 15 minutes intervals) for a given premises (residential, commercial or industrial), with behavioral aspects, lifestyle behaviors and preferences including schedules, number of occupants, preferred heating and cooling settings, locational, and weather related information to create a personalized multidimensional overlay to more accurately model the unique energy consumption in such given premises and its dependency with variations over time in lifestyle, behaviors, preferences and premises features and appliances. Note that historical energy usage and weather time series downloads from data sources (e.g., server, data lake, etc.) may continue on a continuous or scheduled basis, and changes over time in behavioral and lifestyle elements including schedules, household occupancy may also be similarly updated through an interactive GUI interface. Again, the historical data usage time series data set may be updated with new data downloads. The method of the present disclosure creates and uses a multidimensional model that includes the integration of multiple functions related to or detailing or dealing with energy consumption, all with variations over or in time, but aligned with each other along common time slices. The components of the energy analytics, as depicted in FIG. 7, may include, but are not limited to: electricity consumption over time (and energy generation using solar panels, batteries, etc.) 210; lifestyle behaviors over time (schedules, number of occupants, etc.) 218; preference variations over time (heating and cooling set points, hot water heater set point, cost reductions, windows, insulation, etc.) 218; building/premises feature efficiency over time (new A/C unit, new lights, aging appliances, maintenance, etc.) 218; electric Utility Supplier data 218, and location specific variations over time (outdoor temperatures, weather, etc.) 218.

The personalized analytics in the so-called "energy fingerprint" model 1390 for a user provides a comprehensive model intended to provide actionable insights to help end-use energy consumers understand their energy consumption, identify saving opportunities and make smarter energy delivery and consumption choices. It includes quantified energy consumption and savings in terms of kWh, equivalent cost and environmental impact, and the model may be used to calculate and rank available electric utility or supplier plans using an end-user's selection criteria for choosing a supplier.

The components of these personalized energy analytics may include, but are not limited to:
  Historical energy consumption trends 230*a* (140) that vary over time organized and aggregated by:
    Monthly, seasonal & weekly Consumption
    Breakdown of Day vs Night consumption
    Breakdown of Week Vs Weekend consumption
    Grid On-peak versus Off-peak consumption
  Energy leakage 230*b* (142) defined as unintendedly consumed electricity during time periods in which there are no occupants in the given premises (away) for a baseload compared to the electricity consumed during times in which premises occupants are not actively using electricity (e.g., sleeping periods, a.k.a. Idle time)
  Quantification of polluting emissions to the environment (e.g., carbon dioxide, sulfur dioxide, nitrogen oxides, methane, etc.) as a result of electricity consumption given the renewable content provided in the currently utilized electricity plan
  User friendly visualization and contextualization of the environmental implications of the emissions in everyday life terms to facilitate user understanding. For example: Greenhouse effect, Particles in the atmosphere, Equivalence in vehicle driving miles, Equivalence of the number of trees required to be planted to offset such environmental footprint if a switch to a 100% renewable plan is unsuitable
  Benchmarking of electricity consumption 230*d* (146) based on integrated multivariable time series data sets for comparable premises for a uniform sampling rate (for example, but not limited to being sampled at 15-minute intervals and stored in a memory, being measured and stored in real time, or being sampled in near real time). Comparing electricity consumption of the given premises compared to the electricity consumption of reference premises using the same sampling rate, and with equivalent characteristics such as, for example, but not limited to the same weather for an area of interest, similar building size, age, fuel type used by main appliances, and number of occupants.

Total energy consumption 230c (144) breakdown by main end-use appliances in a premises.

Energy Efficiency indicators based on features such as, for example, but not limited to the type of light bulbs used, age of appliances, use of smart learning thermostats, use of smart or IoT appliances or devices, etc.

Thus, it may be seen that the method of the present disclosure provides a user with, for example, but not limited to the following key performance indictor (KPI) information 1380 regarding energy consumption: Consumption Statistics Monthly Consumption Day vs Night Consumption Week Vs Weekend Consumption Seasonal Consumption Carbon Footprint of current plan and possible actions to offset it Energy Leakage Idle Vs Away consumption comparison Idle Vs Away Seasonal Indexes Efficiency Factor Efficiency indicators including but not limited to:
  LED lights usage
  Age of appliances
  Heating and Cooling Temperature Vs National Average Cooling set points
  Use of smart learning thermostats Comparative Premises Energy Consumption analysis
Monthly consumption vs reference building consumption
Consumption Breakdown by end-use appliance The method may be used to calculate the energy fingerprint for a given building or residence. FIGS. 28-30 provide representative examples of the types of results that are available from the system and methods of the present disclosure after an energy fingerprint result 1380, 1390 has been calculated and determined. Once determined the results of the method (energy fingerprint) may then be further used to obtain and analyze energy consumption to establish a baseline for energy consumption and monitoring actual consumption for variances from the baseline and the determination of the cause for and correction of a variance.

Energy Advisor Method or Process

The present disclosure provides a system and method for direct linkage of customer time series usage data, behavioral preferences, application of analytics for detection, forecasting, diagnosis, and remedial recommendations for cost efficient operations of a consumer's house. The system provides a direct link to marketplace products and services for maintenance and repair of appliances and household construction. This merging of a plurality of customer and usage data inputs connected with data analytics with products and services offered by the marketplace is not currently available. Providing such capabilities under the umbrella of one software application that connects all of the dots in a unique system and method is also not currently available in the building energy usage space.

Referring now to FIGS. 26-27, the method of the present disclosure starts with the common process step of energy fingerprint of first ascertaining a consumer's address and validation of their account for the system 1310, and then gathering their historical energy usage data and other data that impacts energy usage. Data integration of smart meter and other advisor database information 1320 is the next step followed by a "time period" extraction of historical energy usage or consumption data 1330. FIGS. 26-27 illustrate the process steps unique to the advisor implementation that results once the initial (energy fingerprint) intermediary method steps have been completed. Once a consumer has a multidimensional energy model (energy fingerprint), that model may then be employed in advisor process steps, as further illustrated in FIGS. 26-27, and as discussed herein below.

Part of the initial data download 1320 depicted in FIGS. 26-27, is the information related to local products and services available for energy consumption optimization (e.g., smart thermostats, programmable pump pools, programmable lights, motion and occupancy detectors, certified technicians and repairmen, customer satisfaction ratings, average costs, etc.) and that are loaded into an advisor database 143 (e.g., system grouped in a hierarchical structure, non-structure data base, etc.). Although part of the initial download, this data may be downloaded at any time before completion of step 1390 of FIGS. 26-27.

A simplified block diagram of the advisor database 143 is depicted in FIG. 37. As noted in FIG. 37, customer preferences and plans 3410 are used as an input to the building (or premises) zones 3440 and the schedule 3420. Schedule information 3420 is input to the assets/devices commands data section 3430 for controlling assets and devices, which in turn provides an input to the asset type data 3460. In addition, the asset type data 3460 receives an input from the assets/devices list 3450. The assets/devices list 3450 provides an input to the events data 3480 and measurements data 3490. The assets/devices list 3450 receives an input from the assets relationships data 3420. This arrangement of the data is optimal for supporting parallel processing.

Continuing to refer to FIGS. 26-27, the historical electricity consumption information for the premises of a consumer logged in is retrieved 1330 from an external data base storing this and other data related to energy consumption (e.g., cloud, server, data lake). Alternatively, it may be obtained from the historical energy database 114.

The advisor method uses the results of the uniquely personalized energy assessment 1380 (called energy fingerprint) which calculates, visualizes and creates displays for at least: historical electricity consumption trends for a premises, environmental impact of the current electricity consumption given the current electricity plan, as well as the actions required to offset such impact, energy leakage savings and energy efficiency savings.

The advisor method next initializes an energy consumption portfolio 13010 with a distinct visualization dashboard (FIG. 32 depicts one such representative example of a GUI for this dashboard). The dashboard of FIG. 32 depicts a variety of information, including, but not limited to, address information 4010 (*a-e*), optimization actions 4040 (including, but not limited to connected devices 4040a, efficiency improvements 4040b and plan renewable content 4040c) an optimization score (Energy IQ) 4020 (including, but not limited to a range 4020a of zero and 4020b of 100, and the actual number 4020c), and energy factors 4030 (including, but not limited to leakage 4030a, efficiency indicator 4030b, trees saved 4030c, renewable content 4030d, history 4030e and actuation 4030f).

As part of the initialization step 13010 of FIGS. 26-27, the advisor method next initializes customer inputs for energy consumption optimization goals/criteria (FIG. 33 depicts one such representative example of a GUI for this input) and importance of preference criteria 13010 (from less important to most important), including but not limited to (cost savings 2010, reduction of environmental footprint 2020, lifestyle impact 2030, and annual budget target 2040).

Next, a customer is provided with time series monitoring of actual versus forecasted energy usage 13020 with trending capabilities and the quantified changes in key energy indicators (including costs, efficiency, energy leakage, and environmental footprint) during a given period via an energy dashboard that is updated using new energy consumption and locational weather data retrieved and integrated at different time periods (e.g., real time/near real time, hourly, daily, weekly, monthly) from data sources (e.g., smart devices, metering systems, server, data lake, etc.). FIGS. 30-33 depict some representative examples of these types of data and analysis. Similarly, FIG. 35 displays actual monthly period to period electricity usage variations compared to average outdoor temperatures for those months as one example of descriptive analytics. FIG. 35 displays predicted (predictive analytics) electricity consumption based on personalized fitting functions, and time and weather factors. FIG. 36 compares actual consumption usage vs. projected predictions and may be used to determine variation (statistical sigmas).

Continuing to refer to FIGS. 26-27, a personalized energy model baseline is used in step 13020, the advisor methods further provides: predictive, diagnostic, and prescriptive analytics that are performed to forecast usage, detect anomalies, provide alerts, diagnose actual against forecasted, etc. Deviations in energy consumption patterns are detected and prompt Interactive capabilities to query the customer for changes in consumption behaviors and building attributes during step 13020. Customer feedback is integrated to train and update the customer's personalized energy advisor forecasting, prescriptive, diagnostics and optimization capabilities as part of step 13020.

In step 13030 of FIGS. 26-27, advisory recommendations are triggered when the energy advisor system and method associates deviations in energy consumption patterns to situations requiring remediation. Once a predetermined variation threshold in the baseline is exceeded, based on consumer preferences and personalized models, flag and notify customer and prompting for input (including changes in: behavior, lifestyle, household features, appliances, etc.). Then, recalculate baseline usage predictions based on customer input and reassess variation threshold. If usage deviations are explained by the updated baseline model, clear the flag and update baseline model. When a deviation cannot be mapped to the baseline model updated with customer inputs, the system conducts diagnostics analysis and recommends possible remediation to eliminate or mitigate usage increases (e.g., set point adjustments, maintenance, repairs, replacement, upgrades of household features or appliances). A remediation may include for example, but not be limited to, adjustments in set points in end-use energy consuming appliances for energy consumption reduction, improved performance, and cost savings based on customer's predetermined goals, premises or appliance maintenance, premises or appliance repair, premises or appliance replacement, premises or appliance upgrade, etc. Personalized recommendations and referrals are triggered for marketplace products and services 13030 available to act on the recommendations for energy consumption optimization and anomalies remediation.

Energy advisor recommendations are acted upon (including premises or appliance maintenance, premises or appliance repair, premises or appliance replacement, premises or appliance upgrade, etc.) and are recorded in the system and integrated to update and train the customer's personalized energy fingerprint and energy advisor personalized forecasting, prescriptive, diagnostics and optimization capabilities.

In step 13040 of FIGS. 26-27, the information about end-use energy consuming appliances and smart devices from earlier energy fingerprint calculations may be complemented with actual integration (e.g., cloud or on-premises) to allow automated actions based on optimum set points determined by the models and analytics in the energy advisor system from time series usage, building features, and behavioral data.

In step 13050 of FIGS. 26-27, to provide reinforcement to the user for showing how "optimized" their actual energy consumption is, an Optimization Score (Energy IQ) is calculated (and displayed and may be depicted as illustrated in in FIG. 32). The Energy Optimization Score (Energy IQ) integrates the information in the customer's energy fingerprint and the on-going energy consumption data which can be gathered from multiple sources including smart devices and sensors located in or on the customer premises. Initially, only the information in the customer energy fingerprint is used to compute this score. The Energy Optimization Score (Energy IQ) is based on their consumption profile benchmarked versus a comparable building and versus an ideal energy optimized scenario. As the continuous monitoring of energy consumption and performance indicators takes place the Energy Optimization Score (Energy IQ) may be updated and displayed. The Energy Optimization Score (Energy IQ) uses a rating from 0 to 100. The Energy Optimization Score (Energy IQ) uses the variations in energy indicators calculated by the energy advisor using the earlier energy fingerprint results. Again, as a means to provide reinforcement showing the user how optimized their energy consumption is, an Energy Optimization Score (Energy IQ) is calculated. The Energy Optimization Score (Energy IQ) integrates the information in the baseline model (energy fingerprint) and the on-going energy consumption data which can be gathered from multiple sources including smart devices and sensors in the customer premises. Initially only the information in the customer energy fingerprint is used to compute this score. As the continuous monitoring of energy consumption and performance indicators takes place the Energy Optimization Score (Energy IQ) is updated and displayed. The optimization score uses the variations in energy indicators calculated by the baseline model and the Energy Advisor system. FIG. 40 depicts a simplified block diagram of the steps for calculating the optimization score.

Referring now to FIG. 40, there may be seen one example of a process for calculating an optimization score. More particularly, the energy analytics engine (optimization advisory engine) starts with the dashboard indicators 5020 of FIG. 40. The energy analytics engine (optimization advisory engine) then reviews the customer devices and optimization goals 5030 and compares with the energy optimization actuation recommendations 5040 to determine if the recommendations have been implemented 5050. If yes, then the optimization(s) implemented is stored 5070 and if not, that means no change to the previously stored implementations. In either event, the Energy Optimization Score (Energy IQ) is updated 5060, as noted earlier herein, and the baseline model (energy fingerprint) is updated 5080, along with the dashboard.

In step 13050 of FIGS. 26-27, continuous energy consumption monitoring with descriptive and prescriptive analytics to explain period-to-period deltas versus baseline model is provided as follows.

In general, the variations in a consumer's electricity usage over time is not easily determined by a consumer. There is also a lack of tools and points of reference to make sense of such variations. Providing actionable insights for energy usage variations using a personalized context is a powerful tool that can help educate and guide consumers to make adjustments and decisions that can reduce consumption, costs and environmental impact.

Once the metrics from advisor are calculated or determined as described herein above, some of the metrics may be continuously monitored and displayed, that for example, but not limited to, include:

Total energy consumption for the preselected period (e.g., daily, weekly, monthly, seasonal, annual, etc.)

Energy Consumption breakdown by main end-use energy consuming appliances for the given period preselected Total energy consumption cost (e.g., projected and actual) for the preselected period (e.g., daily, weekly, monthly, seasonal, annual, etc.)

Energy Optimization Score (e.g. Energy IQ)

Option to pick a monthly budget target

Projected electricity cost at improved Energy Optimization Score (e.g. Energy IQ)

Suggestions to improve Energy Optimization Score (e.g. Energy IQ) or not go over budget The Capability to take action (change settings, switch of appliances, etc.);

directly from the application and option to implement automation of optimization recommendations over a set time can be accomplished as discussed in the next section Integration with existing social media platforms to share and showcase the progress in Energy Optimization Goals & the Energy Score metrics.

Also, in step 13050 of FIGS. 26-27, surveillance and optimization with integration of IoT smart devices and non-intrusive automation of set-points to optimize energy consumption efficiency is provided, as noted herein below.

Also, in step 13060 of FIGS. 26-27, Automation & optimization of set points to optimize energy consumption, cost and environmental footprint is provided.

Abundant approaches to building automation and to end-use appliances exist in the market but an integration of building automation with real or near-real time electricity consumption monitoring for the purpose of optimizing electricity consumption without affecting occupants comfort, lifestyle or behaviors is missing. The key to this innovation is the focus on prioritizing optimization during periods in which the occupants are not actively engaged in using electricity (e.g., idle times, sleeping) and when there are no occupants (e.g., away times).

Again, one uniqueness of the present disclosure is the integration of personalized energy modeling, monitoring and diagnostics methods (as the ones described as the customer baseline model (energy fingerprint) and the continuous energy consumption monitoring with descriptive and prescriptive analytics to interoperate, agnostically, on-premises and cloud/server/intranet based with smart meters and disparate smart devices including (e.g., devices, appliances, sensors, computers, phones, controllers, connected to the internet or intranet, for example Smart Thermostats, Alexa, Smart Plugs and Lights, water heaters, pump pools, window shades, clothes washers and dryers, electricity storage devices like batteries, etc.) for the purpose of providing surveillance and optimization (e.g., reduction of waste, optimization of operating set points) of the electricity consumed in a given premises (e.g., residential household, businesses, industrial) while minimizing discomfort and effort of occupants (non-intrusive with occupants comfort, behavior and lifestyle).

The user interface (GUI) allows the integration and configuration of existing IoT smart devices on premises (and on the cloud) to set up preferences, priorities and restrictions, including, but not limited to:

Number of occupants

Activities and schedules for occupants and devices

Requirements and prioritization for comfort set points (e.g., cooling, heating, water temperature, indoor lighting)

Requirements and prioritization for comfort set points for operating set points (e.g., pump pools, surveillance systems, etc.)

Activation and deactivation of automations

Integration to voice command systems (e.g., Alexa) and GPS systems (i.e., in smart devices or cars) as automation triggers.

The system 100 is a hybrid of edge and cloud computing as depicted in FIG. 38. The edge device is important because not all IoT devices have internet connection capabilities. Also, the bandwidth required to transmit data to the cloud is reduced and insights can be delivered to the user more quickly. The cloud service will be needed for more computationally expensive work and to integrate data from different customers as well as to store historical data as depicted in FIG. 39. The value this brings to the customer is a system which integrates all their existing devices and helps them save money by providing them with insights, giving them the ability to improve and show them their progress. FIGS. 38 and 39 illustrate various aspects of the technology stack for advisor and a high-level product architecture.

HUB/Edge gateway: A hub able to connect agnostically with these devices using the different communication technologies. Capable of performing edge computing using platforms (e. g. AWS, Azure, Edge, etc.) Data processing and filtering so as to send only relevant data to the could ability to store relevant data for a few days Cloud: The cloud server serves as a data repository for processed data from the edge device. It is also used to bring together information from several customers and carry out benchmarking and more computationally intensive analysis and recommendation in the Energy Advisor.

FIG. 42 depicts a simplified high-level representation of the energy analytics engine (optimization advisory engine) of this disclosure. The energy analytics engine (optimization advisory engine) follows the steps illustrated in FIG. 42. Major components have been previously identified by an item number from a prior figure. FIG. 42 depicts in more detail portions of the calculations illustrated in FIG. 7. FIG. 42 depicts that the historical usage data is disaggregated and re-aggregated into the time periods (or "cycle" categories) needed to match up with device categories 170 for the calculations 3950 of the impact (e.g. cost, environmental footprint, changes to schedules and set point of devices) and alignment with customer's optimization criteria 2010, 2020, 2030, 2040 for each available optimization opportunity available. User criteria are employed as part of the calculations associated with ranking 3950. Further, Home Modes, Data is received from Smart Meter & Devices 3910, Define Optimization is Run based on user settings and goals 3920, Partition data in time series cycles 3930, Aggregate Data 3940, Evaluate, Rate, Rank Impact (e. g. cost, environmental behavior) 3950 and Aggregate Results, Prioritize, Optimization Recommendation 3960.

The impact and alignment are calculated for each optimization opportunity available in the database as weighted scores based on each given's total impact projections and the and alignment with the customer optimization criteria. The optimization opportunities available in the database are ranked and sorted based on weighted scores FIG. 40. FIGS. 43 and 44 each illustrate various aspects of the evaluation of optimization opportunities available, the recommendation and the actuation processes. The user interface provides the customer the ability to modify the inputs for the optimization criteria, set points, preferences and schedules to recalculate the optimization recommendations until satisfied. The customer has the option to set the actuation of the optimization recommendations to manual or automatic, and to define automation settings, notifications and thresholds. The GUI (graphical User Interface) for the system 100 includes:

- Display of the impact and alignment score for each available optimization opportunity based on consumer preferences
- Interface to adjust selection criteria and recalculate weighted scores/re-rank optimization recommendations until satisfied
- Interface to define and schedule personalized building modes
- Interface to filter optimization recommendations by multiple criteria (e.g., cost, environmental footprint, changes to set points and schedules, etc.)
- Display and Side by side comparison of top optimization recommendations identified based on weighted scores calculated based on the customer's optimization criteria
- Graphical comparison of the current condition and recommended optimization projected costs based on baseline historical and predicted consumption
- Comparison of environmental impact of the current and recommended condition and recommended optimization projected costs based on baseline historical and predicted consumption
- Interface to actuate the optimization recommendations
- Interface to set the actuation mode for the optimization recommendations
- (e.g. manual, automatic, hybrid), and to define automation settings, notifications and thresholds.

A method for surveillance and optimization with integration of IoT smart devices and non-intrusive automation of set-points is summarized in the following process:

Again, a user logs into web portal to create or integrate energy modeling profile (e.g., energy fingerprint) including notification and level of automation settings.

1. A user may then download and install a Mobile Application on their smartphones to offer integrating to the solution and the ability to act as a trigger for building-modes based on GPS geolocation information, routes and schedules which serve as a feedback loop for the application analytics and its machine learning algorithms to improve the automations.
2. A user may add and configure smart devices with specific prompts based on the specific integration requirements of each device.
3. Once smart devices are added 120, the user has the ability to assign the devices to specific zones in the premises (e.g., indoor, outdoor, first floor, second floor).
4. The user is then provided with the ability to define and configure building modes and building zones, define and schedule personalized building modes 4140, 4150, 4160. Building modes provide a means to associate automation commands, schedules and triggers to devices or zones (e.g., geolocation of occupant's cars and smartphones, electricity price signal triggers, time of the day, etc.).
5. A user defines desired schedules 4020, 4140, 4060. Schedules allow the automation of actions either to individual devices or zones. Those actions can be either changes of building modes, or device specific commands.
6. A user also has the ability to activate automation through voice commands using voice command interfaces (e.g., Alexa or Google Building).
7. The data mentioned in the previous steps including the device configurations, building modes, sensors and smart devices collected data, etc. goes into a distributed database (or data lake) with components both on the customer premises e.g., at the edge device/hub and in the cloud server. At the edge level, an integration hub serves as a temporary repository for all the IoT devices data while the cloud will serve as a final repository for processed data which is transmitted in a predetermine schedule basis. The hub uses an interoperable software platform such us Bemoss, OpenRemote, Azure IoT Edge, etc. to communicate with the devices handling multiple communication protocol and API translators including for example Wifi, Zigbee, HTTP/XML for existing devices. At the cloud level, the data processed and transmitted from the edge device is integrated with the baseline model (energy fingerprint) for more computationally intensive analytics available in the energy advisor system.
8. Machine learning algorithms continuously learn new patterns and update existing patterns from the users refining suggestions and actions to improve energy consumption with minimal discomfort (FIG. 41 depicts one representative example of a machine learning method to accomplish this action). FIG. 41 illustrates, in a summary manner, a simplified block diagram for using machine learning for this type of action.
9. Referring now to FIG. 41, there may be seen one example of a process for machine learning for prescriptive analytics with customer interactions. More particularly, the energy analytics engine (optimization advisory engine) starts with the customer historical usage, preferences and behavioral data 6010, reviews the baseline personalized model (energy fingerprint) and descriptive analytics 6020 and monitors the machine learning portion of the baseline personalized model and its descriptive analytics 6030 and determines if the model thresholds 6040 for variations that exceed those thresholds 6045 and then evaluates if there are explanations for the variance based on location events or weather factors 6050, and if so, alerts and queries the customer 6060. If the customer is satisfied with the variance, then the customer may initiate modifications to existing schedules or set points to clear the variance 6062. If not, a query is made regarding changes in occupancy 6064 and if not a query is made regarding changes in appliances and features 6066. For items 6062, 6064, and 6064, if change have been made then the baseline personalized model monitoring step 6030 is changed or modified to reflect these changes. And, if the baseline model is modified then the optimization recommendations and actuations are modified 6070, which in turn results in modifications to the baseline model 6080 and then the energy optimization score (e.g. Energy IQ) 6090.
10. A user is notified when updated recommendations are available and has the ability to accept, adjust or reject the suggested automation.
11. Accepted automations are incorporated into the application schedules and building modes.
12. A user receives periodic notifications, including reports, on the automations performed and the equivalent reduction in energy consumption, cost, and pollution emissions.

13. A user may also use interface to opt-in or opt-out for integration with utility demand response programs and incentives available in their area. That is, the system and method of the present disclosure may be integrated with utility demand response programs offering a more transparent and consumer empowering method to account not only for reductions of energy leakage, reduction of consumption during electric grid peaks, choices to adjust energy consumption according to electricity price signals but also for the customers associated incentives and savings in costs, energy reduction and environmental footprint shrinkage.

Thus, it may be seen that the present disclosure provides a system 100 for end-user energy analytics and optimization that is useful for obtaining and analyzing power consumption to establish a baseline for energy consumption and monitoring actual consumption for variances from the baseline and the determination of the cause for and correction of a variance, having at least one processor and an associated instruction memory; at least one memory storage device configured to store: (i) historical energy usage data for a premises (facility), (ii) historical weather data for the zone associated with the premises (facility), (iii) data for unique and variable premises energy characteristics, (iv) electricity utility or supplier plan data, (v) end-user provided data regarding optimization criteria, and (vi) products and services from a local product and services database; an analytics and computation engine executed by said at least one processor using a first portion of instructions stored in said associated instruction memory for performing: (i) conversion of and storing of historical energy usage data for a premises, (ii) statistical analysis of, aggregation of and disaggregation of said historical energy usage data, (iii) statistical analysis of historical weather data associated with historical energy usage data, (iv) machine learning and employing artificial intelligence models to identify data clustering, outliers and other data driven insights and incorporating ongoing feedback to selected portions of the analysis, (v) time slice synchronization of selected portions of said data stored in said at least one memory storage device, (vi) analyzing said data for energy consumption by one or more energy devices associated with said premises, (vii) computation of energy costs using said converted and stored historical energy usage data, (viii) providing alternative representations of energy usage data associated with a source of energy for said premises, (ix) determining/providing recommendations for available energy reduction choices, (x) providing a baseline for energy consumption, (xi) monitoring actual consumption for variances from the baseline, and (xii) determining the cause for and correction of any variance; a display engine executed by said at least one processor using a second portion of instructions stored in said associated instruction memory for: (i) receiving end-user goals, lifestyle behaviors, and premises information and occupation data, (ii) displaying synchronized time slice data in one or more pre-selected formats, (iii) displaying alternative representations of energy usage data associated with a source of energy for said premises, (iv) displaying recommendations for available energy reduction choices, (v) displaying energy consumption for said energy devices associated with said premises, (vi) displaying and alerting an end-user of variances in energy use based on one or more of selected set points, excessive usage, variances from baseline, and unintentional usage, and (vii) recommending possible remediation(s) to eliminate or mitigate usage increases. While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Aspects of the Present Disclosure:

Aspect 1. An energy analytics, optimization and control system for use by an end-user for monitoring and controlling energy consumption, comprising:

At least one processor, a first memory for storing programming instructions for the processor, wherein a first set of programming instructions when executed by the processor cause the processor to receive, convert and store in a single common interoperable data format preselected data from multiple sources regarding a plurality of customer premises, and wherein a second set of programming instructions when executed by the processor cause the processor to partition historical data, aggregate, compare and analyze said data using at least common time period and time slice information for each premises of the plurality of premises, at least a second memory for separately storing the preselected data from multiple sources that comprises historical energy usage data for preselected locations for the premises, historical weather data for preselected locations, descriptive information and characteristics data for a plurality of customer premises at the preselected locations, user preference, behavioral and schedule data for respective premises in the plurality of customer premises, consumer products and repair and service providers, and user criteria preferences regarding optimizing consumption, and a user interface for interacting with a user to allow user inputs to the system and at least displaying results in a plurality of preselected formats from said processor processing said preselected data and analysis of the preselected data stored in said memories and from comparisons and combinations of those sets of data in common time periods, wherein the results comprise at least one of the following:

comparisons of actual and historical energy usage in the same time period during different times, comparisons of energy usage in adjacent time periods, alternative representations of energy consumption for a preselected time period, energy consumption for preselected energy consumption devices for a preselected time period, determination of unintended energy consumption, efficiency of energy consumption.

calculated energy optimization score (e.g. Energy IQ), comparisons of energy usage for similar reference premises at the preselected locations for preselected time periods, baseline energy consumption including breakdowns for devices, periodic comparisons of baseline to actual consumption, listing of variances between baseline and actual usage, recommendations for correcting variances, recommendations for corrections of variances to reduce energy consumption to correct variances and reduce consumption, recommendations for adjustment in preference and schedule data for a user to control and reduce energy consumption, cost, and environmental impact to correct variances and reduce consumption.

Aspect 2. The system of aspect 1, further comprising the generation of a personalized descriptive and forecasting prescriptive algorithm (model) involving the fitting of electricity consumption for each customer and multiple factors including but not limited to weather factors, behavioral factors (e.g. schedules, appliances set points, occupancy), premises features (e.g. conditions of appliances, building materials, building age) and parameters determined by an ensemble of machine learning models.

Aspect 3. The system of aspect 2, further comprising the continuous monitoring of the energy consumption comparing it to the baseline and personalized model to detect variances, alert and query customer when predefined threshold is exceeded.

Aspect 4. The system of aspect 2, further integrating the customer feedback into the training and continuous improvement of the customer's energy fingerprint and personalized machine learning descriptive and predictive models.

Aspect 5. The system of aspect 1, further comprising an interactive customer interface allowing user to provide weighted inputs on personalized energy optimization criteria and goals.

Aspect 6. The system of aspect 1, further comprising the detection and identification of variances and their cause.

Aspect 7. The system of aspect 1, further comprising the identification, scoring, ranking; display and notification of weighted opportunities available to correct the variances; the scoring and ranking of the impact (e.g. cost, environmental footprint, changes to appliances schedules and set points) of the opportunities available to correct variances; scoring and ranking of the alignment of the impact of the opportunities available to correct variances and the users' energy optimization criteria including but not limited to cost, environmental footprint, impact to lifestyle, budget goal.

Aspect 8. The system of aspect 1, further comprising, storing programming instructions responsive to actions by a user for creating building zones and building modes for communicating with and controlling components, devices, appliances and smart device components and appliances.

Aspect 9. The system of aspect 8, further comprising, storing data for smart device components and appliances; storing programming instructions responsive to actions by a user for communicating with smart device components and appliances; and converting and storing in a single common interoperable data format preselected data from those multiple sources.

Aspect 10. The system of aspect 8, further comprising, storing programming instructions for actuating, controlling and automating building zones and building modes to correct a variance and optimize energy consumption, environmental impact and cost.

Aspect 11. The system of aspect 8, further comprising, configuration and set up of actuation controls thresholds, exceptions, notifications, alarms, and modes (e.g. manual, auto, hybrid).

Aspect 12. The system of aspect 8, further comprising the actuation of energy optimization recommendations according to the system controls configuration and settings defined by customer.

Aspect 13. The system of aspect 1, further comprising, displaying products, repairs, and services available to correct a variance and actuate on an optimization opportunity; and enabling interaction between customer and providers for selection and order initiation by customer.

Aspect 14. The system of aspect 1, further comprising the calculation, tracking and display of the Energy Optimization Score (Energy IQ) providing the user with a framework of reference to determine the building's level of energy optimization, integrating the evolution in the baseline and energy indicators (provided by the Energy FingerPrint variations), the changes in energy consumption, cost, environmental impact, and the level of impact and implementation of the energy optimization recommendations.

Aspect 15. The system of aspect 1, further comprising the integration of the users' energy dashboard and Energy Optimization Score with existing social media platforms to share and showcase the progress in Energy Optimization Goals.

Aspect 16. An energy analytics and optimization system for monitoring and controlling energy consumption for a consumer premises by a user, comprising: at least one processor and an associated instruction memory, at least one memory storage device configured to store, (i) historical energy usage data for a premises (facility),
(ii) locational data for a premises (facility)
(iii) historical weather data for the zone associated with the premises (facility),
(iv) data for unique and variable premises energy characteristics,
(v) data regarding selected user preferences and energy goals for said premises,
(vi) end-user provided behavioral data and data regarding said premises,
(vii) end-user provided data regarding energy monitoring and optimization criteria,
(viii) consumer products and repair and service providers, an analytics and computation engine (energy optimization engine) executed by said at least one processor using a first portion of instructions stored in said associated instruction memory for performing:
(i) statistical analysis of, aggregation of and disaggregation of said historical energy usage data,
(ii) statistical analysis of historical weather data associated with historical energy usage data,
(iii) machine learning and employing artificial intelligence models to identify data clustering, outliers and other data driven characteristics and incorporating feedback into selected portions of some of the analysis,
(iv) conversion of and storage of said historical energy usage data,
(v) time slice synchronization of selected portions of said data stored in said at least one memory storage device,
(vi) analyzing said usage data for energy consumption by one or more energy devices associated with said premises,
(vii) computation of energy costs using said converted and stored historical energy usage data,
(viii) providing alternative representations of energy usage data associated with a source of energy for said premises,
(ix) calculating a plurality of months of a baseline for usage data using at least a portion of said historical energy data as a basis for said calculating,
(x) comparing said baseline usage to actual usage data,
(xi) monitoring actual usage data for variances to said baseline,
(xii) determining variances between actual and baseline
(xiii) providing variance analysis for causation,
(xiv) determining and providing recommendations for available energy reduction choices,
(xv) calculating energy optimization scores based on the implementation of optimization recommendations and energy optimization performance indicators (e.g. Energy IQ), a display engine executed by said at least one processor using a second portion of instructions stored in said associated instruction memory for:

(i) receiving end-user goals, criteria for energy monitoring, and premises plans and premises occupation and behavioral data,
(ii) displaying synchronized time slice data in one or more pre-selected formats,
(iii) displaying alternative representations of energy usage data associated with a source of energy for said premises,
(iv) Displaying alternative representations of environmental impact (e.g., toxic pollutant and greenhouse emissions, $CO_2$, $NOX$, $NO_2$, $CH_4$) associated with the energy consumption and the source of energy for said premises,
(v) displaying recommendations for available energy reduction choices,
(vi) displaying recommendations and alternative representations for available environmental impact reduction choices (e.g., number of trees required to offset, renewable energy alternative
(vii) displaying energy consumption for said energy devices associated with said premises,
(viii) displaying comparison of actual energy usage to baseline energy usage, resulting variances and variance causation,
(ix) displaying and alerting an end-user of variances in energy use based on one or more of selected set points, excessive usage, and unintentional usage.
(x) displaying energy optimization scores, and visualization of the energy optimization performance indicators and implementation of optimization recommendations (e.g. Energy IQ)

Aspect 17. A system for end-user energy analytics and optimization for monitoring, optimizing and controlling energy consumption for a consumer building by a user, comprising:
at least one processor and an associated instruction memory containing energy analysis logic, for using and analyzing data from
a database configured to store historical weather and temperatures,
a database configured to store historical energy usage,
a database configured to store location data,
a database configured to store energy goals for said premises,
a database configured to store end-user preferences,
a database configured to store end-user lifestyle information and schedules, and
a database configured to store end-user premises information,
a database configured to store consumer products and repair and service providers, wherein said energy analysis logic performs analysis of said data from said databases resulting in the generation of a multidimensional model comprised of the integration and time alignment of historical electricity consumption variation over time, user lifestyle behavior variations over time, user preference variations over time, building feature efficiency variations over time, weather variations over time at a specific location, outdoor temperature variations over time at a specific location, and a baseline for energy consumption,
at least one memory storage device configured to store, at least said multidimensional model, intermediary calculations and comparisons and data for end-user premises information, historical weather and temperatures for said premises location, historical energy usage, end-user preferences, end-user lifestyle information and schedules, and an interactive display for selectively presenting representations of portions of said multidimensional model, the analysis results and comparisons of actual consumption to baseline consumption, including any variances between them, analysis for the cause of the variances ranked for further review and action by a user.

Aspect 18. The system of aspect 17, further comprising comparisons of actual consumption to baseline consumption from the model, including any variances between them, and analysis for the cause of the variances, and determining, providing recommendations for available energy reduction choices, providing operation for smart devices, and providing products and repair and services when needed to eliminate a variance.

Aspect 19. The system of aspect 17, further comprising continuous communication and interactions to obtain energy usage data, and other dynamic locational and weather data, and other related data impacting energy usage including dynamics in user behavior and premises features in order to continuously update the personalized multidimensional energy model representative of said analysis of said data and generate analysis and ranking of results.

Aspect 20. A computer implemented method for monitoring, analyzing, optimizing, and controlling energy consumption for a consumer building, comprising: Using a web-based application GUI to create a user account for a computer implemented system for monitoring and analyzing energy usage, Entering building and meter data, and agreeing to the downloading of usage data for the building from data storage location,
Downloading historical usage data and current electricity plan information using said system,
Downloading consumer products and repair and service providers in an area containing the building,
Receiving customer weighted inputs on personalized energy optimization criteria and goals.
Receiving user behavioral inputs including but not limited to occupants, preferences, appliances set points, and schedules for the given premises,
Receiving user inputs on premises features including but not limited to building age, materials, type and age of appliances
Calculating a personalized energy fingerprint and a plurality of time periods of a baseline energy usage,
converting and storing in a single common interoperable data format preselected data from multiple sources in a memory Comparing said baseline energy usage to actual usage,
Detecting variances between the baseline and actual usage,
Determining the cause of a variance.
Detecting opportunities to optimize energy consumption to meet customer's energy optimization criteria
Determining optimization options available to correct the cause of variance
Calculating and ranking the impact and alignment of the optimization opportunities available with customers' optimization goals
Applying customer selected weighting optimization criteria to results of calculations, Aspect 21. The method of aspect 20, further comprising the generation of a personalized descriptive and forecasting prescriptive algorithm (model) involving the fitting of electricity consumption for each customer and multiple factors including but not limited to weather factors, behavioral factors (e.g. schedules, appliances set points, occupancy), premises features (e.g. conditions of appliances, building materials, building age) and parameters determined by an ensemble of machine learning models Aspect 22. The method of aspect 20, further comprising the continuous monitoring of the energy consumption comparing it to the baseline and personalized model to detect variances, alert and query customer when predefined threshold is exceeded Aspect 23. The method of aspect 20, further integrating the customer feedback into the training and continuous improvement of the customer's energy fingerprint and personalized machine learning descriptive and predictive models.

Aspect 24. The method of aspect 20, further comprising an interactive customer interface allowing user to provide weighted inputs on personalized energy optimization criteria and goals.

Aspect 25. The method of aspect 20, further comprising the monitoring and comparison of actual consumption and baseline consumption from the model to detect variances and analyze the cause for the variances. Determining and providing recommendations for available energy reduction choices, providing operation for smart devices, and providing products and repair and services when needed to eliminate a variance.

Aspect 26. The method of aspect 20, further comprising the identification, scoring, ranking; display and notification of weighted opportunities available to correct the variances; the scoring and ranking of the impact (e.g. cost, environmental footprint, changes to appliances schedules and set points) of the opportunities available to correct variances; scoring and ranking of the alignment of the impact of the opportunities available to correct variances and the users' energy optimization criteria including but not limited to cost, environmental footprint, impact to lifestyle, budget goal.

Aspect 27. The method of aspect 20, further comprising, storing programming instructions responsive to actions by a user for creating building zones and building modes for communicating with and controlling components, devices, appliances and smart device components and appliances.

Aspect 28. The method of aspect 20, further comprising, storing data for smart device components and appliances; storing programming instructions responsive to actions by a user for communicating with smart device components and appliances; and converting and storing in a single common interoperable data format preselected data from those multiple sources.

Aspect 29. The method of aspect 20, further comprising, storing programming instructions for actuating, controlling and automating building zones and building modes to correct a variance and optimize energy consumption, environmental impact and cost.

Aspect 30. The method of aspect 20, further comprising, configuration and set up of actuation controls thresholds, exceptions, notifications, alarms, and modes (e.g. manual, auto, hybrid).

Aspect 31. The method of aspect 20, further comprising the actuation of energy optimization recommendations according to the system controls configuration and settings defined by customer.

Aspect 32. The method of aspect 20, further comprising, displaying products, repairs, and services available to correct a variance and actuate on an optimization opportunity; and enabling interaction between customer and providers for selection and order initiation by customer.

Aspect 33. The method of aspect 20, further comprising continuous communication and interactions to obtain energy usage data, and other dynamic locational and weather data, and other related data impacting energy usage including dynamics in user behavior and premises features in order to continuously update the personalized multidimensional energy model representative of said analysis of said data and generate analysis and ranking of results.

Aspect 34. The method of aspect 20, further comprising the calculation, tracking and display of the Energy Optimization Score (Energy IQ) providing the user with a framework of reference to determine the building's level of energy optimization, integrating the evolution in the baseline and energy indicators (provided by the Energy FingerPrint variations), the changes in energy consumption, cost, environmental impact, and the level of impact and implementation of the energy optimization recommendations.

Aspect 35. The method of aspect 20, further comprising the calculation, tracking and display of the Energy Optimization Score (Energy IQ) providing the user with a framework of reference to determine the building's level of energy optimization, integrating the evolution in the baseline and energy indicators (provided by the Energy FingerPrint variations), the changes in energy consumption, cost, environmental impact, and the level of impact and implementation of the energy optimization recommendations.

Aspect 36. The method of aspect 20, further comprising the integration of the users' energy dashboard and Energy Optimization Score with existing social media platforms to share and showcase the progress in Energy Optimization Goals.

Figure 45:
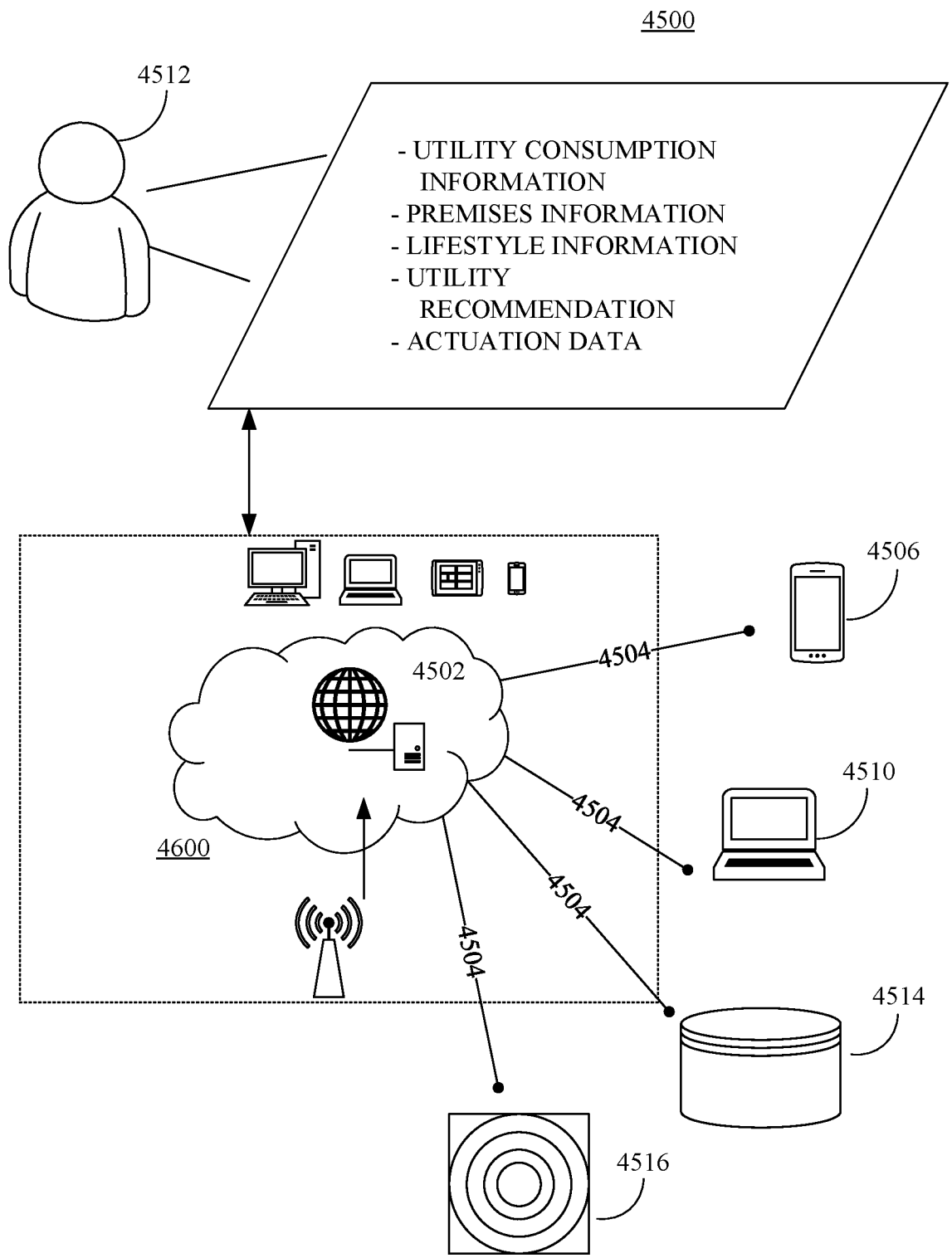
FIG. 45 is an illustration of an online platform consistent with various embodiments of the present disclosure.

FIG. 45 is an illustration of an online platform 4500 consistent with various embodiments of the present disclosure. By way of non-limiting example, the online platform 4500 to facilitate optimizing utility consumption associated with at least one premises may be hosted on a centralized server 4502, such as, for example, a cloud computing service. The centralized server 4502 may communicate with other network entities, such as, for example, a mobile device 4506 (such as a smartphone, a laptop, a tablet computer etc.), other electronic devices 4510 (such as desktop computers, server computers etc.), databases 4514, and sensors 4516 over a communication network 4504, such as, but not limited to, the Internet. Further, users of the online platform 4500 may include relevant parties such as, but not limited to, end-users, administrators, service providers, service consumers and so on. Accordingly, in some instances, electronic devices operated by the one or more relevant parties may be in communication with the platform.

A user 4512, such as the one or more relevant parties, may access online platform 100 through a web based software application or browser. The web based software application may be embodied as, for example, but not be limited to, a website, a web application, a desktop application, and a mobile application compatible with a computing device 4600.

Figure 46:
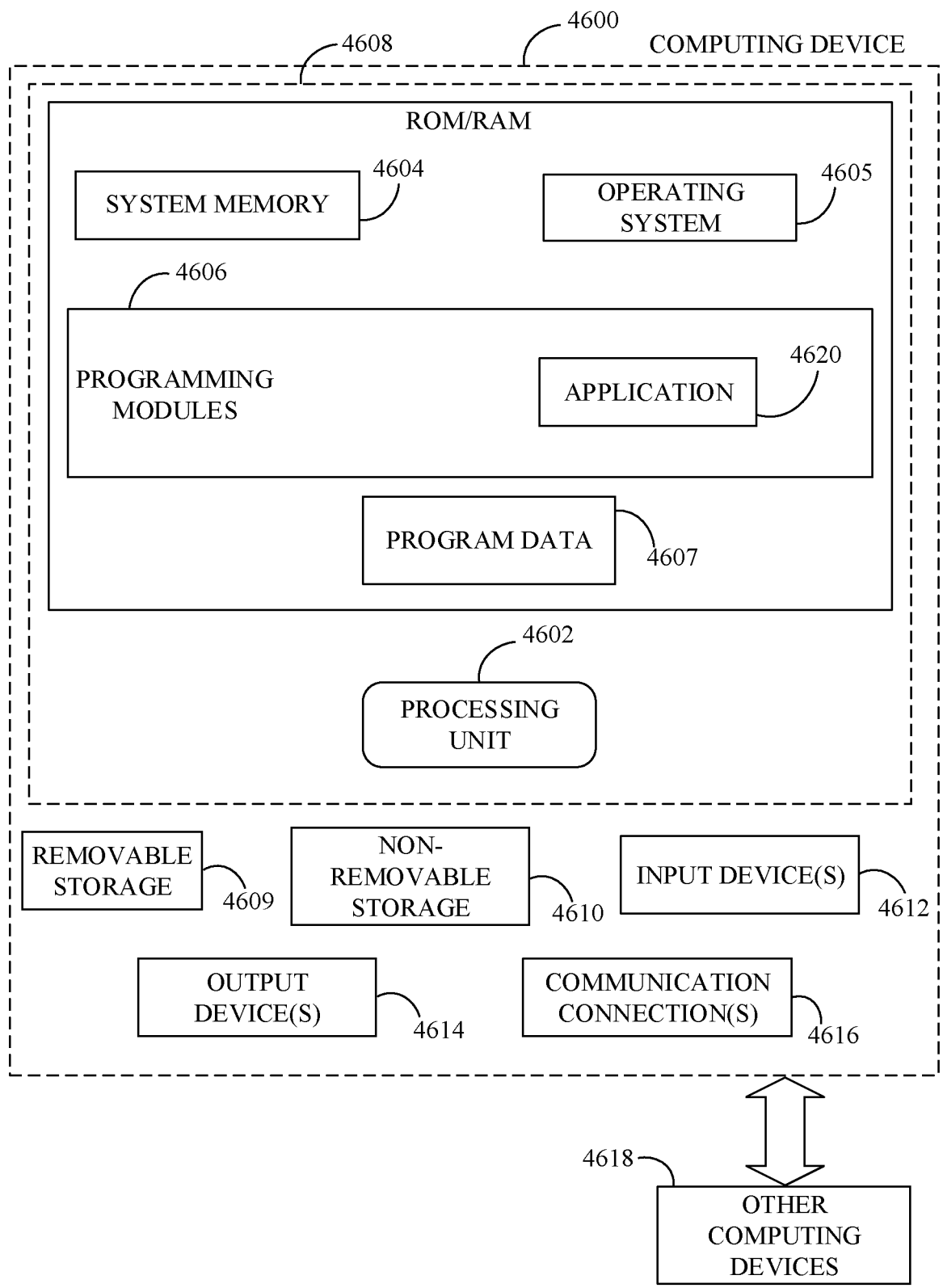
FIG. 46 is a block diagram of a computing device for implementing the methods disclosed herein, in accordance with some embodiments.

With reference to FIG. 46, a system consistent with an embodiment of the disclosure may include a computing device or cloud service, such as computing device 4600. In a basic configuration, computing device 4600 may include at least one processing unit 4602 and a system memory 4604. Depending on the configuration and type of computing device, system memory 4604 may comprise, but is not limited to, volatile (e.g. random-access memory (RAM)), non-volatile (e.g. read-only memory (ROM)), flash memory, or any combination. System memory 4604 may include operating system 4605, one or more programming modules 4606, and may include a program data 4607. Operating system 4605, for example, may be suitable for controlling computing device 4600's operation. Furthermore, embodiments of the disclosure may be practiced in conjunction with a graphics library, other operating systems, or any other application program and is not limited to any particular application or system. This basic configuration is illustrated in FIG. 46 by those components within a dashed line 4608.

Computing device 4600 may have additional features or functionality. For example, computing device 4600 may also include additional data storage devices (removable and/or non-removable) such as, for example, magnetic disks, optical disks, or tape. Such additional storage is illustrated in FIG. 46 by a removable storage 4609 and a non-removable storage 4610. Computer storage media may include volatile and non-volatile, removable and non-removable media implemented in any method or technology for storage of information, such as computer-readable instructions, data structures, program modules, or other data. System memory 4604, removable storage 4609, and non-removable storage 4610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 4600. Any such computer storage media may be part of device 4600. Computing device 4600 may also have input device(s) 4612 such as a keyboard, a mouse, a pen, a sound input device, a touch input device, a location sensor, a camera, a biometric sensor, etc. Output device(s) 4614 such as a display, speakers, a printer, etc. may also be included. The aforementioned devices are examples and others may be used.

Computing device 4600 may also contain a communication connection 4616 that may allow device 4600 to communicate with other computing devices 4618, such as over a network in a distributed computing environment, for example, an intranet or the Internet. Communication connection 4616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 4604, including operating system 4605. While executing on processing unit 4602, programming modules 4606 (e.g., application 4620) may perform processes including, for example, one or more stages of methods, algorithms, systems, applications, servers, databases as described above. The aforementioned process is an example, and processing unit 4602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system for optimizing utility consumption associated with at least one premises, the system comprising:
   a communication device configured for:
   receiving at least one utility consumption information from at least one utility consumption information source, wherein the at least one utility consumption information is associated with consumption of at least one utility corresponding to the at least one premises;
   receiving at least one premises information from at least one premises information source, wherein the at least one premises information is associated with the at least one premises;
   receiving at least one lifestyle information from at least one lifestyle information source, wherein the at least one lifestyle information is associated with at least one occupant of the at least one premises; and
   performing at least one of:
   transmitting at least one utility recommendation associated with the at least one premises to at least one electronic device; and
   transmitting at least one actuation data to at least one appliance associated with the at least one premises, wherein at least one configuration of the at least one appliance is based on the at least one actuation data;
   a processing device configured for:
   analyzing each of the at least one utility consumption information, the at least one premises information and the at least one lifestyle information; and
   generating at least one of the at least one utility recommendation and the at least one actuation data based on the analyzing; and
   a storage device configured for storing each of the at least one utility consumption information, the at least one premises information, the at least one lifestyle information and at least one of the at least one utility recommendation and the at least one actuation data;
   the communication device is further configured for receiving at least one environmental information from at least one environmental information source, wherein the at least one environmental information is associated with the at least one premises, wherein the at least one premises information comprises a premises identifier associated with a premises of the at least one premises, wherein the analyzing comprises:
   identifying a premises information associated with the premises;
   performing a first comparison of the premises information with a plurality of premises information;
   performing a second comparison of a lifestyle information associated with the premises with a plurality of lifestyle information;
   performing a third comparison of an environmental information associated with the premises with a plurality of environmental information;
   determining a reference premises information based on each of the first comparison, the second comparison and the third comparison;
   determining a reference utility consumption information associated with the reference premises;
   performing a fourth comparison of a utility consumption information associated with the premises and the reference utility consumption information; and
   determining a utility optimization score based on the fourth comparison.

2. The system of claim 1, wherein the processing device is further configured for generating at least one utility fingerprint associated with the at least one premises based on the analyzing, wherein the generating of at least one of the at least one utility recommendation and the at least one actuation data is further based on analyzing the at least one utility fingerprint.

3. The system of claim 1, wherein the communication device is further configured for receiving at least one optimization criteria from the at least one electronic device, wherein the generating of at least one of the at least one utility recommendation and the at least one actuation data is based further on the at least one optimization criteria.

4. The system of claim 3, wherein the at least one utility recommendation comprises a plurality of utility recommendations and a plurality of weighted scores associated with the plurality of utility recommendations, wherein the plurality of weighted scores is based on the at least one optimization criteria.

5. The system of claim 3, wherein the at least one utility recommendation comprises indication of at least one product and at least one service configured towards optimizing consumption of the at least one utility.

6. The system of claim 1, wherein the at least one utility consumption information comprises a first utility consumption information corresponding to a first time period and a second utility consumption information corresponding to a second time period, wherein the second time period is later than the first time period, wherein the analyzing comprises:
   determining a utility consumption variation based on comparing the first utility consumption information and the second utility consumption information; and
   identifying a cause for the utility consumption variation; wherein the at least one utility recommendation comprises at least one correctional recommendation that mitigates, at least partially, the utility consumption variation.

7. The system of claim 6, wherein the at least one lifestyle information comprises a first lifestyle information associated with the first time period and a second lifestyle information associated with the second time period, wherein the at least one premises information comprises at least one efficiency indicator associated with the at least one utility consuming appliance deployed in the at least one premises, wherein the at least one efficiency indicator comprises a first efficiency indicator corresponding to a first time period and a second efficiency indicator corresponding to a second time period, wherein the analyzing comprises:

determining a lifestyle variation based on comparing the first lifestyle information and the second lifestyle information; and determining an efficiency variation based on comparing the first efficiency indicator and the second efficiency indicator; wherein the at least one correctional recommendation corresponds to at least one of the utility consumption variation, the lifestyle variation and the efficiency variation, wherein the at least one correctional recommendation mitigates at least partially, at least one of the utility consumption variation, the lifestyle variation and the efficiency variation.

8. The system of claim 7, wherein the analyzing comprises determining an implementation of the at least one utility recommendation based on at least one of the utility consumption variation, the lifestyle variation and the efficiency variation.

9. The system of claim 1, wherein the communication device is configured to receive at least one building mode from the at least one electronic device, wherein the at least one building mode comprises indication of the at least one appliance corresponding to the at least one actuation data.

10. A method of optimizing utility consumption associated with at least one premises, the method comprising:

receiving, using a communication device, at least one utility consumption information from at least one utility consumption information source, wherein the at least one utility consumption information is associated with consumption of at least one utility corresponding to the at least one premises;

receiving, using the communication device, at least one premises information from at least one premises information source, wherein the at least one premises information is associated with the at least one premises;

receiving, using the communication device, at least one lifestyle information from at least one lifestyle information source, wherein the at least one lifestyle information is associated with at least one occupant of the at least one premises; and analyzing, using a processing device, each of the at least one utility consumption information, the at least one premises information and the at least one lifestyle information; and generating at least one of at least one utility recommendation and at least one actuation data based on the analyzing;

performing at least one of:

transmitting the at least one utility recommendation associated with the at least one premises to at least one electronic device; and transmitting the at least one actuation data to at least one appliance associated with the at least one premises, wherein at least one configuration of the at least one appliance is based on the at least one actuation data;

storing, using a storage device, each of the at least one utility consumption information, the at least one premises information, the at least one lifestyle information and at least one of the at least one utility recommendation and the at least one actuation data; and receiving at least one environmental information from at least one environmental information source, wherein the at least one environmental information is associated with the at least one premises, wherein the at least one premises information comprises a premises identifier associated with a premises of the at least one premises, wherein the analyzing comprises:

identifying a premises information associated with the premises;

performing a first comparison of the premises information with a plurality of premises information;

performing a second comparison of a lifestyle information associated with the premises with a plurality of lifestyle information;

performing a third comparison of an environmental information associated with the premises with a plurality of environmental information;

determining a reference premises information based on each of the first comparison, the second comparison and the third comparison;

determining a reference utility consumption information associated with the reference premises;

performing a fourth comparison of a utility consumption information associated with the premises and the reference utility consumption information; and determining a utility optimization score based on the fourth comparison.

11. The method of claim 10 further comprising receiving, using the communication device, at least one building mode from the at least one electronic device, wherein the at least one building mode comprises indication of the at least one appliance corresponding to the at least one actuation data.

12. The method of claim 10 further comprising generating, using the processing device, at least one utility fingerprint associated with the at least one premises based on the analyzing, wherein the generating of at least one of the at least one utility recommendation and the at least one actuation data is further based on analyzing the at least one utility fingerprint.

13. The method of claim 10 further comprising receiving, using the communication device, at least one optimization criteria from the at least one electronic device, wherein the generating of at least one of the at least one utility recommendation and the at least one actuation data is based further on the at least one optimization criteria.

14. The method of claim 13, wherein the at least one utility recommendation comprises a plurality of utility recommendations and a plurality of weighted scores associated with the plurality of utility recommendations, wherein the plurality of weighted scores is based on the at least one optimization criteria.

15. The method of claim 13, wherein the at least one utility recommendation comprises indication of at least one product and at least one service configured towards optimizing consumption of the at least one utility.

16. The method of claim 10, wherein the at least one utility consumption information comprises a first utility consumption information corresponding to a first time period and a second utility consumption information corresponding to a second time period, wherein the second time period is later than the first time period, wherein the analyzing comprises:

determining a utility consumption variation based on comparing the first utility consumption information and the second utility consumption information; and identifying a cause for the utility consumption variation; wherein the at least one utility recommendation comprises at least one correctional recommendation that mitigates, at least partially, the utility consumption variation.

17. The method of claim 16, wherein the at least one lifestyle information comprises a first lifestyle information associated with the first time period and a second lifestyle information associated with the second time period, wherein the at least one premises information comprises at least one efficiency indicator associated with the at least one utility consuming appliance deployed in the at least one premises, wherein the at least one efficiency indicator comprises a first efficiency indicator corresponding to a first time period and a second efficiency indicator corresponding to a second time period, wherein the analyzing comprises:

determining a lifestyle variation based on comparing the first lifestyle information and the second lifestyle information; and determining an efficiency variation based on comparing the first efficiency indicator and the second efficiency indicator; wherein the at least one correctional recommendation corresponds to at least one of the utility consumption variation, the lifestyle variation and the efficiency variation, wherein the at least one correctional recommendation mitigates at least partially, at least one of the utility consumption variation, the lifestyle variation and the efficiency variation.

18. The method of claim 17, wherein the analyzing comprises determining an implementation of the at least one utility recommendation based on at least one of the utility consumption variation, the lifestyle variation and the efficiency variation.

\* \* \* \* \*